US012756112B2

(12) United States Patent
Guan et al.

(10) Patent No.: US 12,756,112 B2
(45) Date of Patent: Oct. 6, 2026

(54) WIRELESS ACCESS DEVICE AND COMMUNICATION SYSTEM

(71) Applicant: Honor Device Co., Ltd., Shenzhen (CN)

(72) Inventors: Qiao Guan, Shenzhen (CN); Shumin Liu, Shenzhen (CN); Dingding Wu, Shenzhen (CN); Pan Da, Shenzhen (CN); Yingmin Bai, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 72 days.

(21) Appl. No.: 18/845,309

(22) PCT Filed: Apr. 12, 2023

(86) PCT No.: PCT/CN2023/087903
§ 371 (c)(1),
(2) Date: Sep. 9, 2024

(87) PCT Pub. No.: WO2024/036999
PCT Pub. Date: Feb. 22, 2024

(65) Prior Publication Data

US 2025/0192447 A1 Jun. 12, 2025

(30) Foreign Application Priority Data

Aug. 19, 2022 (CN) ......................... 202211001359.1

(51) Int. Cl.
*H01Q 3/16* (2006.01)
*H01Q 1/22* (2006.01)
(Continued)

(52) U.S. Cl.
CPC ......... *H01Q 21/205* (2013.01); *H01Q 1/2291* (2013.01); *H01Q 3/06* (2013.01); *H01Q 3/18* (2013.01); *H01Q 21/293* (2013.01)

(58) Field of Classification Search
CPC ...... H01Q 21/205; H01Q 1/2291; H01Q 3/06; H01Q 3/18; H01Q 21/293
See application file for complete search history.

(56) References Cited

U.S. PATENT DOCUMENTS

| | | | |
|---|---|---|---|
| 7,015,871 | B2 | 3/2006 | Gottl et al. |
| 10,276,933 | B1 | 4/2019 | Chukka et al. |

(Continued)

FOREIGN PATENT DOCUMENTS

| | | | |
|---|---|---|---|
| CN | 105049560 | A | 11/2015 |
| CN | 205141148 | U | 4/2016 |

(Continued)

*Primary Examiner* — Henry Luong
(74) *Attorney, Agent, or Firm* — Slater Matsil, LLP

(57) ABSTRACT

This application provides a wireless access device and a communication system, and relates to the field of communication device technologies. The wireless access device includes a housing, a plurality of directional antennas, and a driving apparatus. The plurality of directional antennas are disposed in the housing and are distributed along a ring array, and a central axis of the ring array of the plurality of directional antennas is a first axis. The driving apparatus is disposed in the housing, and the driving apparatus is configured to drive the plurality of directional antennas to rotate relative to the housing, to respectively adjust beam directions of the plurality of directional antennas in the plurality of sectors.

20 Claims, 37 Drawing Sheets

(51) Int. Cl.

| | |
|---|---|
| ***H01Q 3/06*** | (2006.01) |
| ***H01Q 3/18*** | (2006.01) |
| ***H01Q 21/20*** | (2006.01) |
| ***H01Q 21/29*** | (2006.01) |

(56) References Cited

U.S. PATENT DOCUMENTS

| | | | | |
|---|---|---|---|---|
| 11,588,505 | B2 | 2/2023 | Zhao et al. | |
| 2019/0348752 | A1* | 11/2019 | Kim ......................... | H01Q 3/06 |
| 2021/0210850 | A1 | 7/2021 | Hayles, Jr. | |
| 2021/0226332 | A1 | 7/2021 | Chien et al. | |

FOREIGN PATENT DOCUMENTS

| | | | |
|---|---|---|---|
| CN | 107275787 | A | 10/2017 |
| CN | 110336626 | A | 10/2019 |
| CN | 112421218 | A | 2/2021 |
| CN | 114335996 | A | 4/2022 |
| EP | 3855639 | A1 | 7/2021 |

* cited by examiner

WIRELESS ACCESS DEVICE AND COMMUNICATION SYSTEM

CROSS-REFERENCE TO RELATED APPLICATIONS

This application is a National Stage of International Application No. PCT/CN2023/087903, filed on Apr. 12, 2023, which claims priority to Chinese Patent Application No. 202211001359.1, filed on Aug. 19, 2022, both of which are hereby incorporated by reference in their entireties.

TECHNICAL FIELD

This application relates to the field of communication technologies, and in particular, to a wireless access device and a communication system.

BACKGROUND

Wireless access devices such as wireless routers are applied to user Internet access and wireless coverage. The wireless access device may be considered as a forwarder, and forward a wireless or wired broadband network signal to nearby user equipment (user equipment, UE) through an antenna. A high gain, wide coverage, fast response, and relatively high operation stability of the wireless access device are pursued. However, currently, wireless access devices on the market usually cannot meet all of these requirements.

SUMMARY

Embodiments of this application provide a wireless access device and a communication system, to resolve a problem of how to increase a coverage area of a high-gain antenna, improve a response speed, and enhance operation stability while ensuring a high gain of the wireless access device.

To achieve the foregoing objective, the following technical solutions are used in the embodiments of this application.

According to a first aspect, a wireless access device is provided. The wireless access device includes a housing, a plurality of directional antennas, and a driving apparatus. The plurality of directional antennas are disposed in the housing and are distributed along a ring array, and a central axis of the ring array of the plurality of directional antennas is a first axis. Each directional antenna radiates a signal in a direction away from the first axis. Beams of the plurality of directional antennas are respectively located in a plurality of sectors, the plurality of sectors are disposed around the first axis, and vertices of the plurality of sectors are located on the first axis. The driving apparatus is disposed in the housing, and the driving apparatus is configured to drive the plurality of directional antennas to rotate relative to the housing, to respectively adjust beam directions of the plurality of directional antennas in the plurality of sectors.

In this way, the directional antenna has a high gain characteristic and can support single-user/Mesh networking signal enhancement. On this basis, the beams of the plurality of directional antennas are respectively located in the plurality of sectors, and the driving apparatus drives the plurality of directional antennas to respectively rotate in the plurality of sectors, to switch the beam directions of the plurality of directional antennas. This can increase a coverage area of the directional antenna, and can improve dead-zone coverage performance at an edge. Compared with an electrical switching manner, this can reduce a quantity of disposed directional antennas and therefore reduce costs while implementing a same coverage area. In addition, the plurality of directional antennas are driven to respectively rotate in the sectors in which the plurality of directional antennas are located, to reduce a rotation angle of the directional antenna. In this way, for a scenario in which user equipment is followed, a delay can be reduced, a response speed can be improved, and user experience can be improved. In addition, because the rotation angle of the directional antenna is relatively small, a risk that a feed cable is wound, knotted, and worn can be lowered, to improve operation stability of the device. Therefore, the wireless access device provided in this embodiment of this application features a high gain, wide coverage, high-speed response, and relatively high operation stability compared with that in the conventional technology.

In a possible implementation of the first aspect, the wireless access device further includes a first support, and the plurality of directional antennas are fastened to the first support. On this basis, the driving apparatus includes a driving member, and the driving member is connected to the first support. The driving member is configured to drive the first support to rotate around an axis, and the rotation axis around which the driving member drives the first support to rotate is collinear with the first axis, to drive the plurality of directional antennas to synchronously rotate, so as to respectively adjust the beam directions of the plurality of directional antennas in the plurality of sectors. This driving manner is a synchronous driving manner, and the driving apparatus has a simple composition structure, relatively low costs, and relatively small assembly difficulty, to help reduce costs and assembly difficulty of the wireless access device. This can improve edge coverage performance of a single-user device or coverage performance of some multi-user devices.

In a possible implementation of the first aspect, the wireless access device further includes a first support, and the first support and the housing are fastened relative to each other. The directional antenna includes a radiator and a reflection plate. Radiators of the plurality of directional antennas are fastened to the first support, reflection plates of the plurality of directional antennas are capable of respectively rotating around axes relative to the radiators, and the driving apparatus is configured to drive the reflection plates of the plurality of directional antennas to respectively rotate around the rotation axes of the reflection plates, to respectively adjust the beam directions of the plurality of directional antennas in the plurality of sectors. In this way, the radiators of the plurality of directional antennas are fastened, and the reflection plates of the plurality of directional antennas are driven to rotate, to adjust the beam directions of the directional antennas. In an adjustment process, positions of the radiators of the plurality of directional antennas and a circuit board assembly are fastened, and a feed cable connected between the radiator and the circuit board assembly does not swing. Therefore, a possibility that the feed cable is wound, knotted, and worn can be minimized.

In a possible implementation of the first aspect, the reflection plate is located between the radiator and the first axis, the reflection plate is an arc-shaped plate, a central line of the arc-shaped plate is collinear with a rotation axis of the arc-shaped plate, the arc-shaped plate has a concave surface and a convex surface that are opposite to each other, the concave surface faces the radiator, and the convex surface faces the first axis. The driving apparatus is configured to drive the arc-shaped plate to rotate around the central line of the arc-shaped plate, to respectively adjust the beam directions of the plurality of directional antennas in the plurality of sectors. In this way, when the reflection plate rotates, relatively small impact is exerted on performance of the directional antenna.

In a possible implementation of the first aspect, the driving apparatus includes a plurality of driving members, a quantity of the plurality of driving members is equal to a quantity of the plurality of directional antennas, the plurality of driving members are in a one-to-one correspondence with the plurality of directional antennas, each driving member is connected to a reflection plate of a corresponding directional antenna, and the driving member is configured to drive the reflection plate to rotate around a central line of the reflection plate. This structure has a simple control principle and is easy to control. This driving manner is an asynchronous driving manner. In this driving manner, high-speed Internet access requirements of a plurality of user equipments can be simultaneously met, to improve multi-sector multi-user edge coverage performance. This has relatively high flexibility and a relatively wide application scope. Different coverage policies may be implemented in different optimization policies, for example, global throughput optimization, VIP first, or service scenario first.

In a possible implementation of the first aspect, the driving apparatus includes a driving member, a driving gear, and a plurality of driven members. The driving member is connected to the driving gear, and the driving member is configured to drive the driving gear to rotate. The driven member is a gear or a rack extending along an arc, the plurality of driven members are respectively disposed on the reflection plates of the plurality of directional antennas, and axes of the plurality of driven members are respectively collinear with central lines of the reflection plates on which the plurality of driven members are located. The plurality of driven members are arranged in a circumferential direction of the driving gear, and are engaged with the driving gear, to drive the plurality of driven members to respectively rotate around the axes of the plurality of driven members. This driving manner is a synchronous driving manner. In this driving manner, because rotation axes of the plurality of directional antennas are not collinear with the first axis, there is a relatively low requirement on position accuracy of the reflection plates of the plurality of directional antennas relative to the first support and relative position accuracy between the reflection plates of the plurality of directional antennas, to simplify mounting difficulty. In addition, a structure of the driving apparatus may be designed to drive the reflection plates of the plurality of directional antennas to rotate at different angular velocities and/or in different rotation directions, so as to meet requirements in different application scenarios.

In a possible implementation of the first aspect, the wireless access device further includes a first support, and the first support and the housing are fastened relative to each other. The plurality of directional antennas are capable of being respectively rotatably connected to the first support around axes, and the driving apparatus is configured to drive the plurality of directional antennas to respectively rotate around the rotation axes of the plurality of directional antennas, to respectively adjust the beam directions of the plurality of directional antennas in the plurality of sectors. This driving manner is a synchronous driving manner. In this driving manner, because the rotation axes of the plurality of directional antennas are not collinear with the first axis, there is a relatively low requirement on position accuracy of the plurality of directional antennas relative to the first support and relative position accuracy between the plurality of directional antennas, to simplify mounting difficulty. In addition, a structure of the driving apparatus may be designed to drive the plurality of directional antennas to rotate at different angular velocities and/or in different rotation directions, so as to meet requirements in different application scenarios.

In a possible implementation of the first aspect, the driving apparatus includes a plurality of driving members, a quantity of the plurality of driving members is equal to a quantity of the plurality of directional antennas, the plurality of driving members are in a one-to-one correspondence with the plurality of directional antennas, each driving member is connected to a corresponding directional antenna, and the driving member is configured to drive the directional antenna to rotate around a rotation axis of the directional antenna. This structure has a simple control principle and is easy to control. This driving manner is an asynchronous driving manner. In this driving manner, high-speed Internet access requirements of a plurality of user equipments can be simultaneously met, to improve multi-sector multi-user edge coverage performance. This has relatively high flexibility and a relatively wide application scope. Different coverage policies may be implemented in different optimization policies, for example, global throughput optimization, VIP first, or service scenario first.

In a possible implementation of the first aspect, the driving apparatus includes a driving member, a driving gear, and a plurality of driven members. The driving member is connected to the driving gear, and the driving member is configured to drive the driving gear to rotate. The driven member is a gear or a rack extending along an arc, the plurality of driven members are respectively disposed on the plurality of directional antennas, and axes of the plurality of driven members are respectively collinear with the rotation axes of the directional antennas on which the plurality of driven members are located. The plurality of driven members are arranged in a circumferential direction of the driving gear, and are engaged with the driving gear, to drive the plurality of driven members to respectively rotate around the axes of the plurality of driven members. The driving apparatus can simultaneously drive the plurality of directional antennas by using one driving member. Therefore, costs are relatively low. In addition, transmission ratios between the driving gear and the plurality of driven members may be separately designed, so that rotational angular velocities of the plurality of directional antennas are different, to adapt to different application scenarios.

In a possible implementation of the first aspect, the transmission ratio between the driving gear and the driven member may be 1. In this way, in a working process of an antenna assembly, a rotational angular velocity of the driving member, a rotational angular velocity of the driving gear, and a rotational angular velocity of the driven member are the same, to simplify control difficulty.

In a possible implementation of the first aspect, the driving apparatus further includes a gear shift assembly. The gear shift assembly is configured to selectively separate the driving gear from at least one driven member in the plurality of driven members. In this way, by performing gear shift by using the gear shift assembly, the at least one driven member can stop rotating, to fasten a position of the reflection plate or the directional antenna, so that the at least one directional antenna maintains a current coverage state. In addition, at least one other directional antenna is driven to rotate, to change a beam direction of the at least one other directional antenna. This driving manner is an asynchronous driving manner. In this driving manner, high-speed Internet access requirements of a plurality of user equipments can be simultaneously met. This has relatively high flexibility and a relatively wide application scope. Different optimization policies may be implemented in different optimization policies, for example, global throughput optimization, VIP first, or service scenario first.

In a possible implementation of the first aspect, there is a gap between the driving gear and each of the plurality of driven members. On this basis, the gear shift assembly includes a plurality of transmission gears and a plurality of linear driving mechanisms. All of the plurality of transmission gears are located at a first position, the plurality of transmission gears are respectively disposed in the gaps between the driving gear and the plurality of driven members, and the transmission gear is engaged with the driving gear and the driven member, so that the driving gear is indirectly engaged with the driven member through the transmission gear. The plurality of linear driving mechanisms are respectively connected to the plurality of transmission gears, and the linear driving mechanism is configured to drive the transmission gear to move in a direction parallel to the first axis, so that the transmission gear is switched between the first position and a second position. When the transmission gear is located at the second position, the transmission gear is located outside the gap between the driving gear and the driven member, and is separated from the driving gear and the driven member. In this way, by controlling the plurality of linear driving mechanisms, the driving gear can be selectively engaged with one of the plurality of driven members, to implement gear shift. This structure is simple and has relatively high structural compactness.

In a possible implementation of the first aspect, when the transmission gear is located at the first position, a transmission ratio of a gear transmission mechanism including the driving gear, the transmission gear, and the driven member may be 1. In this way, in a working process of an antenna assembly, a rotational angular velocity of the driving member, a rotational angular velocity of the driving gear, and a rotational angular velocity of the driven member are the same, to simplify control difficulty.

In a possible implementation of the first aspect, the linear driving mechanism includes a magnetic member, an electromagnet, an elastic reset member, and a control circuit. An arrangement direction of the magnetic member and the electromagnet is parallel to the first axis, one of the magnetic member and the electromagnet is fastened to the transmission gear, and the other of the magnetic member and the electromagnet and the first support are fastened relative to each other. The elastic reset member is connected to the transmission gear. The control circuit is connected to the electromagnet, and the control circuit is configured to control the electromagnet to be energized or de-energized. When the electromagnet is energized, there is magnetic attraction force between the electromagnet and the magnetic member, the magnetic attraction force drives the transmission gear to move from the first position to the second position, and the elastic reset member is deformed to accumulate elastic reset force. When the electromagnet is de-energized, the magnetic attraction force between the electromagnet and the magnetic member disappears, and the elastic reset force drives the transmission gear to be reset from the second position to the first position. In this way, the transmission gear is reciprocally driven between the first position and the second position. This structure is simple and easy to control.

In a possible implementation of the first aspect, the control circuit includes a power supply circuit, a selection switch, and a processor. The selection switch is disposed between the power supply circuit and electromagnets of the plurality of linear driving mechanisms. The processor is connected to the selection switch, and is configured to control the selection switch, so that the power supply circuit is capable of selectively supplying power to an electromagnet of at least one linear driving mechanism in the plurality of linear driving mechanisms.

In a possible implementation of the first aspect, there are N sectors, N is a positive integer greater than 1, and a central angle of each sector is (360/N)°. The plurality of sectors are head-to-tail connected in a circumferential direction of the first axis, that is, in the circumferential direction of the first axis, two adjacent sectors have one overlapping radius edge, and areas other than the radius edge do not overlap. In this way, the plurality of sectors cover a 360° range area around the first axis, and a coverage area is relatively wide. In addition, there is a relatively low possibility that two adjacent directional antennas cover a same target user, to facilitate proper resource configuration.

In a possible implementation of the first aspect, there are three directional antennas and three sectors.

In a possible implementation of the first aspect, the wireless access device further includes a circuit board assembly, a plurality of feed cables, and a second support. The plurality of feed cables are respectively connected between the circuit board assembly and the radiators of the plurality of directional antennas. The second support and the housing are fastened relative to each other, the second support includes a support plate, the support plate is located between the circuit board assembly and the plurality of directional antennas, at least one cable-through slot is disposed on the support plate, and the plurality of feed cables penetrate through the at least one cable-through slot. In this way, the plurality of feed cables penetrate through the support plate, to facilitate cabling and ensure appearance cleanliness.

In a possible implementation of the first aspect, there are a plurality of cable-through slots, the plurality of cable-through slots are distributed along a ring array, a central axis of the ring array of the plurality of cable-through slots is a second axis, and the second axis is collinear with the first axis; and at least one feed cable penetrates through each cable-through slot. In this way, the plurality of feed cables are separated by using the plurality of cable-through slots, to avoid winding or knotting of the plurality of feed cables.

In a possible implementation of the first aspect, the cable-through slot may be a long slot, the long slot is an arc-shaped long slot extending around the second axis, and the second axis is a central line of the arc-shaped long slot. In this way, in a swing process, the feed cable can slide along the cable-through slot, to lower a risk that the feed cable is stuck and worn in the cable-through slot.

In a possible implementation of the first aspect, the cable-through slot is a long slot, the long slot has a first end and a second end that are opposite to each other, the long slot extends around the second axis from the first end to the second end, and a distance between the first end and the second axis is not equal to a distance between the second end and the second axis. That the long slot extends around the second axis means that a central angle of the long slot relative to the second axis is greater than 0°. Specifically, the central angle of the long slot relative to the second axis is an included angle between a vertical line between the first end of the long slot and the second axis and a vertical line between the second end and the second axis. At least one feed cable penetrates through each cable-through slot, and the at least one feed cable is capable of sliding along the cable-through slot. In this way, in a direction around the second axis, in two adjacent cable-through slots, a second end of one cable-through slot is located on a side that is of a first end of the other cable-through slot and that is away from the second axis or close to the second axis, that is, the two adjacent cable-through slots are disposed in a staggered manner. This can increase a central angle of the cable-through slot relative to the second axis, improve swing flexibility of the feed cable, and lower a risk of winding, knotting, and wear. In addition, it can be ensured that there is a connection area with a specific width between the two adjacent cable-through slots, to stably connect a first area to a second area, so as to ensure support stability of the first area for the driving member.

In a possible implementation of the first aspect, an extension path of the cable-through slot from the first end to the second end may be a straight line, or may be an arc, and an arching direction of the arc may be a direction away from the second axis, or may be a direction of approaching the second axis. In some embodiments, the extension path of the cable-through slot from the first end to the second end is an arc, and an arching direction of the arc is a direction away from the second axis. In this way, the feed cable slides along the cable-through slot with relatively high smoothness and relatively little wear.

In a possible implementation of the first aspect, a quantity of cable-through slots is equal to the quantity of directional antennas, the plurality of cable-through slots are in a one-to-one correspondence with the plurality of directional antennas, and feed cables connected to all of the directional antennas respectively penetrate through the cable-through slots corresponding to the directional antennas. In this way, there are a moderate quantity of cable-through slots, and both structural strength of the support plate and a possibility that the feed cable is wound and knotted can be considered.

In a possible implementation of the first aspect, there are M cable-through slots, M is a positive integer greater than 1, and a central angle of each cable-through slot relative to the second axis is greater than or equal to $(360/M)^\circ$. In this way, a sum of central angles of the plurality of cable-through slots relative to the second axis is greater than or equal to 360°, to ensure swing flexibility of the feed cable as much as possible, and lower a risk of sticking and wear.

In a possible implementation of the first aspect, the second support further includes a plurality of support pillars, the plurality of support pillars are disposed on a side that is of the support plate and that is away from the plurality of directional antennas, and the plurality of support pillars are evenly arranged around an edge of the support plate. The wireless access device further includes a plurality of omnidirectional antennas, and the plurality of omnidirectional antennas are respectively disposed on the plurality of support pillars. The omnidirectional antenna performs 360° homogeneous radiation on a plane perpendicular to a central axis of a beam, and can implement short-distance coverage in a 360° range of the plane, to meet an access requirement of an ordinary user. In addition, the omnidirectional antenna is supported by using the support pillar, and no support structure needs to be additionally disposed. Therefore, structural complexity of the antenna assembly can be reduced, to reduce assembly difficulty. Furthermore, the plurality of omnidirectional antennas may support transmission and receiving of a plurality of different channel signals, to improve application universality of the wireless access device.

In a possible implementation of the first aspect, there are four support pillars and four omnidirectional antennas, the four omnidirectional antennas are in a one-to-one correspondence with the four support pillars, and each omnidirectional antenna is disposed on a support pillar corresponding to the omnidirectional antenna.

In a possible implementation of the first aspect, the housing includes a lower housing and an upper housing. The lower housing includes a bottom plate and a first side frame, the first side frame is disposed around the bottom plate, the first side frame and the bottom plate enclose first accommodation space, the second support is located in the first accommodation space, the support plate is opposite to and spaced apart from the bottom plate, the plurality of support pillars are located between the support plate and the bottom plate, and the plurality of support pillars are connected to the bottom plate. The upper housing includes a cover plate and a second side frame, the second side frame is disposed around the cover plate, the second side frame and the cover plate enclose second accommodation space, an end that is of the second side frame and that is away from the cover plate is connected to an end that is of the first side frame and that is away from the bottom plate, and the second accommodation space communicates with the first accommodation space. The housing is easy to process and assemble.

In a possible implementation of the first aspect, the circuit board assembly includes a radio frequency transceiver system, at least one switching switch, and a processor. The radio frequency transceiver system includes at least one radio frequency transceiver, a quantity of the at least one radio frequency transceiver is less than a sum of the quantity of directional antennas and a quantity of omnidirectional antennas, and the plurality of directional antennas and the plurality of omnidirectional antennas form an antenna group. The at least one switching switch is connected between the at least one radio frequency transceiver and the antenna group. The processor is connected to the at least one switching switch, and the processor is configured to control the at least one switching switch to select at least one antenna in the antenna group to be connected to the at least one radio frequency transceiver. In this way, switching is performed by using the at least one switching switch, so that a relatively small quantity of radio frequency transceivers can be used to implement signal transmission and receiving of a relatively large quantity of antennas, thereby reducing structural complexity and costs of the radio frequency transceiver system.

In a possible implementation of the first aspect, the at least one radio frequency transceiver includes a first radio frequency transceiver, a second radio frequency transceiver, a third radio frequency transceiver, and a fourth radio frequency transceiver. The plurality of directional antennas include a first directional antenna, a second directional antenna, and a third directional antenna, and each of the first directional antenna, the second directional antenna, and the third directional antenna includes two antenna units whose polarization directions are orthogonal. The plurality of omnidirectional antennas include a first omnidirectional antenna, a second omnidirectional antenna, a third omnidirectional antenna, and a fourth omnidirectional antenna. The first radio frequency transceiver is connected to the first omnidirectional antenna, and the second radio frequency transceiver is connected to the second omnidirectional antenna. The at least one switching switch includes a first switching switch and a second switching switch. The first switching switch is connected between the third radio frequency transceiver and the third omnidirectional antenna, one antenna unit of the first directional antenna, one antenna unit of the second directional antenna, and one antenna unit of the third directional antenna, and the processor is configured to control the first switching switch to select one of the third omnidirectional antenna, the one antenna unit of the first directional antenna, the one antenna unit of the second directional antenna, and the one antenna unit of the third directional antenna to be connected to the third radio frequency transceiver. The second switching switch is connected between the fourth radio frequency transceiver and the fourth omnidirectional antenna, the other antenna unit of the first directional antenna, the other antenna unit of the second directional antenna, and the other antenna unit of the third directional antenna, the processor is connected to the second switching switch, and the processor is configured to control the second switching switch to select one of the fourth omnidirectional antenna, the other antenna unit of the first directional antenna, the other antenna unit of the second directional antenna, and the other antenna unit of the third directional antenna to be connected to the fourth radio frequency transceiver. This structure is simple, and two omnidirectional antennas are normally turned on, to meet an access requirement of an ordinary user. In addition, structural complexity and costs of the radio frequency transceiver system can be simplified by using the switching switch.

In a possible implementation of the first aspect, the processor includes two general purpose input/output ports (general purpose I/O ports, GPIO): a GPIO 1 and a GPIO 2. The processor separately outputs a high level or a low level by using the GPIO 1 and the GPIO 2, to control the first switching switch to select one of the third omnidirectional antenna, a first antenna unit, a third antenna unit, and a fifth antenna unit to be connected to the third radio frequency transceiver. The processor may further include a GPIO 3 and a GPIO 4. The processor separately outputs a high level or a low level by using the GPIO 3 and the GPIO 4, to control the second switching switch to select one of the fourth omnidirectional antenna, a second antenna unit, a fourth antenna unit, and a sixth antenna unit to be connected to the fourth radio frequency transceiver. A specific control method is similar to the control method of the first switching switch. Details are not described herein again.

It should be noted that the processor outputs parallel signals by using a plurality of GPIOs (including the GPIO 1, the GPIO 2, the GPIO 3, and the GPIO 4), to implement switching control between a plurality of antenna combinations by using the parallel signals. This control manner features clear logic. In some other embodiments, the processor may output serial signals by using a relatively small quantity of GPIOs (for example, one GPIO). On this basis, at least one serial-parallel signal converter needs to be serially connected between the relatively small quantity of GPIOs and the at least one switching switch, to convert the serial signals into parallels signal, so as to further implement switching control between a plurality of antenna combinations by using the parallel signals. In this manner, the processor may reserve a relatively small quantity of GPIOs for the at least one switching switch, to reduce costs and properly allocate and fully use the GPIO on the processor.

According to a second aspect, a communication system is provided. The communication system includes the wireless access device described in any one of the foregoing technical solutions and user equipment. The wireless access device is configured to provide a wireless access service for the user equipment.

Because the communication system provided in this embodiment of this application includes the wireless access device described in any one of the foregoing technical solutions, the communication system and the wireless access device can resolve a same technical problem and achieve same effects.

DETAILED DESCRIPTION OF ILLUSTRATIVE EMBODIMENTS

In the embodiments of this application, the terms "first", "second", "third", "fourth", "fifth", "sixth", "seventh", and "eighth" are merely used for description, and should not be understood as an indication or implication of relative importance or an implicit indication of a quantity of indicated technical features. Therefore, a feature defined by "first", "second", "third", "fourth", "fifth", "sixth", "seventh", and "eighth" may explicitly or implicitly include one or more features.

In the embodiments of this application, the term "include", "comprise", or any other variant thereof is intended to cover non-exclusive inclusion, so that a process, method, article, or apparatus that includes a series of elements includes not only those elements, but also other elements that are not explicitly listed, or includes elements inherent to such a process, method, article, or apparatus. Without further limitation, an element defined by the sentence "including a . . . " does not exclude existence of other identical elements in the process, method, article, or apparatus including the element.

In the embodiments of this application, the term "and/or" is merely used to describe an association relationship between associated objects, and represents that three relationships may exist. For example, A and/or B may represent the following three cases: Only A exists, both A and B exist, and only B exists. In addition, the character "/" in this specification usually represents an "or" relationship between associated objects.

In the embodiments of this application, it should be noted that descriptions "perpendicular", "parallel", and "collinear" respectively represent that "approximately perpendicular", "approximately parallel", and "approximately collinear" within a specific error range are allowed. The error range may be a range in which a deviation angle relative to each of "absolutely perpendicular", "absolutely parallel", and "absolutely collinear" is less than or equal to 5°, 8°, or 10°. This is not specifically limited herein.

In the embodiments of this application, it should be noted that the phrasing "fastened relative to each other" means that a relative position between at least two described objects is fastened, fastening is specifically implemented in a direct or indirect manner, and there is no relative position rotation or movement.

Figure 1:
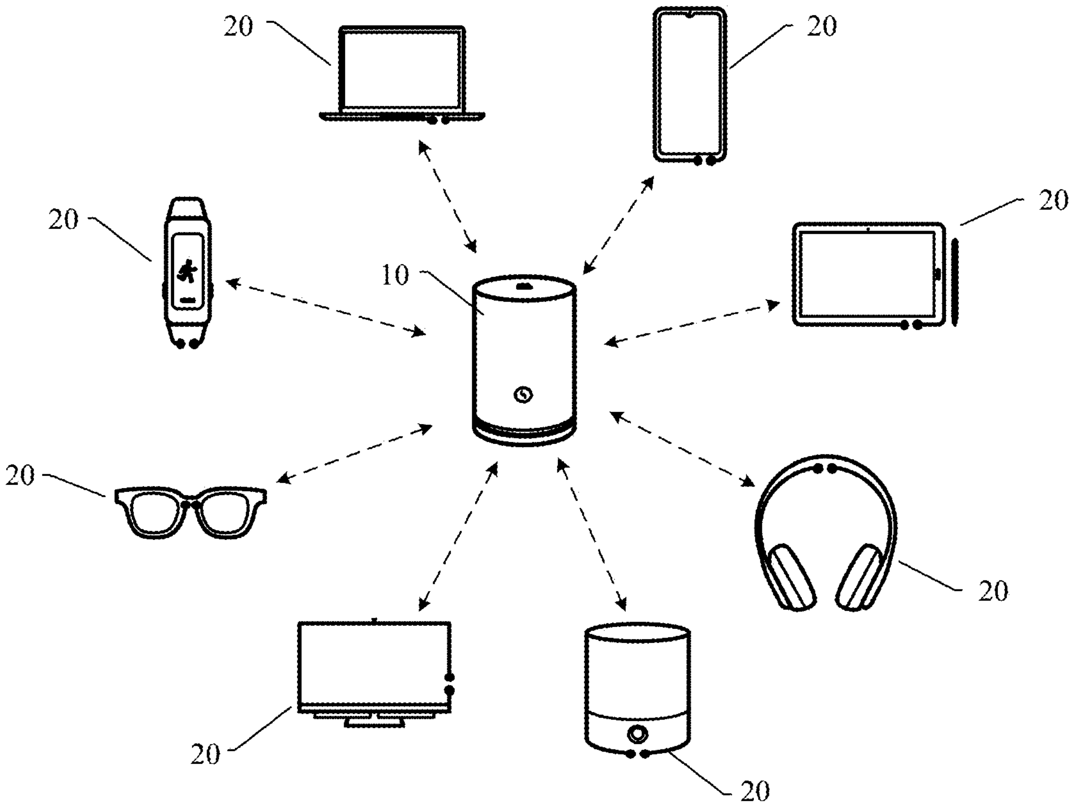
FIG. 1 is a schematic diagram of a structure of a communication system according to an embodiment of this application.

Refer to FIG. 1. FIG. 1 is a schematic diagram of a structure of a communication system 100 according to an embodiment of this application. The communication system 100 is a Wi-Fi communication system, and may be used in a home use scenario or an office use scenario. The communication system 100 includes a wireless access device 10 and user equipment (user equipment, UE) 20. The wireless access device 10 may also be referred to as an access point (access point, AP). The user equipment (user equipment, UE) 20 may also be referred to as a station (station, STA). The wireless access device 10 is configured to cover the UE 20, and may provide a wireless Wi-Fi access service for the UE 20, allow the UE 20 to access, and provide data access. The wireless access device 10 may be a router, a communication server, a switch, a bridge, a computer, or the like. The UE 20 may be a household device or a mobile terminal. Specifically, the UE 20 may be a device such as a mobile phone, a tablet computer, a notebook, a wearable device, a smart speaker, a headset, or a smart television. The wearable device includes but is not limited to a wristband, a watch, augmented reality (augmented reality, AR) glasses, an AR helmet, virtual reality (virtual reality, VR) glasses, a VR helmet, or the like. In this embodiment of this application, one UE 20 may access one or more wireless access devices 10, one or more UEs 20 may access one wireless access device 10, and data transmission may be performed between one wireless access device 10 and one UE 20 through a plurality of channel links.

The following mainly describes the wireless access device 10.

Figure 2:
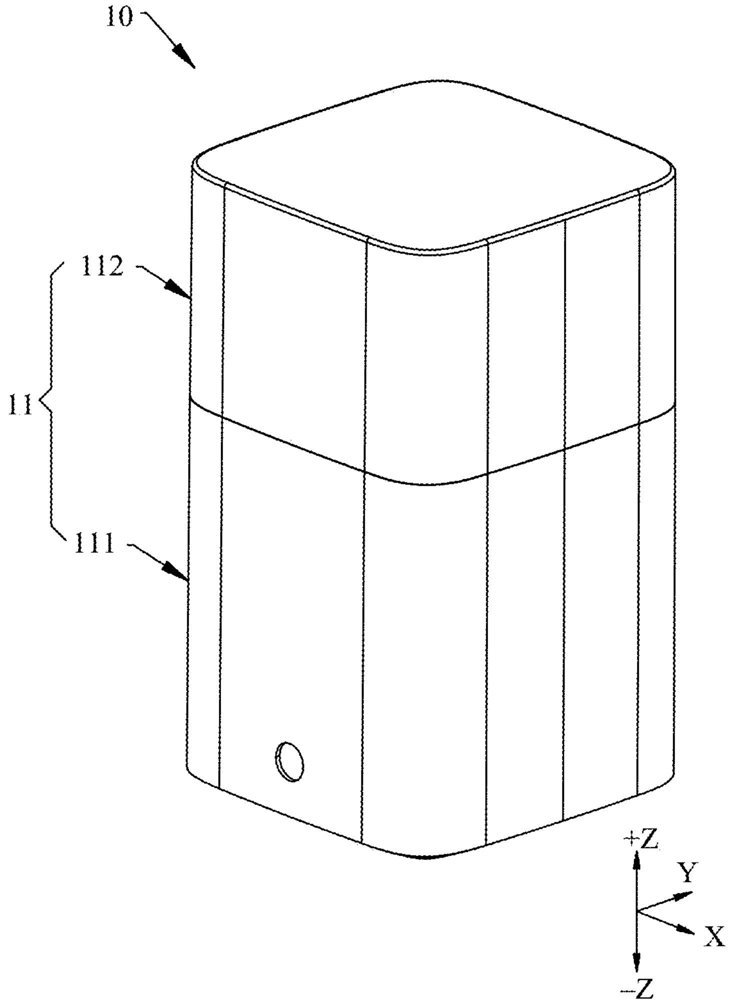
FIG. 2 is a schematic diagram of a structure of a wireless access device according to some embodiments of this application.

Refer to FIG. 2. FIG. 2 is a schematic diagram of a structure of a wireless access device 10 according to some embodiments of this application. In this embodiment and the following embodiments, an example in which the wireless access device 10 is a router is used for description. This cannot be considered as a special limitation imposed on this application. The wireless access device 10 is approximately in a square column shape. On this basis, for ease of description in the following embodiments, an XYZ coordinate system is established, and a height direction of the wireless access device 10 is defined as a Z-axis direction. Specifically, an upward direction in the height direction is a +Z-axis direction, a downward direction in the height direction is a −Z-axis direction, and a plane perpendicular to the height direction is an XY plane. It may be understood that the coordinate system of the wireless access device 10 may be flexibly set based on an actual requirement. This is not specifically limited herein. In some other embodiments, the wireless access device 10 may alternatively be approximately cylindrical, prism-shaped, multilateral columnar, flat plate-shaped, spherical, or the like.

Figure 3:
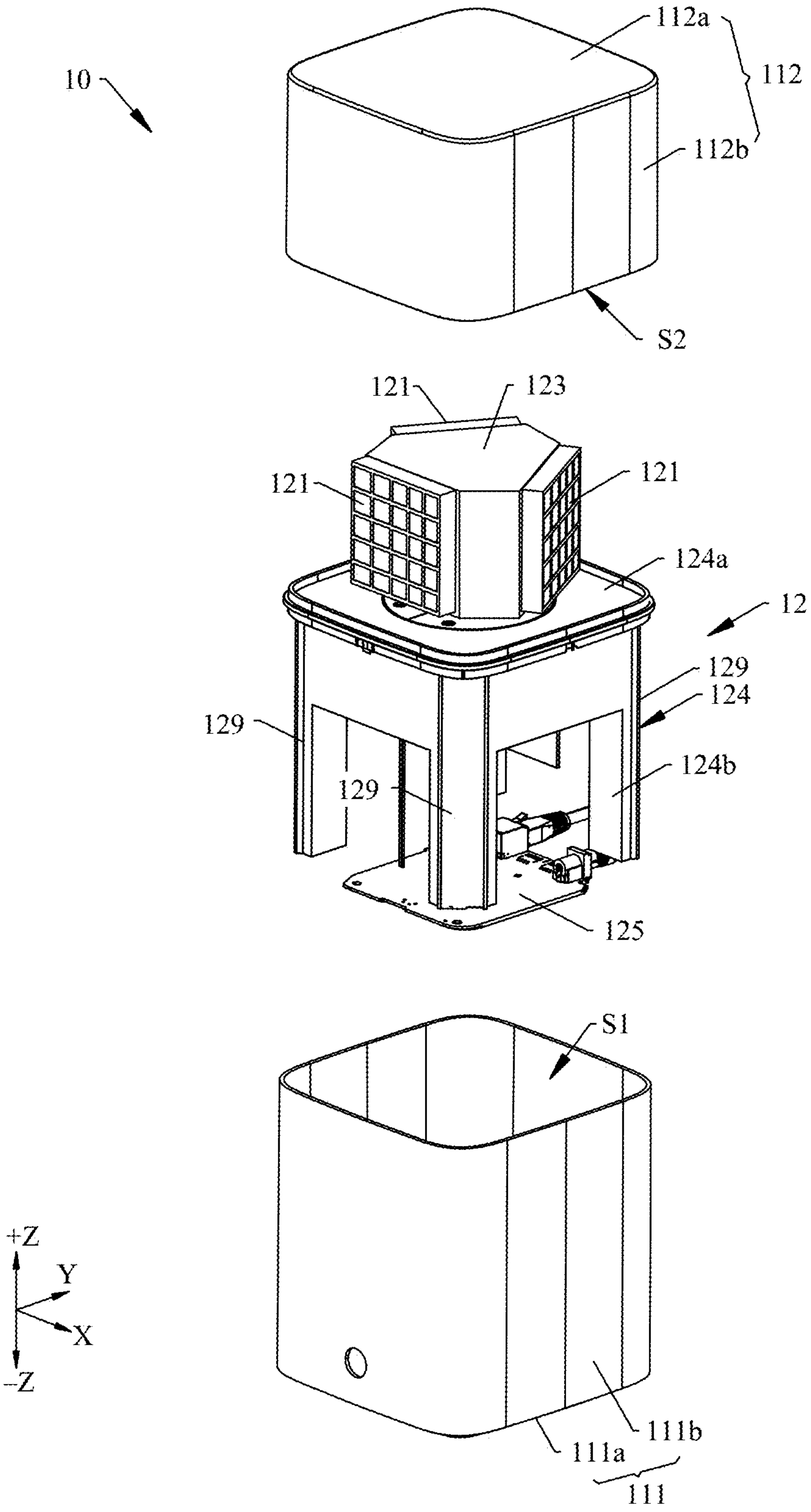
FIG. 3 is an exploded view of the wireless access device shown in FIG. 2.

Refer to both FIG. 2 and FIG. 3. FIG. 3 is an exploded view of the wireless access device 10 shown in FIG. 2. The wireless access device 10 includes a housing 11 and an antenna assembly 12.

The housing 11 is configured to protect the internal antenna assembly 12 and other electronic components. A material of the housing 11 includes but is not limited to plastic. In some embodiments, the housing 11 includes a lower housing 111 and an upper housing 112. The lower housing 111 includes a bottom plate 111*a* and a first side frame 111*b*. The first side frame 111*b* is disposed around the bottom plate 111*a*, and encloses first accommodation space S1 with the bottom plate 111*a*. The upper housing 112 includes a cover plate 112*a* and a second side frame 112*b*. The second side frame 112*b* is disposed around the cover plate 112*a*, and encloses second accommodation space S2 with the cover plate 112*a*. An end D1 that is of the first side frame 111*b* and that is away from the bottom plate 111*a* is fixedly connected to an end D2 that is of the second side frame 112*b* and that is away from the cover plate 112*a*, where the fixed connection manner includes but is not limited to threaded connection, clamping, riveting, and bonding, so that the first accommodation space S1 communicates with the second accommodation space S2 to form internal accommodation space of the housing 11.

In some embodiments, the lower housing 111 is a non-transparent housing, and the upper housing 112 is a transparent housing. In this way, a static part inside the housing 11 can be disposed in the first accommodation space S1 of the lower housing 111, to ensure appearance cleanliness; and a moving part inside the housing 11 can be disposed in the second accommodation space S2 of the upper housing 112, to help a user check whether the device operates normally. The static part is a part that is in the device and that is in a static state relative to the housing 11 in an operational process, that is, the static part and the housing 11 are fastened relative to each other. The moving part is a part that is in the device and that can move relative to the housing 11 in an operational process.

In some other embodiments, both the lower housing 111 and the upper housing 112 may be non-transparent housings or transparent housings, or the lower housing 111 is a transparent housing, and the upper housing 112 is a non-transparent housing. In addition, in some other embodiments, the housing 11 may be integrally formed, that is, the lower housing 111 and the upper housing 112 are an integral structural member. Alternatively, in some other embodiments, the housing 11 may not be disposed for the wireless access device 10.

The antenna assembly 12 is disposed in the housing 11. In some embodiments, the antenna assembly 12 is configured to transmit and receive a Wi-Fi signal. Specifically, the antenna assembly 12 is configured to transmit and receive at least one of a WiFi-2.4G signal, a WiFi-5G signal, a WiFi-6E signal, or a signal on a universal frequency band above WiFi-6E.

Figure 4:
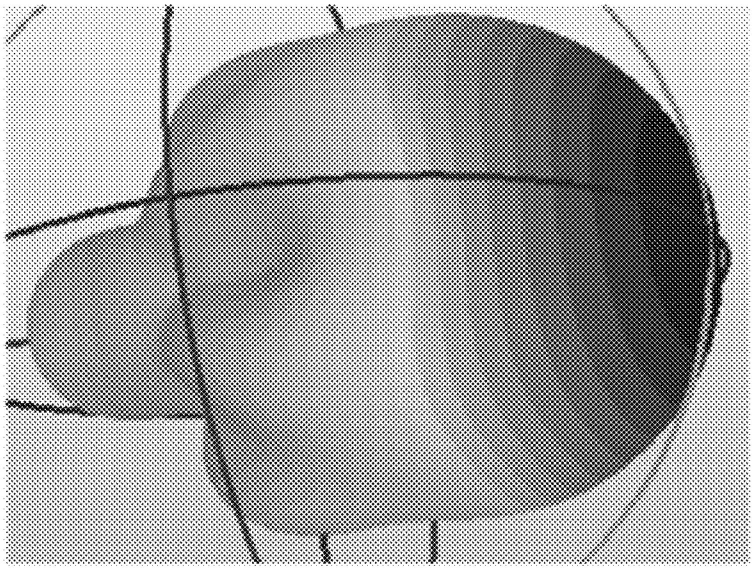
FIG. 4 is a directivity pattern of a directional antenna in three-dimensional space according to some embodiments of this application.

In some embodiments, to enable the wireless access device 10 to have a high gain characteristic to cover a mid/long-distance device and a high-speed device, the antenna assembly 12 includes a directional antenna 121. Refer to FIG. 4. FIG. 4 is a directivity pattern of a directional antenna 121 in three-dimensional space according to some embodiments of this application. A beam of the directional antenna 121 has a particularly strong signal transmission capability in a direction, and has a relatively weak signal transmission capability or no signal transmission capability in another direction. Therefore, the beam of the directional antenna 121 is directional. On this basis, for ease of description in the following embodiments, in the beam of the directional antenna 121, a direction in which there is a strongest signal transmission capability is defined, and is referred to as a beam direction of the directional antenna 121 below. In the beam direction, the directional antenna 121 has a relatively large gain (8 dBi~12 dBi), has a relatively good anti-interference capability, can meet a requirement of a high-speed device, has a relatively long coverage distance, and can cover a mid/long-distance device. However, because the beam of the directional antenna 121 is directional, it is difficult for the directional antenna 121 to implement full coverage, and an initial placement position of the directional antenna 121 may not be at an optimal angle to implement full coverage.

To increase a coverage area of the directional antenna 121, the directional antenna 121 may be physically driven to rotate, so that the beam of the directional antenna 121 is switched between a plurality of sectors. However, considering limitations imposed by factors such as a load, inertia, and noise, during rotation implemented through physical driving, a speed is usually relatively low (at a second level), and for a scenario in which UE is followed, there is a delay, a response speed is relatively slow, and user experience is poor. In addition, a rotation angle of the directional antenna 121 is relatively large, and a torsion angle of a connected feed cable (cable) is relatively large. In this case, winding, knotting, and even wear are caused, and consequently operation stability and a service life of the device are affected.

To avoid the foregoing problem, a plurality of directional antennas 121 at fixed positions may be used to respectively serve a plurality of sectors, so as to cover the plurality of sectors in an electrical switching manner. However, in this solution, it may be impossible to provide a service for edge user equipment in the sector, and there is an increase in costs because a relatively large quantity of directional antennas 121 are disposed.

Figure 5A:
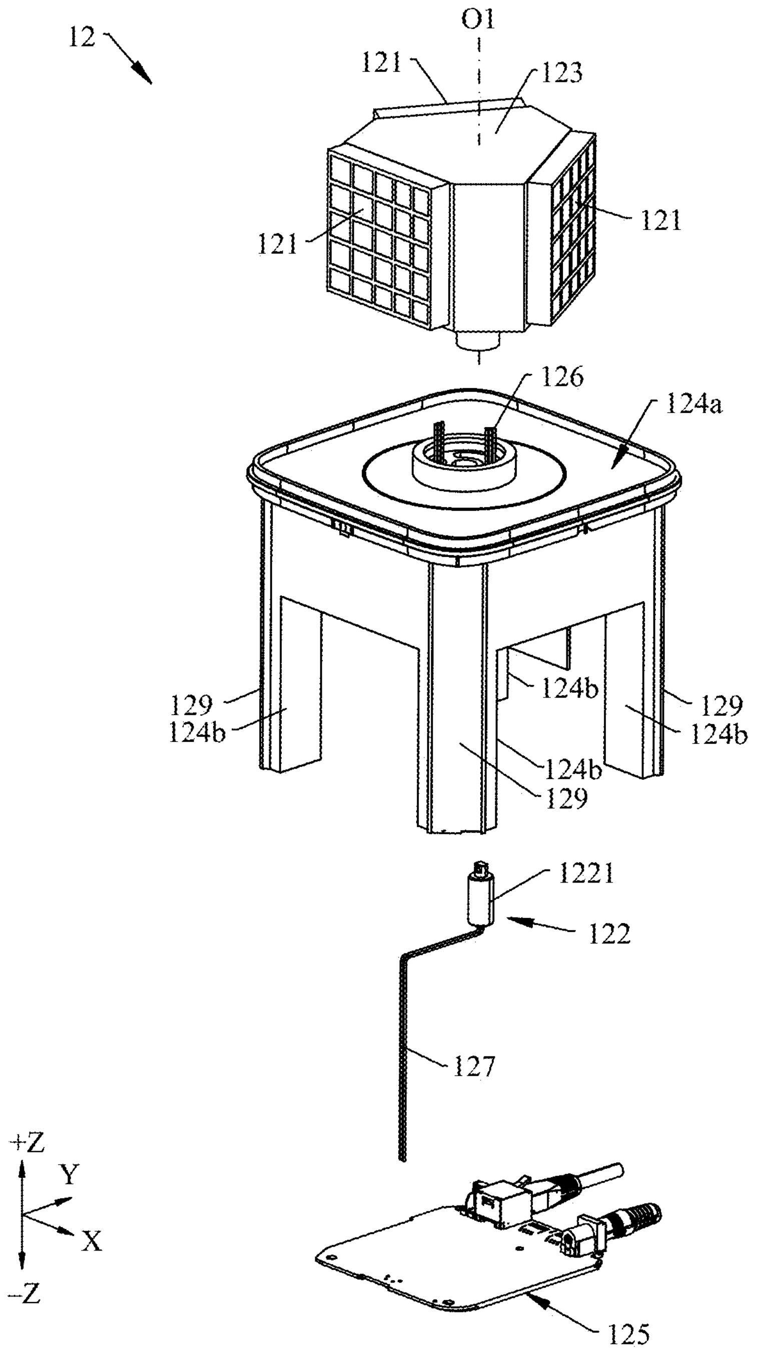
FIG. 5A is an exploded view of an antenna assembly in the wireless access device shown in FIG. 3.

In this embodiment of this application, to meet all of a high gain, wide coverage, high-speed response, and relatively high operation stability, refer to FIG. 5A. FIG. 5A is an exploded view of the antenna assembly 12 in the wireless access device 10 shown in FIG. 3. The antenna assembly 12 includes a plurality of directional antennas 121 and a driving apparatus 122.

"A plurality of" indicates two or more. There may be two, three, four, or five directional antennas 121, or the like. For example, with reference to FIG. 5A, there are three directional antennas 121. The plurality of directional antennas 121 are distributed along a ring array. On this basis, for ease of description in the following embodiments, a central axis of the ring array of the plurality of directional antennas 121 is defined as a first axis O1, and the first axis O1 passes through a center of the ring array of the plurality of directional antennas 121, and is perpendicular to a plane on which the ring array is located. In some embodiments, with reference to FIG. 5A, the first axis O1 is parallel to the +Z-axis direction and the −Z-axis direction. In some other embodiments, the first axis O1 may alternatively be parallel to an X-axis direction or parallel to a Y-axis direction. This is not specifically limited herein.

Figure 6:
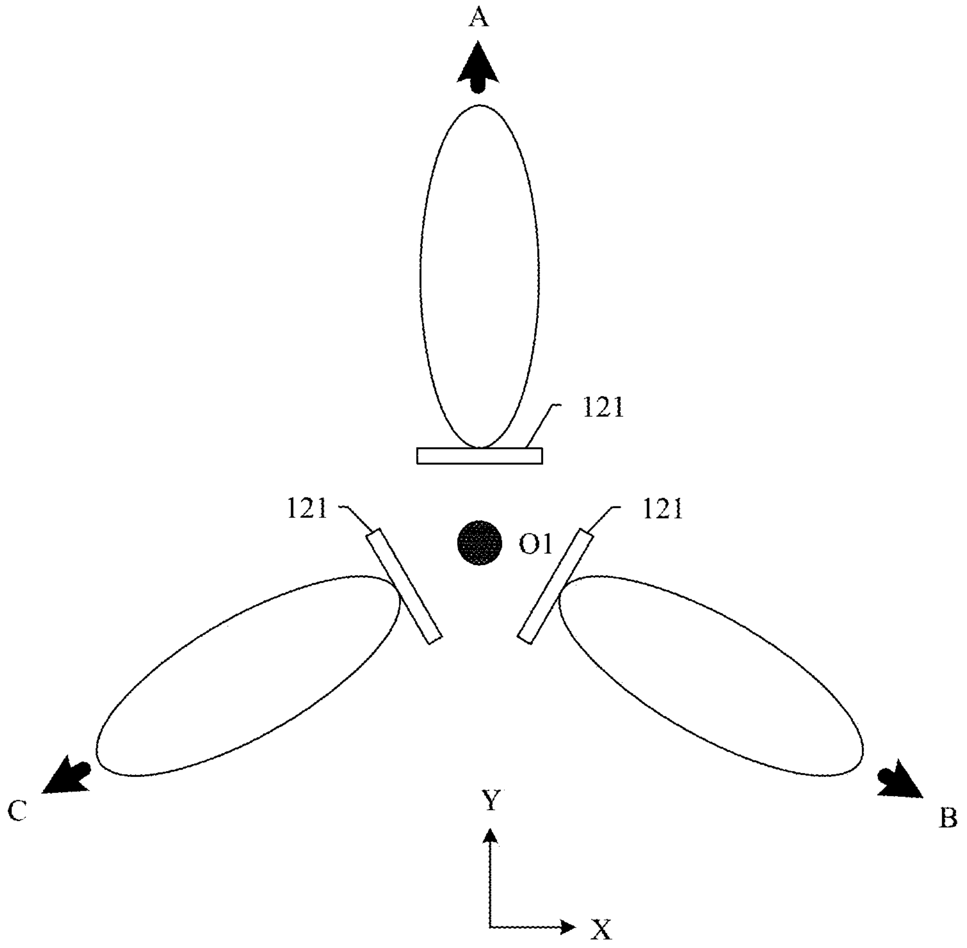
FIG. 6 is a beam diagram of a plurality of directional antennas in the antenna assembly shown in FIG. 5A.

In some embodiments, refer to FIG. 6. FIG. 6 is a beam diagram of the plurality of directional antennas 121 in the antenna assembly 12 shown in FIG. 5A. Each directional antenna 121 radiates a signal in a direction away from the first axis O1. Beam directions of the three directional antennas 121 are A, B, and C. Each of the beam directions A, B, and C is a direction away from the first axis O1. Specifically, beam directions of the plurality of directional antennas 121 may be parallel to the XY plane, or may be inclined at a specific angle relative to the XY plane in the +Z-axis direction or the −Z-axis direction. In this embodiment and the following embodiments, an example in which the beam directions of the plurality of directional antennas 121 are parallel to the XY plane is used for description.

Figure 7:
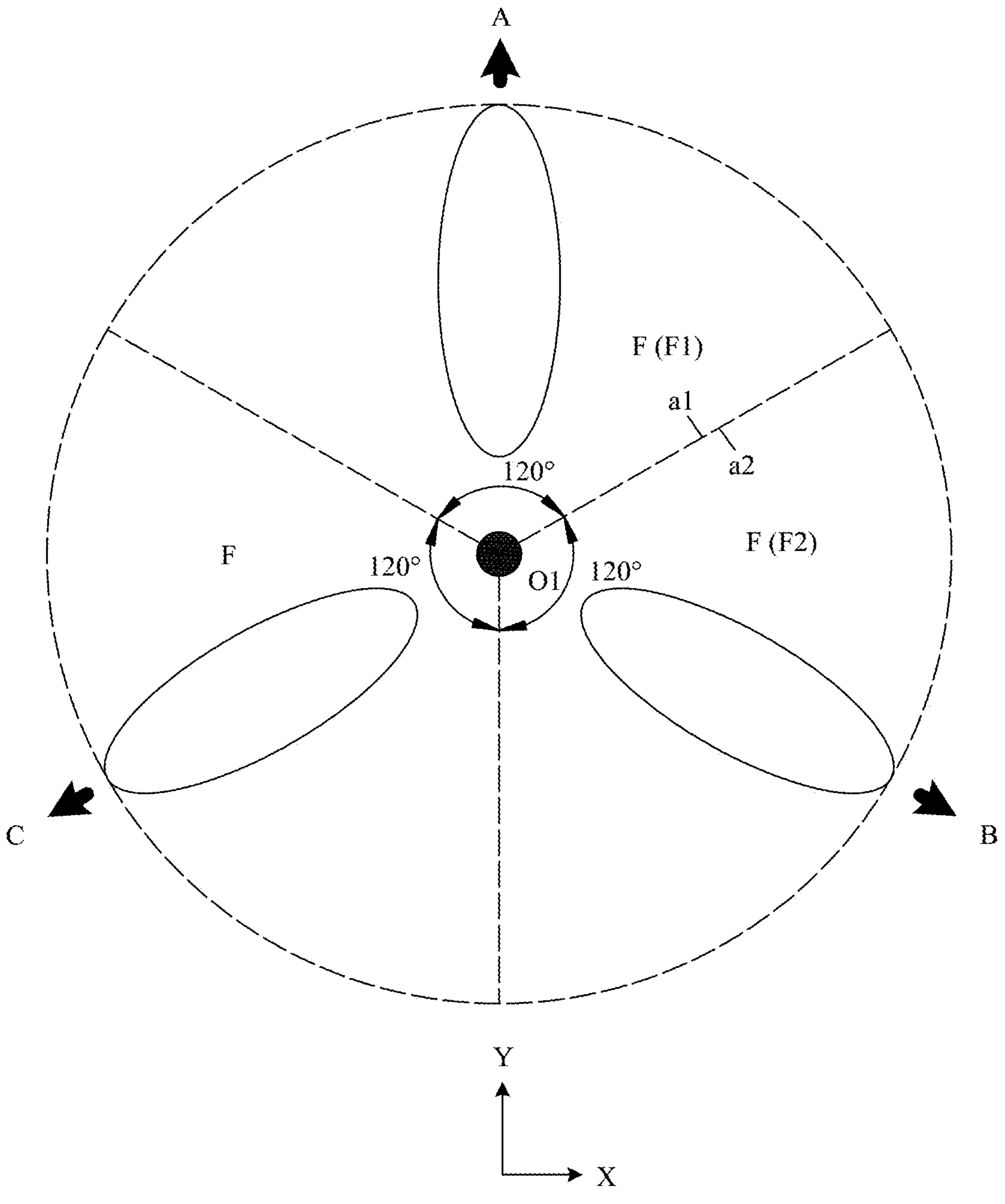
FIG. 7 is a schematic diagram of a relative position between beams of a plurality of directional antennas in the antenna assembly shown in FIG. 5A and a plurality of sectors F.

Beams of the plurality of directional antennas 121 are respectively located in a plurality of sectors F, and the sector F is a sector-shaped area with an infinite radius. Refer to FIG. 7. FIG. 7 is a schematic diagram of a relative position between the beams of the plurality of directional antennas 121 in the antenna assembly 12 shown in FIG. 5A and the plurality of sectors F. That a beam of the directional antenna 121 is located in a sector F means that at least a part of a beam with a strongest signal transmission capability in the beam of the directional antenna 12 is located in the sector F. The plurality of sectors F are disposed around the first axis O1, and vertices of the plurality of sectors F are located on the first axis O1. The vertex of the sector F is an intersection point between two radius edges of the sector-shaped area, that is, a central point corresponding to the sector-shaped area.

In this embodiment of this application, a beam of one directional antenna 121 may be located in one or more sectors F, and beams of a plurality of directional antennas 121 may be located in one sector F. In the following embodiments, an example in which a beam of one directional antenna 121 is located in one sector F is used for description. That is, a quantity of sectors F is equal to a quantity of directional antennas 121, there is a one-to-one correspondence between the sectors F and the directional antennas 121, and a beam of each directional antenna 121 is located in a corresponding sector F. For example, with reference to FIG. 7, there are three sectors F and three directional antennas 121, the three directional antennas 121 are in a one-to-one correspondence with the three sectors F, and a beam of each directional antenna 121 is located in a corresponding sector F.

Central angles of the plurality of sectors F may be equal or may not be equal. In the following embodiments, an example in which the central angles of the plurality of sectors Fare equal is used for description. In some embodiments, it is assumed that there are N sectors F, N is a positive integer greater than 1, and a central angle of each sector F is 360°/N. For example, with reference to FIG. 7, the quantity of sectors F is 3, 3 is a positive integer greater than 1, and a central angle of each sector F is 120°. In this way, the following rotation driving control is facilitated.

In some embodiments, in the plurality of sectors F, two adjacent sectors F may overlap or may not overlap. In some embodiments, still with reference to FIG. 7, the plurality of sectors Fare head-to-tail connected in a circumferential direction of the first axis O1, that is, two adjacent sectors F have one overlapping radius edge, and areas other than the radius edge do not overlap. For example, with reference to FIG. 7, the two adjacent sectors in the plurality of sectors Fare a first sector F1 and a second sector F2, the first sector F1 has a first radius edge a1, the second sector F2 has a second radius edge a2, the first radius edge a1 overlaps the second radius edge a2, and an area of the first sector F1 other than the first radius edge a1 does not overlap an area of the second sector F2 other than the second radius edge a2. In this way, the plurality of sectors F cover a 360° range area around the first axis O1, and a coverage area is relatively wide. In addition, there is a relatively low possibility that two adjacent directional antennas 121 cover a same target user, to facilitate proper resource configuration.

Still with reference to FIG. 5A, the driving apparatus 122 is configured to drive the plurality of directional antennas 121 to rotate relative to the housing 11, to respectively adjust the beam directions of the plurality of directional antennas 121 in the plurality of sectors F. In some embodiments, the driving apparatus 122 is configured to drive the plurality of directional antennas 121 to rotate relative to the housing 11 on the XY plane, to respectively adjust the beam directions of the plurality of directional antennas 121 in the plurality of sectors F. Therefore, the wireless access device 10 can cover target user equipment.

In this way, the directional antenna 121 has a high gain characteristic and can support single-user/Mesh networking signal enhancement. On this basis, the beams of the plurality of directional antennas 121 are respectively located in the plurality of sectors F, and the driving apparatus 122 drives the plurality of directional antennas 121 to respectively rotate in the plurality of sectors F, to switch the beam directions of the plurality of directional antennas 121. This can increase a coverage area of the directional antenna 121, and can improve dead-zone coverage performance at an edge. Compared with an electrical switching manner, this can reduce a quantity of disposed directional antennas 121 and therefore reduce costs while implementing a same coverage area. In addition, the plurality of directional antennas 121 are driven to respectively rotate in the sectors F in which the plurality of directional antennas are located, to reduce a rotation angle of the directional antenna 121. In this way, for a scenario in which UE is followed, a delay can be reduced, a response speed can be improved, and user experience can be improved. In addition, because the rotation angle of the directional antenna 121 is relatively small, a risk that a feed cable is wound, knotted, and worn can be lowered, to improve operation stability of the device. Therefore, the wireless access device 10 provided in this embodiment of this application features a high gain, wide coverage, high-speed response, and relatively high operation stability compared with that in the conventional technology.

In the foregoing embodiment, a manner in which the driving apparatus 122 drives the plurality of directional antennas 121 to rotate includes but is not limited to synchronous driving and asynchronous driving.

In some embodiments, still with reference to FIG. 3 and FIG. 5A, the antenna assembly 12 further includes a first support 123. A material of the first support 123 includes but is not limited to plastic. The plurality of directional antennas 121 are fastened to the first support 123. A manner of fastening the plurality of directional antennas 121 to the first support 123 includes but is not limited to bonding, clamping, and threaded connection, or the plurality of directional antennas 121 are directly formed on the first support 123.

On the foregoing basis, the driving apparatus 122 includes a driving member 1221, and the driving member 1221 is a rotation driving member. Specifically, the driving member 1221 may be a rotary motor or a combination of a rotary motor and a reducer. A type of the rotary motor includes but is not limited to a servo motor, a stepper motor, a torque motor, a switched reluctance motor, and a brushless direct current motor. The driving member 1221 is connected to the first support 123, and the driving member 1221 is configured to drive the first support 123 to rotate around an axis. The rotation axis around which the driving member 1221 drives the first support 123 to rotate is collinear with the first axis O1, to drive the plurality of directional antennas 121 to synchronously rotate, so as to respectively adjust the beam directions of the plurality of directional antennas 121 in the plurality of sectors F.

This driving manner is a synchronous driving manner. In this driving manner, rotation axes of the plurality of directional antennas 121 and the beams of the plurality of directional antennas 121 are all the first axis O1, and in a process in which the beam directions of the plurality of directional antennas 121 are adjusted to enable the wireless access device 10 to cover the target user equipment, rotation directions and rotation angles of the plurality of directional antennas 121 and the beams of the plurality of directional antennas 121 are the same.

Figure 8:
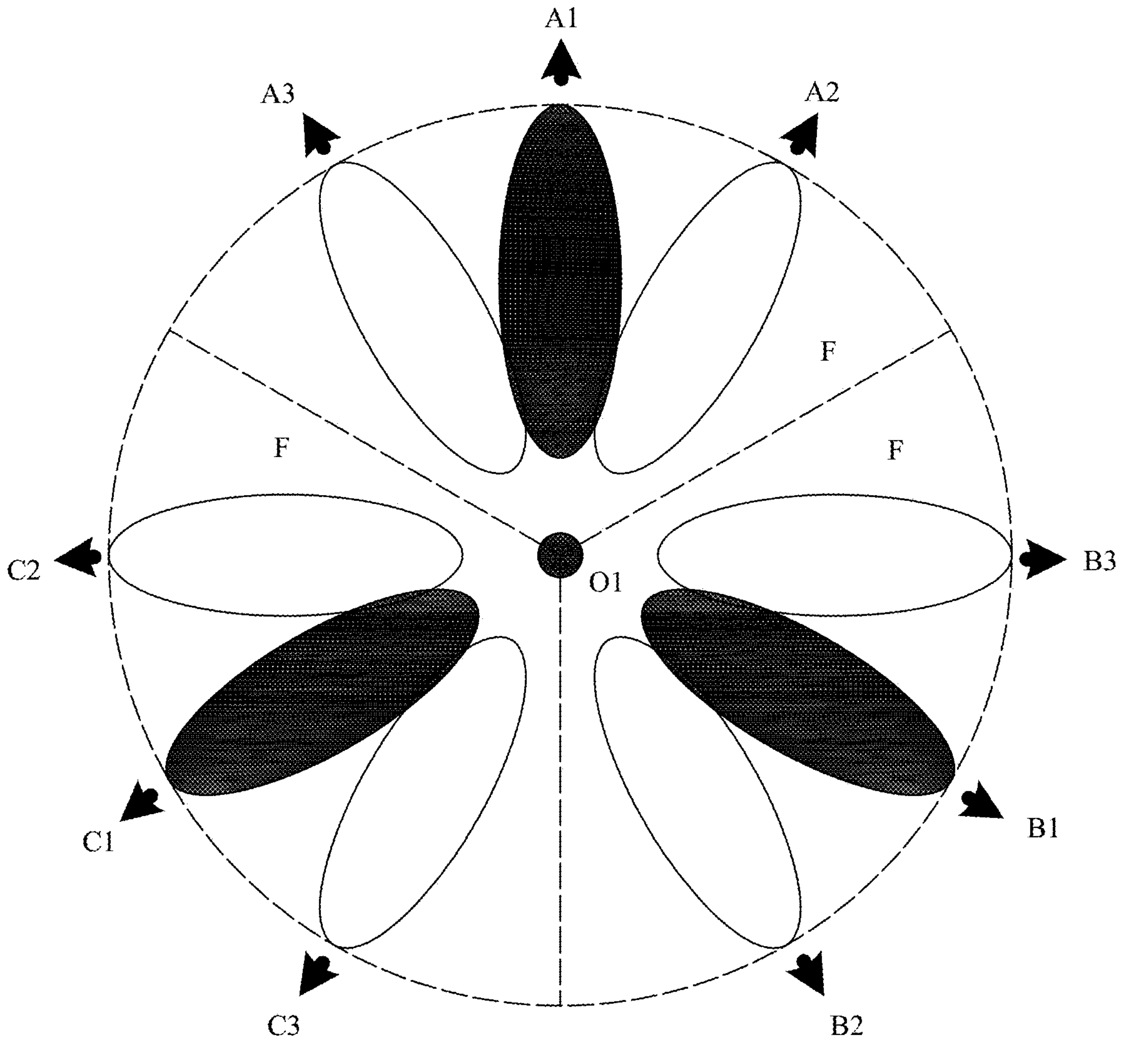
FIG. 8 is a schematic diagram of beam directions of three directional antennas in the antenna assembly shown in FIG. 5A.

For example, refer to FIG. 8. FIG. 8 is a schematic diagram of beam directions of three directional antennas 121 in the antenna assembly 12 shown in FIG. 5A. Current beam directions of the three directional antennas 121 are A1, B1, and C1. Under driving of the driving apparatus 122, when a beam in the direction A1 rotates to a direction A2, a beam in the direction B1 synchronously rotates to a direction B2, and a beam in the direction C1 synchronously rotates to a direction C2; and when the beam in the direction A1 rotates to a direction A3, the beam in the direction B1 synchronously rotates to a direction B3, and the beam in the direction C1 synchronously rotates to a direction C3. Beam rotation directions and rotation angles of the three directional antennas 121 are the same.

This driving manner is a synchronous driving manner, and the driving apparatus 122 has a simple composition structure, relatively low costs, and relatively small assembly difficulty, to help reduce costs and assembly difficulty of the wireless access device 10. This can improve edge coverage performance of a single-user device or coverage performance of some multi-user devices.

On the foregoing basis, to support the driving apparatus 122 and the first support 123 in the foregoing embodiment, still with reference to FIG. 5A, the antenna assembly 12 further includes a second support 124. A material of the second support 124 includes but is not limited to plastic. The second support 124 has a plurality of structural forms, including but not limited to a block shape, a frame shape, a plate shape, and the like. The second support 124 is fastened in the housing 11. A manner of fastening the second support 124 and the housing 11 includes but is not limited to threaded connection, clamping, riveting, and bonding.

In some embodiments, still with reference to FIG. 5A and with reference to FIG. 3, the second support 124 includes a support plate 124*a* and a plurality of support pillars 124*b*. The support plate 124*a* is opposite to and spaced apart from the bottom plate 111*a* of the housing 11. The plurality of support pillars 124*b* are disposed between the support plate 124*a* and the bottom plate 111*a*, and for each of the plurality of support pillars 124*b*, one end is fastened to the support plate 124*a*, and the other end is fastened to the bottom plate 111*a*. In some embodiments, the plurality of support pillars 124*b* are integrally formed with the support plate 124*a*, and the plurality of support pillars 124*b* are fixedly connected to the bottom plate 111*a* through bonding, threaded connection, clamping, or riveting, or in another manner. The plurality of support pillars 124*b* are evenly arranged around an edge of the support plate 124*a*. There may be two, three, four, or five support pillars 124*b*, or the like. In this embodiment, four support pillars 124*b* are used as an example for description.

In this way, the second support 124 is fastened to the bottom plate 111*a* of the housing 11. This structure is simple, facilitates mounting of the second support 124 in the housing 11, uses a relatively small quantity of materials, and has relatively low costs.

On the basis of the foregoing embodiment, the first support 123 may be rotatably connected to the second support 124 around an axis. Specifically, the first support 123 may be rotatably connected to the support plate 124*a* of the second support 124, for example, may be rotatably connected to the support plate 124*a* by using a rotating shaft. The rotation axis of the first support 123 relative to the support plate 124*a* is collinear with the first axis O1. In this way, the first support 123 is supported by using the second support 124, to facilitate mounting and disassembly operations.

Figure 5B:
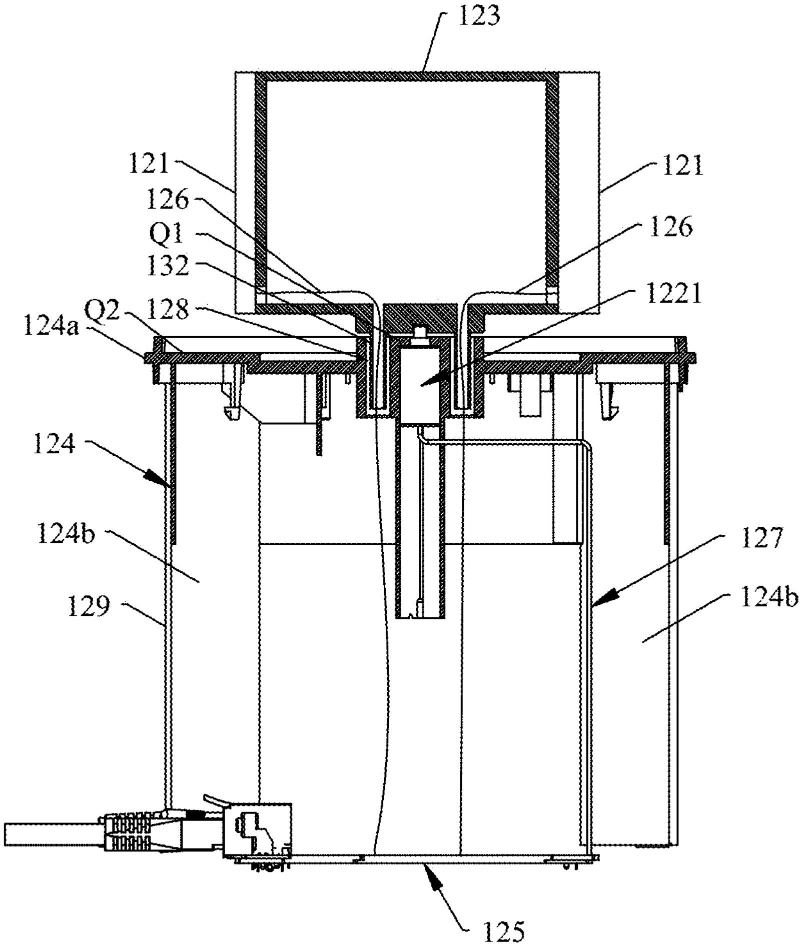
FIG. 5B is a cross-sectional view of an antenna assembly in the electronic device shown in FIG. 3.

In the foregoing embodiment, refer to FIG. 5B. FIG. 5B is a cross-sectional view of the antenna assembly 12 in the electronic device 10 shown in FIG. 3. The driving member 1221 of the driving apparatus 122 is disposed on a side that is of the support plate 124*a* and that is away from the first support 123. A stator (which may be a housing) of the driving member 1221 may be fastened to the support plate 124*a*, and a part of a rotor (which may be an output shaft) of the driving member 1221 penetrates through the support plate 124*a* and is fastened to the first support 123. In this way, the driving apparatus 122 is supported by using the second support 124. This structure is simple, and facilitates mounting and disassembly operations.

It should be noted that the second support 124 is not limited to the structure in the foregoing shape, or may be a structure in any other shape, provided that the driving apparatus 122 and the first support 123 can be supported. Details are not described herein again.

On the basis of the foregoing embodiment, to provide signals for the plurality of directional antennas 121 and the driving apparatus 122, in some embodiments, still with reference to FIG. 5A, the antenna assembly 12 further includes a circuit board assembly 125. The circuit board assembly 125 includes a circuit board and an electronic component disposed on the circuit board, and the electronic component includes but is not limited to a chip. The circuit board assembly 125 may include one circuit board and an electronic component disposed on the circuit board, or may include a plurality of circuit boards and electronic components disposed on the circuit boards. This is not specifically limited herein.

In some embodiments, with reference to both FIG. 3 and FIG. 5A, the circuit board assembly 125 is disposed on a side that is of the support plate 124*a* and that is away from the first support 123, and the circuit board assembly 125 is also located on a side that is of the support plate 124*a* and that is away from the plurality of directional antennas 121. In some embodiments, the circuit board assembly 125 and the housing 11 are fastened relative to each other. Specifically, the circuit board assembly 125 is fastened to the bottom plate 111*a*, and is located between the plurality of support pillars 124*b*. In this way, the circuit board assembly 125 can be accommodated by using space enclosed by the plurality of support pillars 124*b*, to effectively use the space. Certainly, the circuit board assembly 125 may alternatively be disposed at another position. This is not specifically limited herein.

On the foregoing basis, still with reference to FIG. 5A and FIG. 5B, the antenna assembly 12 further includes a plurality of feed cables 126 and a drive cable 127.

The feed cable 126 may be a coaxial cable, and the plurality of feed cables 126 are respectively connected between the circuit board assembly 125 and the plurality of directional antennas 121, to generate a radio frequency signal through the circuit board assembly 125, and transmit the radio frequency signal to the plurality of directional antennas 121, so as to implement signal transmission. In addition, a signal received by the plurality of directional antennas 121 may be further transmitted to the circuit board assembly 125 through the plurality of feed cables 126, to demodulate the received signal.

In addition, the drive cable 127 is connected between the driving member 1221 and the circuit board assembly 125, to generate a drive signal through the circuit board assembly 125, and transmit the drive signal to the driving member 1221, so as to drive the driving member 1221.

On the basis of the foregoing embodiment, due to a limitation imposed by a position of a connected part, the plurality of feed cables 126 need to span the support plate 124*a*. On this basis, to facilitate cabling and ensure appearance cleanliness, in some embodiments, mainly with reference to FIG. 5B, at least one cable-through slot 128 is disposed on the support plate 124*a*, where "at least one" means one or more, and the plurality of feed cables 126 penetrate through the at least one cable-through slot 128. In this way, the plurality of feed cables 126 penetrate through the support plate 124*a*, to facilitate cabling and ensure appearance cleanliness.

Figure 9:
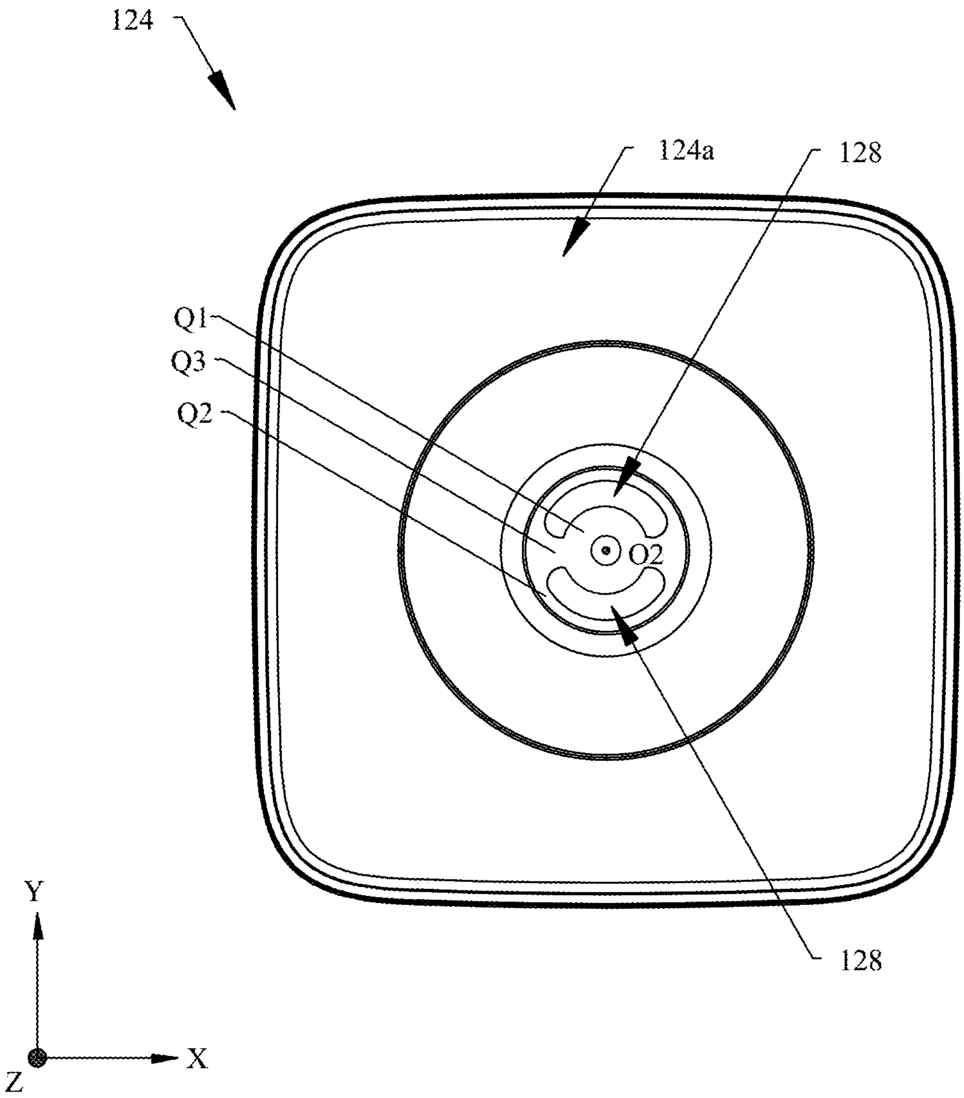
FIG. 9 is a top view of a second support in the antenna assembly shown in FIG. 5A and FIG. 5B.

In some embodiments, refer to FIG. 9. FIG. 9 is a top view of the second support 124 in the antenna assembly 12 shown in FIG. 5A and FIG. 5B. There are a plurality of cable-through slots 128, and the plurality of cable-through slots 128 are distributed along a ring array. A central axis of the ring array of the plurality of cable-through slots 128 is a second axis O2. The second axis O2 is collinear with the first axis O1. At least one feed cable 126 penetrates through each cable-through slot 128. In this way, the plurality of feed cables 126 are separated by using the plurality of cable-through slots 128, to avoid winding or knotting of the plurality of feed cables 126. For example, with reference to FIG. 9, there are two cable-through slots 128.

In a working process of the antenna assembly 12, the directional antenna 121 rotates relative to the circuit board assembly 125 under driving of the driving apparatus 122. Therefore, the feed cable 126 connected between the directional antenna 121 and the circuit board assembly 125 swings with rotation of the directional antenna 121. Based on this, to avoid a problem that the feed cable 126 is stuck or worn in the cable-through slot 128, still with reference to FIG. 9, the cable-through slot 128 may be a long slot, the long slot is an arc-shaped long slot extending around the second axis O2, and the second axis O2 is a central line of the arc-shaped long slot. In this way, in a swing process, the feed cable 126 can slide along the cable-through slot 128, to lower a risk that the feed cable 126 is stuck and worn in the cable-through slot 128. In some embodiments, a width of the cable-through slot 128 may range from 3 millimeters (mm) to 8 mm. For example, the width of the cable-through slot 128 may be 5 mm.

On the foregoing basis, optionally, still with reference to FIG. 5B, a cable-through sleeve 132 is disposed in each cable-through slot 128. The cable-through sleeve 132 is fastened to the first support 123, the at least one feed cable 126 penetrating through the cable-through slot 128 is accommodated in the cable-through sleeve 132, and the cable-through sleeve 132 and the feed cable 126 penetrating through the cable-through slot 128 slide in the cable-through slot 128 as a whole, to minimize a risk that the feed cable 126 is stuck and worn in the cable-through slot 128.

It should be noted that the support plate 124*a* is further configured to support the driving member 1221. Specifically, with reference to both FIG. 5B and FIG. 9, the support plate 124*a* includes a first area Q1 and a second area Q2. The first area Q1 is surrounded by the plurality of cable-through slots 128. The first area Q1 is used to fasten the stator of the driving member 1221, to support the driving member 1221. The second area Q2 is located on a side that is of the plurality of cable-through slots 128 and that is away from the first area Q1, and surrounds the plurality of cable-through slots 128. The second area Q2 is connected to the plurality of support pillars 124*b*, and is connected to the bottom plate 111*a* by using the plurality of support pillars 124*b*.

On the foregoing basis, to ensure support strength of the first area Q1 for the driving member 1221, a specific gap width should be reserved between two adjacent cable-through slots 128. Specifically, the support plate 124*a* further includes a connection area Q3. The connection area Q3 is connected between the first area Q1 and the second area Q2, and in a direction around the second axis O2, the connection area Q3 is located between the two adjacent cable-through slots 128. The connection area Q3 needs to meet a specific width, so that the first area Q1 can be stably connected to the second area Q2, to ensure support strength of the first area Q1 for the driving member 1221. However, in this way, a sum of central angles of the plurality of cable-through slots 128 is relatively small, and is less than 360°. In this case, a sum of angles at which the plurality of feed cables 126 slide in the plurality of cable-through slots 128 is also relatively small, swing flexibility of the plurality of feed cables 126 is limited, and there is a risk that the feed cable 126 is stuck and worn in a swing process.

Figure 10:
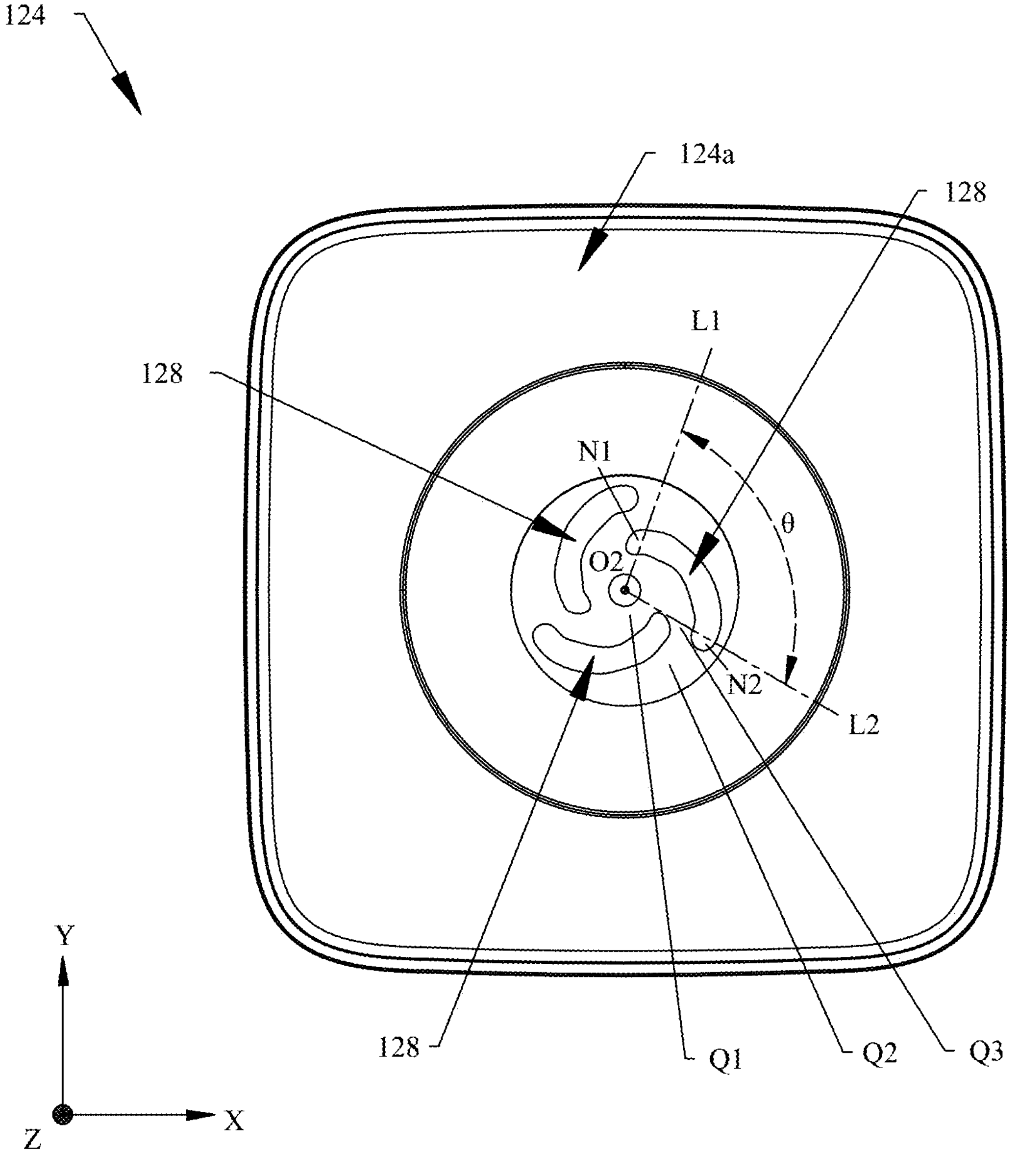
FIG. 10 is a top view of a second support according to some other embodiments of this application.

To resolve the foregoing problem, in some embodiments, refer to FIG. 10. FIG. 10 is a top view of the second support 124 according to some other embodiments of this application. In this embodiment, the plurality of cable-through slots 128 are centrally symmetrically distributed relative to the second axis O2. On this basis, the plurality of cable-through slots 128 are also long slots, and the long slot has a first end N1 and a second end N2 that are opposite to each other. The long slot extends around the second axis O2 from the first end N1 to the second end N2, and a distance (which is specifically a vertical distance) between the first end N1 and the second axis O2 is not equal to a distance (which is specifically a vertical distance) between the second end N2 and the second axis O2. In some embodiments, with reference to FIG. 10, the distance between the first end N1 and the second axis O2 is less than the distance between the second end N2 and the second axis O2. In some other embodiments, the distance between the first end N1 and the second axis O2 may alternatively be greater than the distance between the second end N2 and the second axis O2. This is not specifically limited herein.

That the long slot extends around the second axis O2 means that a central angle θ of the long slot relative to the second axis O2 is greater than 0°. Specifically, the central angle θ of the long slot relative to the second axis O2 is an included angle between a vertical line L1 between the first end N1 of the long slot and the second axis O2 and a vertical line L2 between the second end N2 and the second axis O2.

On the foregoing basis, at least one feed cable 126 penetrates through each cable-through slot 128, and the at least one feed cable 126 is capable of sliding along the cable-through slot 128.

In this way, in the direction around the second axis O2, in two adjacent cable-through slots 128, a second end N2 of one cable-through slot 128 is located on a side that is of a first end N1 of the other cable-through slot 128 and that is away from the second axis O2 or close to the second axis O2. Specifically, when the distance between the first end N1 and the second axis O2 is less than the distance between the second end N2 and the second axis O2, with reference to FIG. 10, in two adjacent cable-through slots 128, a second end N2 of one cable-through slot 128 is located on a side that is of a first end N1 of the other cable-through slot 128 and that is away from the second axis O2. When the distance between the first end N1 and the second axis O2 is greater than the distance between the second end N2 and the second axis O2, in two adjacent cable-through slots 128, a second end N2 of one cable-through slot 128 is located on a side that is of a first end N1 of the other cable-through slot 128 and that is close to the second axis O2. In this way, the two adjacent cable-through slots 128 are disposed in a staggered manner. This can increase a central angle of the cable-through slot 128 relative to the second axis O2, improve swing flexibility of the feed cable 126, and lower a risk of winding, knotting, and wear. In addition, it can be ensured that there is a connection area Q3 with a specific width between the two adjacent cable-through slots 128, to stably connect the first area Q1 to the second area Q2, so as to ensure support stability of the first area Q1 for the driving member 1221.

In the foregoing embodiment, an extension path of the cable-through slot 128 from the first end N1 to the second end N2 may be a straight line, or may be an arc, and an arching direction of the arc may be a direction away from the second axis O2, or may be a direction of approaching the second axis O2. In the embodiment shown in FIG. 10, the extension path of the cable-through slot 128 from the first end N1 to the second end N2 is an arc, and an arching direction of the arc is a direction away from the second axis O2. In this way, the feed cable 126 slides along the cable-through slot 128 with relatively high smoothness and relatively little wear.

Figure 11:
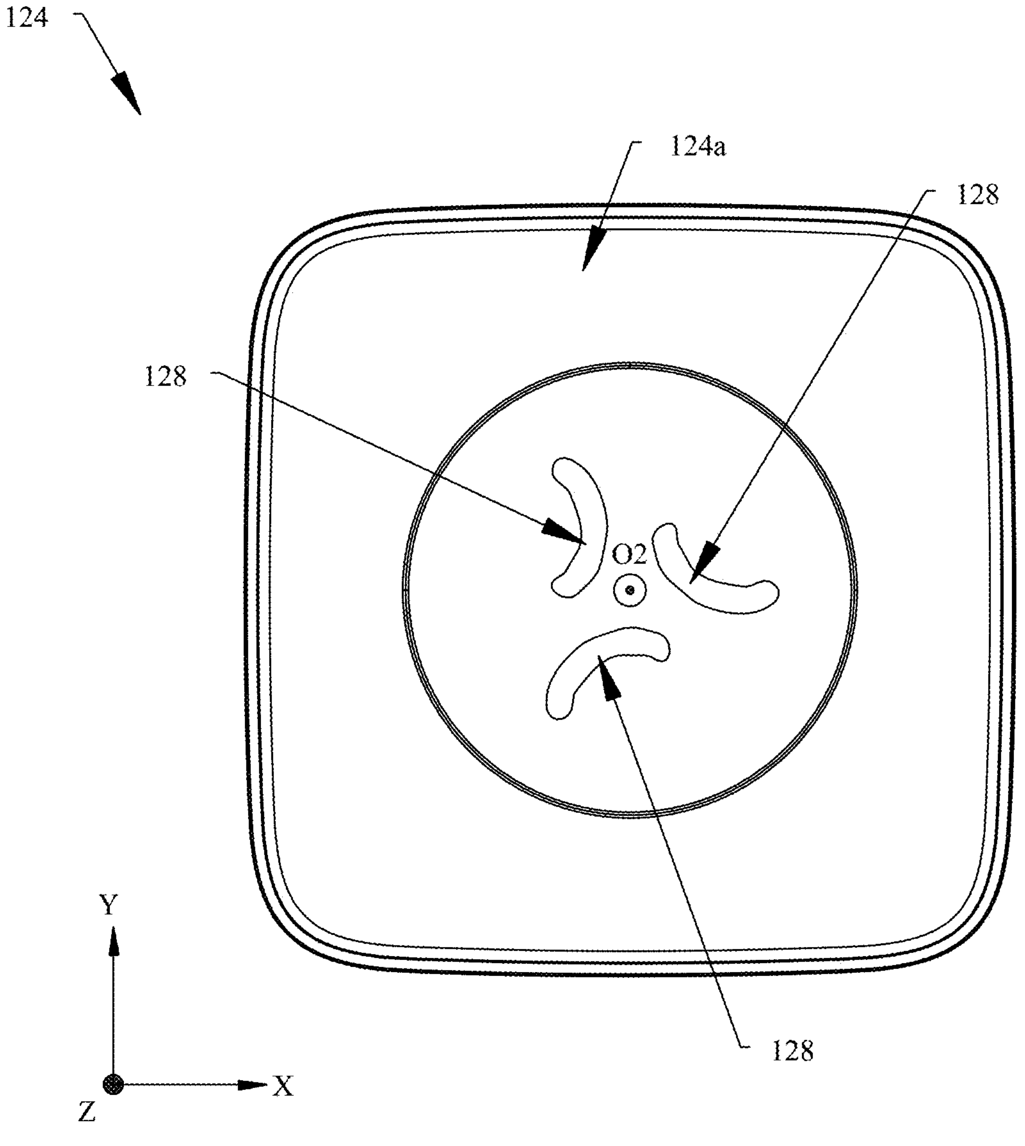
FIG. 11 is a top view of a second support according to some other embodiments of this application.

Refer to FIG. 11. FIG. 11 is a top view of a second support 124 according to some other embodiments of this application. In this embodiment, the extension path of each of the plurality of cable-through slots 128 from the first end N1 to the second end N2 is a straight line. In this way, the cable-through slot 128 has a regular shape and is easy to process.

Figure 12:
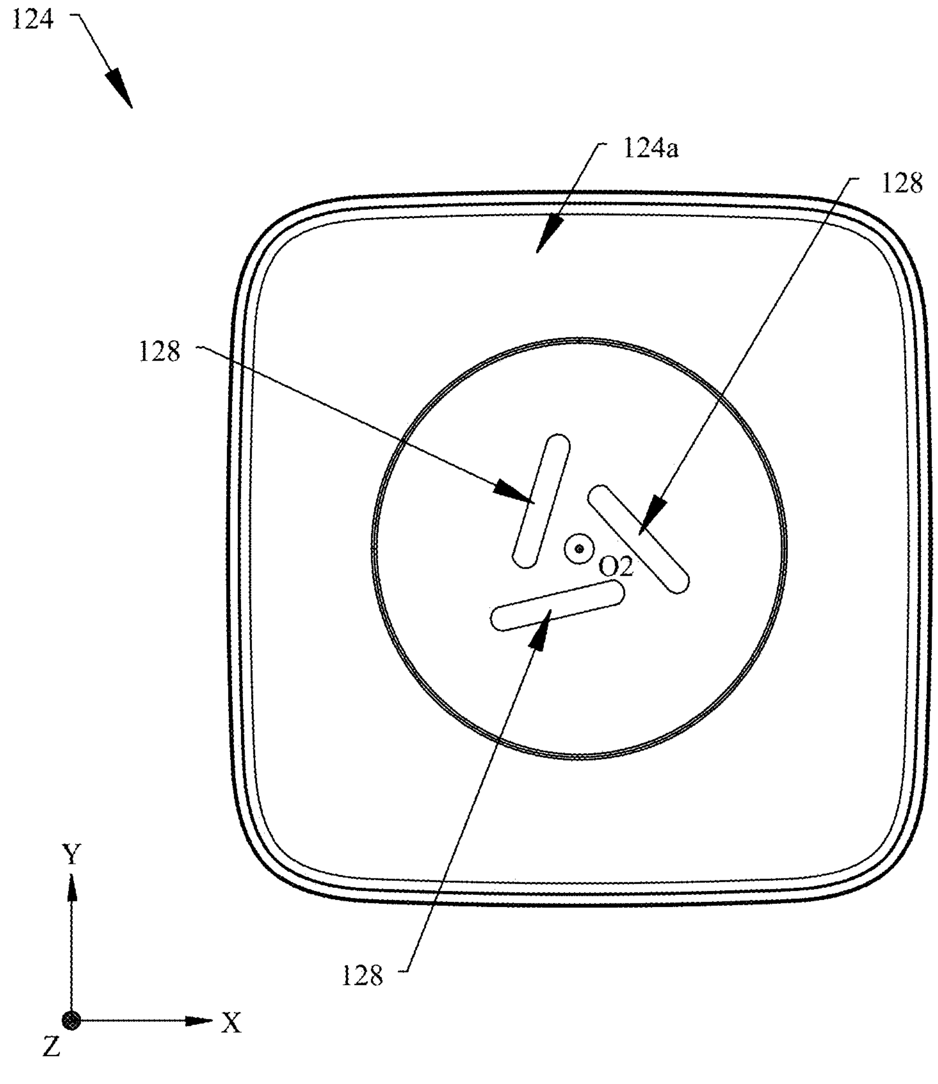
FIG. 12 is a top view of a second support according to some other embodiments of this application.

Refer to FIG. 12. FIG. 12 is a top view of a second support 124 according to some other embodiments of this application. In this embodiment, the extension path of each of the plurality of cable-through slots 128 from the first end N1 to the second end N2 is an arc, and an arching direction of the arc is a direction of approaching the second axis O2. The cable-through slot 128 has a regular shape and is easy to process.

It should be noted that the extension path of the cable-through slot 128 from the first end N1 to the second end N2 may alternatively be in other shapes, provided that extension around the second axis O2 from the first end N1 to the second end N2 is implemented, and the distance between the first end N1 and the second axis O2 is not equal to the distance between the second end N2 and the second axis O2. The other shapes are not listed one by one herein.

In some embodiments, it is assumed that there are M cable-through slots 128, M is a positive integer greater than 1, and a central angle θ of each cable-through slot 128 relative to the second axis O2 is greater than or equal to (360/M)°.

Specifically, there may be two, three, or four cable-through slots 128, or the like. A larger quantity of cable-through slots 128 indicates lower structural strength of the support plate 124*a*, and a smaller quantity of cable-through slots 128 indicates a higher possibility that the feed cable 126 is wound or knotted. Based on this, in some embodiments, a quantity of cable-through slots 128 may be equal to the quantity of directional antennas 121, the plurality of cable-through slots 128 are in a one-to-one correspondence with the plurality of directional antennas 121, and feed cables 126 connected to the directional antennas 121 penetrate through the cable-through slots 128 corresponding to the directional antennas 121. In this way, there are a moderate quantity of cable-through slots 128, and both structural strength of the support plate 124*a* and a possibility that the feed cable 126 is wound and knotted can be considered.

For example, with reference to FIG. 10, FIG. 11, or FIG. 12, there are three cable-through slots 128. Feed cables 126 of three directional antennas 121 respectively penetrate through the three cable-through slots 128 in a one-to-one correspondence. On this basis, in the three cable-through slots 128, a central angle θ of each cable-through slot 128 relative to the second axis O2 is greater than or equal to 120°.

In this way, a sum of central angles θ of the plurality of cable-through slots 128 relative to the second axis O2 is greater than or equal to 360°, to ensure swing flexibility of the feed cable 126 as much as possible, and lower a risk of sticking and wear.

Figure 13:
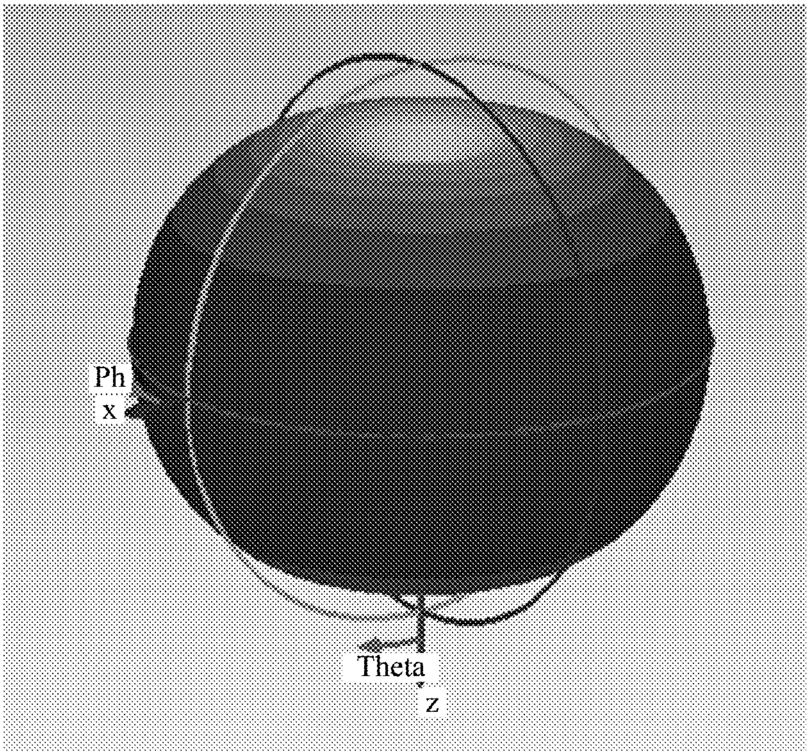
FIG. 13 is a directivity pattern of an omnidirectional antenna in three-dimensional space according to some embodiments of this application.

Still with reference to FIG. 5A, the antenna assembly 12 may further include an omnidirectional antenna 129. Refer to FIG. 13. FIG. 13 is a directivity pattern of an omnidirectional antenna 129 in three-dimensional space according to some embodiments of this application. A beam of the omnidirectional antenna 129 is approximately in an “apple” shape, that is, the omnidirectional antenna 129 performs 360° homogeneous radiation on a plane perpendicular to a central axis of the beam, and can implement short-distance coverage in a 360° range of the plane, to meet an access requirement of an ordinary user. In some embodiments, the central axis of the beam of the omnidirectional antenna 129 is collinear with the first axis O1. In some other embodiments, the central axis of the beam of the omnidirectional antenna 129 may alternatively intersect with or be perpendicular to the first axis O1. This is not specifically limited herein.

In some embodiments, the omnidirectional antenna 129 and the housing 11 are fastened relative to each other. Specifically, in some embodiments, still with reference to FIG. 5A, the omnidirectional antenna 129 is disposed on the support pillar 124*b* of the second support 124. In this way, the omnidirectional antenna 129 is supported by using the support pillar 124*b*, and no support structure needs to be additionally disposed. Therefore, structural complexity of the antenna assembly 12 can be reduced, to reduce assembly difficulty.

There may be one or more omnidirectional antennas 129. In some embodiments, still with reference to FIG. 5A, there are a plurality of omnidirectional antennas 129, and the plurality of omnidirectional antennas 129 are respectively disposed on the plurality of support pillars 124*b*. For example, with reference to FIG. 5A, there are four omnidirectional antennas 129, the four omnidirectional antennas 129 are in a one-to-one correspondence with the four support pillars 124*b*, and each omnidirectional antenna 129 is disposed on a support pillar 124*b* corresponding to the omnidirectional antenna 129. In this way, transmission and receiving of a plurality of different channel signals may be supported by using the plurality of omnidirectional antennas 129, to improve application universality of the wireless access device 10.

On the basis of the foregoing embodiment, still with reference to FIG. 5A, the circuit board assembly 125 is further connected to the plurality of omnidirectional antennas 129, to provide a radio frequency signal for the plurality of omnidirectional antennas 129, and demodulate a signal received by the plurality of omnidirectional antennas 129.

Figure 14:
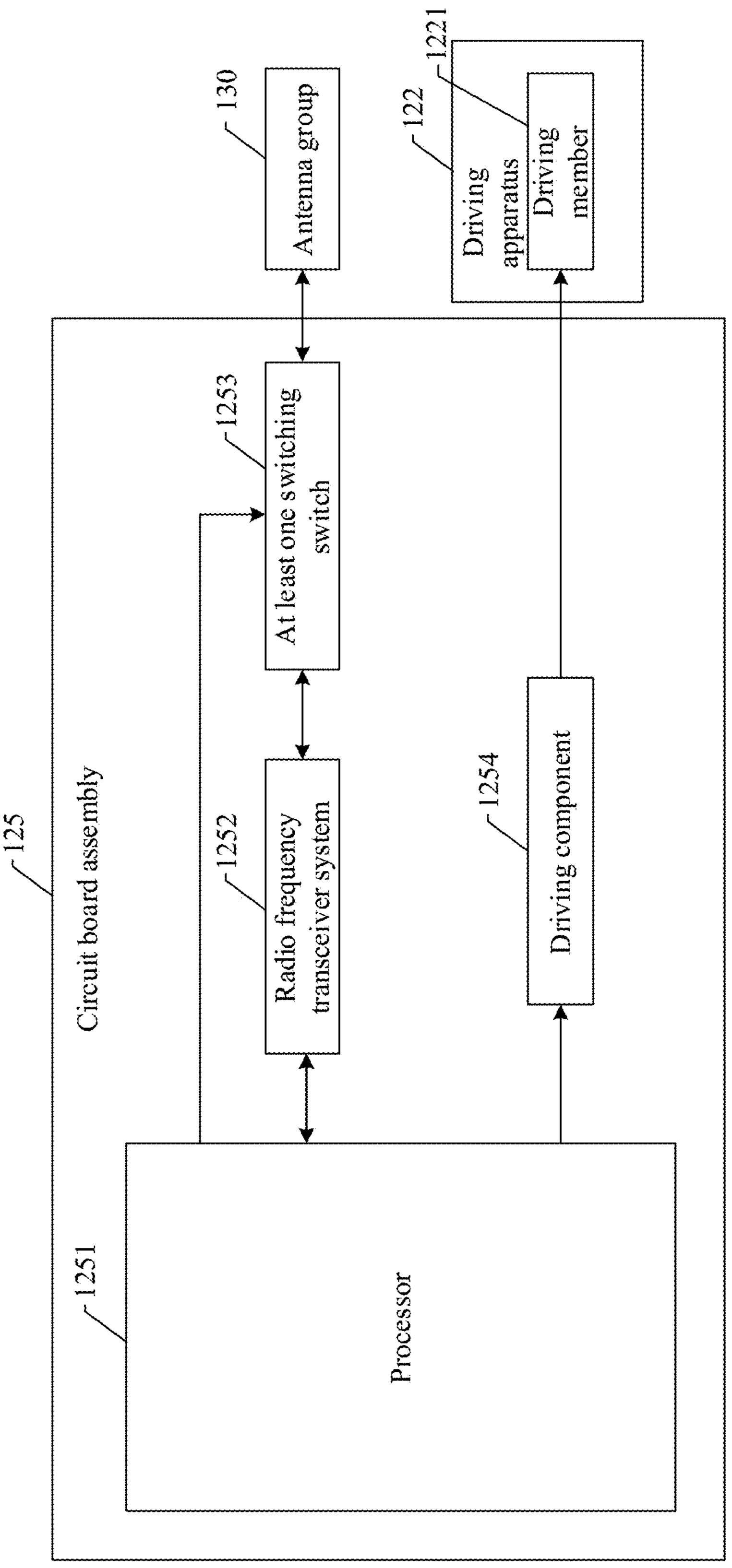
FIG. 14 is a circuit diagram of the antenna assembly shown in FIG. 5A.

In conclusion, it may be learned that the circuit board assembly 125 is configured to provide a radio frequency (radio frequency, RF) signal for the plurality of directional antennas 121 and the plurality of omnidirectional antennas 129. Specifically, refer to FIG. 14. FIG. 14 is a circuit diagram of the antenna assembly 12 shown in FIG. 5A. In the antenna assembly 12, the circuit board assembly 125 includes a processor 1251 and a radio frequency transceiver system 1252.

The processor 1251 may include one or more processing units. For example, the processor 1251 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The processor 1251 is configured to generate a transmission signal or process a received signal. The radio frequency transceiver system 1252 is configured to: receive the transmission signal generated by the processor 1251, modulate the transmission signal to generate a radio frequency signal, and output the radio frequency signal to an antenna group 130, to implement signal transmission. In addition, the radio frequency transceiver system 1252 is further configured to: receive a radio frequency signal from the antenna group 130, demodulate the radio frequency signal to generate a received signal, and transmit the received signal to the processor 1251, to implement signal receiving. The antenna group 130 includes the plurality of directional antennas 121 and the plurality of omnidirectional antennas 129.

To enable the radio frequency transceiver system 1252 to provide different signals for a plurality of antennas in the antenna group 130, the radio frequency transceiver system 1252 may be a multi-input multi-output (multi-input multi-output, MIMO) system. In some embodiments, the radio frequency transceiver system 1252 includes a plurality of radio frequency transceivers (also referred to as radio frequency transceiver links or TRx). A quantity of the plurality of radio frequency transceivers is equal to a quantity of antennas in the antenna group 130 (that is, a sum of the quantity of directional antennas 121 and the quantity of omnidirectional antennas 129), there is a one-to-one correspondence between the plurality of radio frequency transceivers and the antennas, and each radio frequency transceiver is configured to implement signal transmission and receiving of a corresponding antenna. However, in this way, in the radio frequency transceiver system 1252, a larger quantity of radio frequency transceivers indicates higher structural complexity and higher costs of the radio frequency transceiver system 1252.

To reduce structural complexity and costs of the circuit board assembly 125, in some embodiments, the radio frequency transceiver system 1252 includes at least one radio frequency transceiver, and a quantity of the at least one radio frequency transceiver is less than the quantity of antennas in the antenna group 130. On this basis, still with reference to FIG. 14, the circuit board assembly 125 further includes at least one switching switch 1253. The at least one switching switch 1253 is connected between the at least one radio frequency transceiver and the antenna group 130. Based on this, the processor 1251 may further generate an operation control signal based on instruction operation code and a timing signal, to complete control of instruction fetching and instruction execution. Specifically, the processor 1251 is further connected to the at least one switching switch 1253, and the processor 1251 is configured to control the at least one switching switch 1253 to select at least one antenna in the antenna group 130 to be connected to the at least one radio frequency transceiver.

In this way, switching is performed by using the at least one switching switch 1253, so that a relatively small quantity of radio frequency transceivers can be used to implement signal transmission and receiving of a relatively large quantity of antennas, thereby reducing structural complexity and costs of the radio frequency transceiver system 1252.

Figure 15:
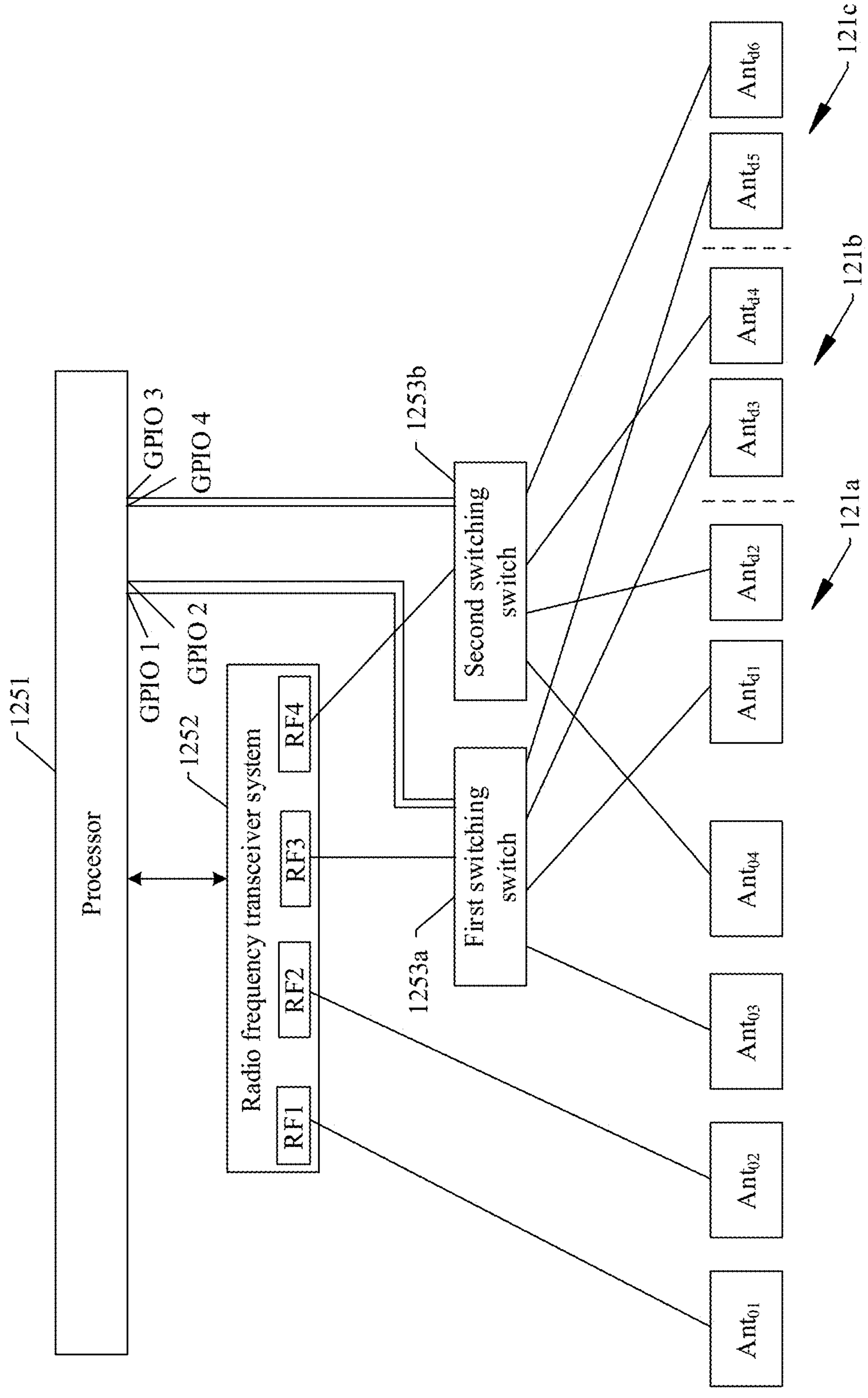
FIG. 15 is a schematic diagram of a connection structure of a processor, a radio frequency transceiver system, at least one switching switch, and an antenna group in a wireless access device shown in FIG. 14.

In some embodiments, refer to FIG. 15. FIG. 15 is a schematic diagram of a connection structure of the processor 1251, the radio frequency transceiver system 1252, the at least one switching switch 1253, and the antenna group 130 in the wireless access device 10 shown in FIG. 14. In this embodiment, the radio frequency transceiver system 1252 is a MIMO system, which may be specifically a 4×4 MIMO system, that is, a system with four outputs and four inputs. On this basis, the radio frequency transceiver system 1252 may include four radio frequency transceivers, and each radio frequency transceiver is configured to implement one output and one input. The four transmit receivers are a first radio frequency transceiver RF1, a second radio frequency transceiver RF2, a third radio frequency transceiver RF3, and a fourth radio frequency transceiver RF4.

In some embodiments, the four radio frequency transceivers may be configured to generate different channel signals. In this way, the antenna assembly 12 can transmit and receive four different channel signals. In some other embodiments, the four radio frequency signals generated by the four radio frequency transceivers may be signals on a same channel, or radio frequency signals generated by two or three radio frequency transceivers are signals on a same channel.

The quantity of the plurality of directional antennas 121 is 3, and a first directional antenna 121*a*, a second directional antenna 121*b*, and a third directional antenna 121*c* are specifically included. Each of the first directional antenna 121*a*, the second directional antenna 121*b*, and the third directional antenna 121*c* includes two antenna units whose polarization directions are orthogonal. Specifically, the first directional antenna 121*a* includes a first antenna unit $Ant_{d1}$ and a second antenna unit $Ant_{d2}$; the second directional antenna 121*b* includes a third antenna unit $Ant_{d3}$ and a fourth antenna unit $Ant_{d4}$; and the third directional antenna 121*c* includes a fifth antenna unit $Ant_{d5}$ and a sixth antenna unit $Ant_{d6}$.

The quantity of the plurality of omnidirectional antennas 129 is 4, and a first omnidirectional antenna $Ant_{O1}$, a second omnidirectional antenna $Ant_{O2}$, a third omnidirectional antenna $Ant_{O3}$, and a fourth omnidirectional antenna $Ant_{O4}$ are specifically included.

On the foregoing basis, the first radio frequency transceiver RF1 is connected to the first omnidirectional antenna $Ant_{O1}$, and the second radio frequency transceiver RF2 is connected to the second omnidirectional antenna $Ant_{O2}$.

A quantity of the at least one switching switch is 2, and a first switching switch 1253*a* and a second switching switch 1253*b* are specifically included. Each of the first switching switch 1253*a* and the second switching switch 1253*b* may be a single-pole multi-throw switch, and specifically may be a single-pole four-throw (SP4T) switch.

The first switching switch 1253*a* is connected between the third radio frequency transceiver RF3 and the third omnidirectional antenna $Ant_{O3}$, one antenna unit (for example, the first antenna unit $Ant_{d1}$) of the first directional antenna 121*a*, one antenna unit (for example, the third antenna unit $Ant_{d3}$) of the second directional antenna 121*b*, and one antenna unit (for example, the fifth antenna unit $Ant_{d5}$) of the third directional antenna 121*c*. On this basis, the processor 1251 is connected to the first switching switch 1253*a*, and the processor 1251 is configured to control the first switching switch 1253*a* to select one of the third omnidirectional antenna $Ant_{O3}$, the first antenna unit $Ant_{d1}$, the third antenna unit $Ant_{d3}$, and the fifth antenna unit $Ant_{d5}$ to be connected to the third radio frequency transceiver RF3.

In the foregoing embodiment, the processor 1251 includes two general purpose input/output ports (general purpose I/O ports, GPIO): a GPIO 1 and a GPIO 2. The processor 1251 separately outputs a high level or a low level by using the GPIO 1 and the GPIO 2, to control the first switching switch 1253*a* to select one of the third omnidirectional antenna $Ant_{O3}$, the first antenna unit $Ant_{d1}$, the third antenna unit $Ant_{d3}$, and the fifth antenna unit $Ant_{d5}$ to be connected to the third radio frequency transceiver RF3.

For example, when both the GPIO 1 and the GPIO 2 output a high level, the first switching switch 1253*a* selects the fifth antenna unit $Ant_{d5}$. In this case, the third radio frequency transceiver RF3 transmits and receives data through the fifth antenna unit $Ant_{d5}$. When both the GPIO 1 and the GPIO 2 output a low level, the first switching switch 1253*a* selects the third omnidirectional antenna $Ant_{O3}$. In this case, the third radio frequency transceiver RF3 transmits and receives data through the third omnidirectional antenna $Ant_{O3}$. When the GPIO 1 outputs a high level and the GPIO 2 outputs a low level, the first switching switch 1253*a* selects the first antenna unit $Ant_{d1}$. In this case, the third radio frequency transceiver RF3 transmits and receives data through the first antenna unit $Ant_{d1}$. When the GPIO 1 outputs a low level and the GPIO 2 outputs a high level, the first switching switch 1253*a* selects the third antenna unit $Ant_{d3}$. In this case, the third radio frequency transceiver RF3 transmits and receives data through the third antenna unit $Ant_{d3}$.

The second switching switch 1253*b* is connected between the fourth radio frequency transceiver RF4 and the fourth omnidirectional antenna $Ant_{O4}$, the other antenna unit (for example, the second antenna unit $Ant_{d2}$) of the first directional antenna 121*a*, the other antenna unit (for example, the fourth antenna unit $Ant_{d4}$) of the second directional antenna 121*b*, and the other antenna unit (for example, the sixth antenna unit $Ant_{d6}$) of the third directional antenna 121*c*. On this basis, the processor 1251 is connected to the second switching switch 1253*b*, and the processor 1251 is configured to control the second switching switch 1253*b* to select one of the fourth omnidirectional antenna $Ant_{O4}$, the second antenna unit $Ant_{d2}$, the fourth antenna unit $Ant_{d4}$, and the sixth antenna unit $Ant_{d5}$ to be connected to the fourth radio frequency transceiver RF4.

In the foregoing embodiment, the processor 1251 may further include a GPIO 3 and a GPIO 4. The processor 1251 separately outputs a high level or a low level by using the GPIO 3 and the GPIO 4, to control the second switching switch 1253*b* to select one of the fourth omnidirectional antenna $Ant_{O4}$, the second antenna unit $Ant_{d2}$, the fourth antenna unit $Ant_{d4}$, and the sixth antenna unit $Ant_{d5}$ to be connected to the fourth radio frequency transceiver RF4. A specific control method is similar to the control method of the first switching switch 1253*a*. Details are not described herein again.

In addition, if there are a small quantity of GPIOs in the processor, level states of the GPIOs are insufficient to cover all switch states. For example, if a manufacturer product includes only one GPIO port, a serial signal may be used to control the switch state. Specifically, a serial-parallel signal converter may be added, to convert high and low level information carried in a received group of serial signals into a group of parallel signals that respectively enable a plurality of switch states, so as to implement functions similar to those of the GPIOs 1~04.

This structure is simple, and two omnidirectional antennas (the first omnidirectional antenna $Ant_{O1}$ and the second omnidirectional antenna $Ant_{O2}$) are normally turned on, to meet an access requirement of an ordinary user. In addition, structural complexity and costs of the radio frequency transceiver system 1252 can be simplified by using the switching switch.

Still with reference to FIG. 14, the circuit board assembly 125 further includes a driving component 1254. In some embodiments, the driving component 1254 may be a driving chip. The driving component 1254 is connected between the processor 1251 and the driving member 1221, and the processor 1251 is further configured to control the driving component 1254 to drive the driving member 1221.

A specific structure of the antenna assembly 12 is described above. In the antenna assembly 12, still with reference to FIG. 3, the plurality of directional antennas 121 and the first support 123 are moving parts of the antenna assembly 12, and the moving parts are accommodated in the second accommodation space S2 of the upper housing 112 in the housing 11. The driving member 1221 of the driving apparatus 122, the second support 124, and the circuit board assembly 125 are static parts of the antenna assembly 12, and the static parts are accommodated in the first accommodation space S1 of the lower housing 111. Therefore, the static part can be shielded and protected by using the lower housing 111, and a movement process of the plurality of directional antennas 121 and the first support 123 can be visualized by using the upper housing 112 having a light transmission characteristic, to help the user check whether the device operates normally.

It should be noted that the antenna assembly 12 may have another structural form in addition to the structure described in the foregoing embodiment.

Figure 16:
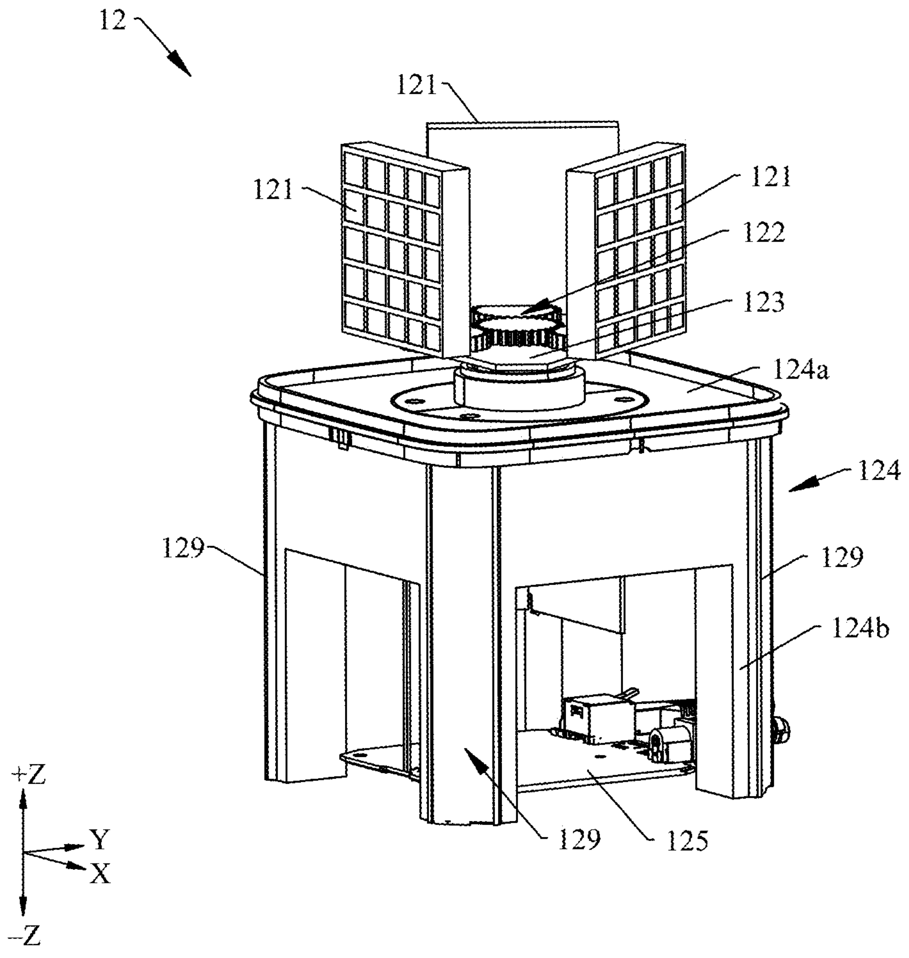
FIG. 16 is a three-dimensional view of an antenna assembly according to some other embodiments of this application.
Figure 17A:
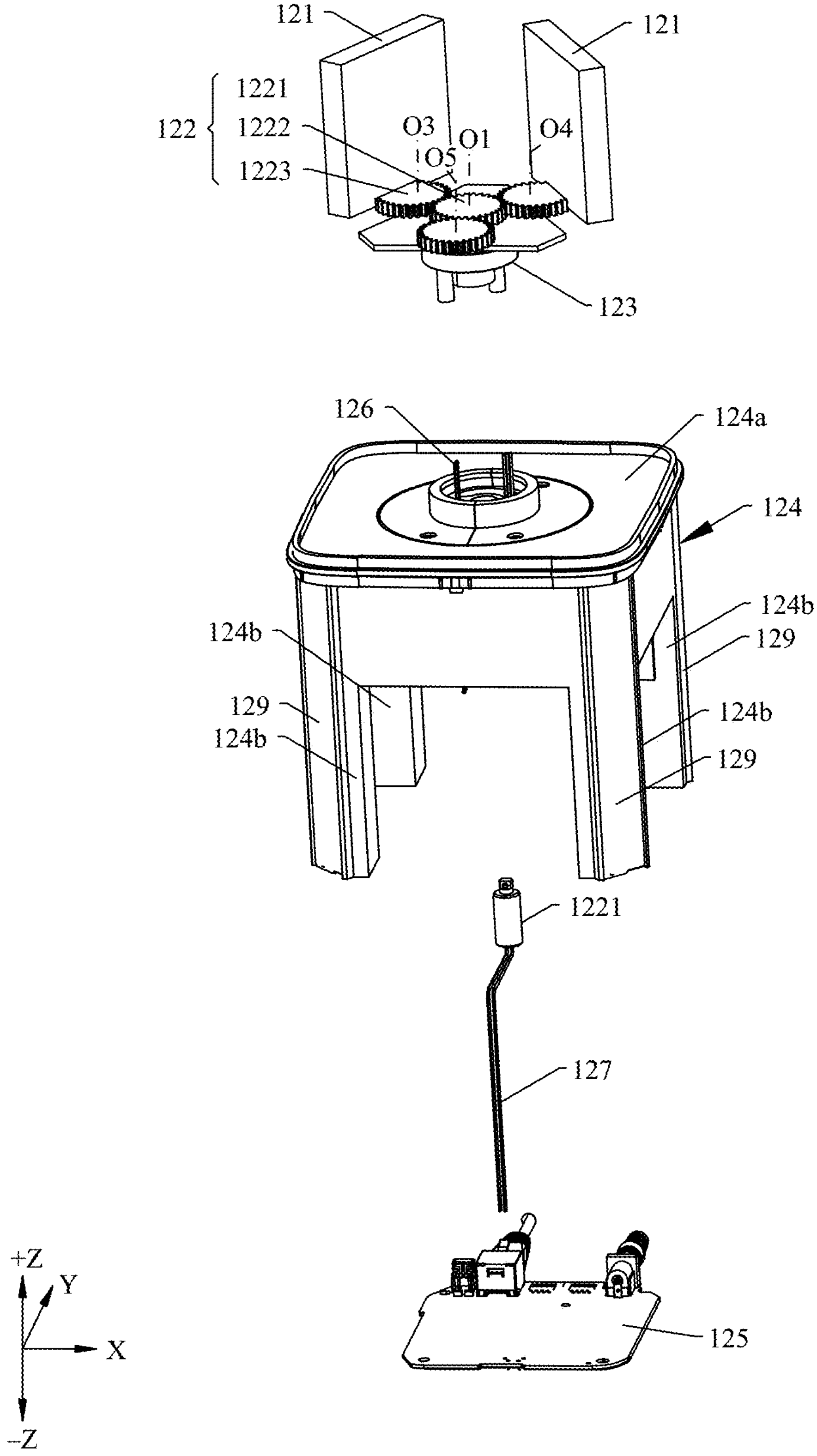
FIG. 17A is an exploded view of the antenna assembly shown in FIG. 16.
Figure 17B:
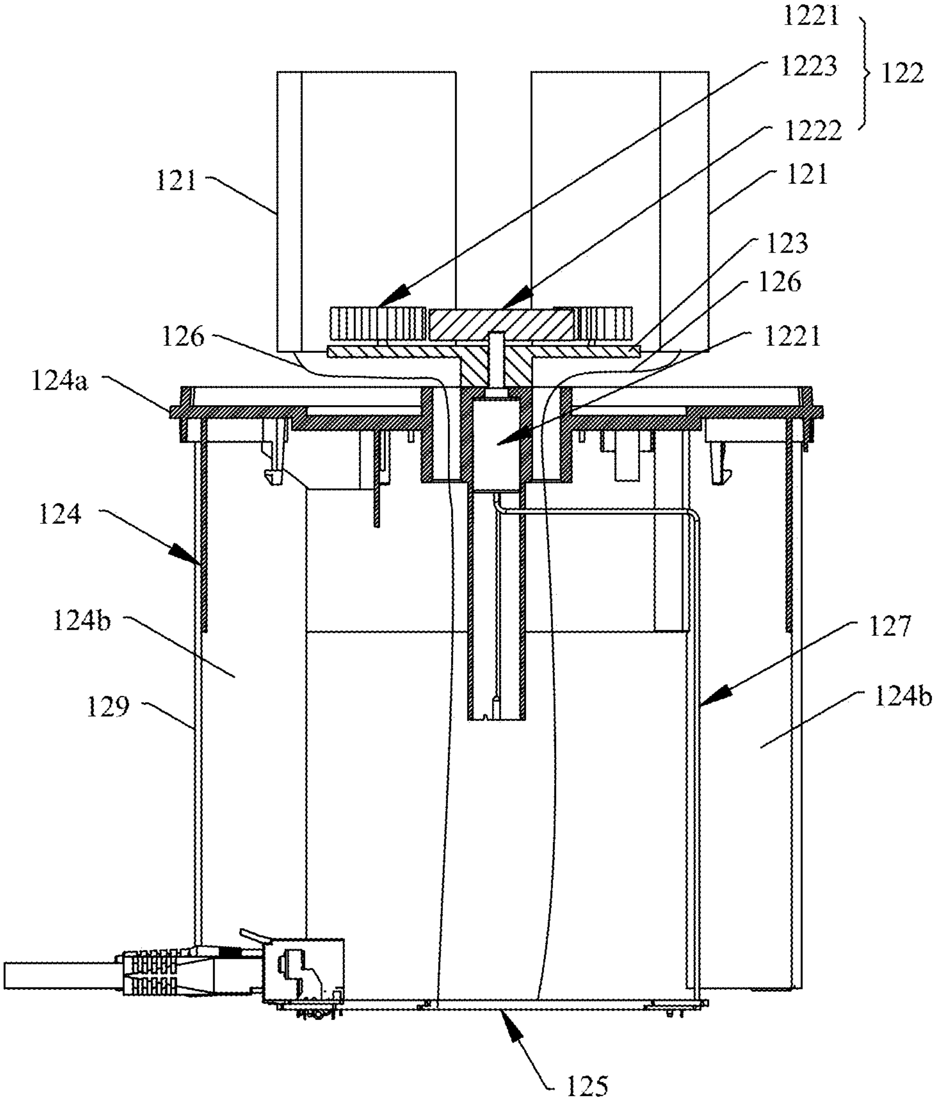
FIG. 17B is a cross-sectional view of the antenna assembly shown in FIG. 16.

Refer to FIG. 16, FIG. 17A, and FIG. 17B. FIG. 16 is a three-dimensional view of an antenna assembly 12 according to some other embodiments of this application, FIG. 17A is an exploded view of the antenna assembly 12 shown in FIG. 16, and FIG. 17B is a cross-sectional view of the antenna assembly 12 shown in FIG. 16. A directional antenna 121 is hidden in the antenna assembly 12 shown in FIG. 17A. A difference between the antenna assembly 12 shown in this embodiment and the antenna assembly 12 shown in FIG. 3 and FIG. 5A lies in that in this embodiment, a first support 123 and the housing 11 are fastened relative to each other. In some embodiments, mainly with reference to FIG. 17B, the first support 123 is fastened to a support plate 124*a* of a second support 124. Specifically, the first support 123 may be in direct contact with the support plate 124*a* of the second support 124 and fastened to the support plate 124*a* of the second support 124 through bonding. In addition, a plurality of directional antennas 121 are capable of being respectively rotatably connected to the first support 123 around axes, and the rotation axes of the plurality of directional antennas 121 relative to the first support 123 are not collinear with a first axis O1.

For example, with reference to FIG. 17A, rotation axes of three directional antennas 121 relative to the first support 123 are a third axis O3, a fourth axis O4, and a fifth axis O5, and the third axis O3, the fourth axis O4, and the fifth axis O5 are not collinear with the first axis O1.

On the basis of the foregoing embodiment, optionally, the rotation axes of the plurality of directional antennas 121 relative to the first support 123 are parallel to the first axis O1. For example, still with reference to FIG. 17A, the third axis O3, the fourth axis O4, and the fifth axis O5 are parallel to the first axis O1. In this way, positioning and driving are facilitated.

In some other embodiments, the rotation axes of the plurality of directional antennas 121 relative to the first support 123 may alternatively intersect with the first axis O1. In the following embodiments, an example in which the rotation axes of the plurality of directional antennas relative to the first support 123 are parallel to the first axis O1 is used for description. This cannot be considered as a special limitation imposed on this application.

On the foregoing basis, a driving apparatus 122 is configured to synchronously drive the plurality of directional antennas 121 to respectively rotate around the rotation axes of the plurality of directional antennas 121, to respectively adjust beam directions of the plurality of directional antennas 121 in a plurality of sectors F.

Figure 18:
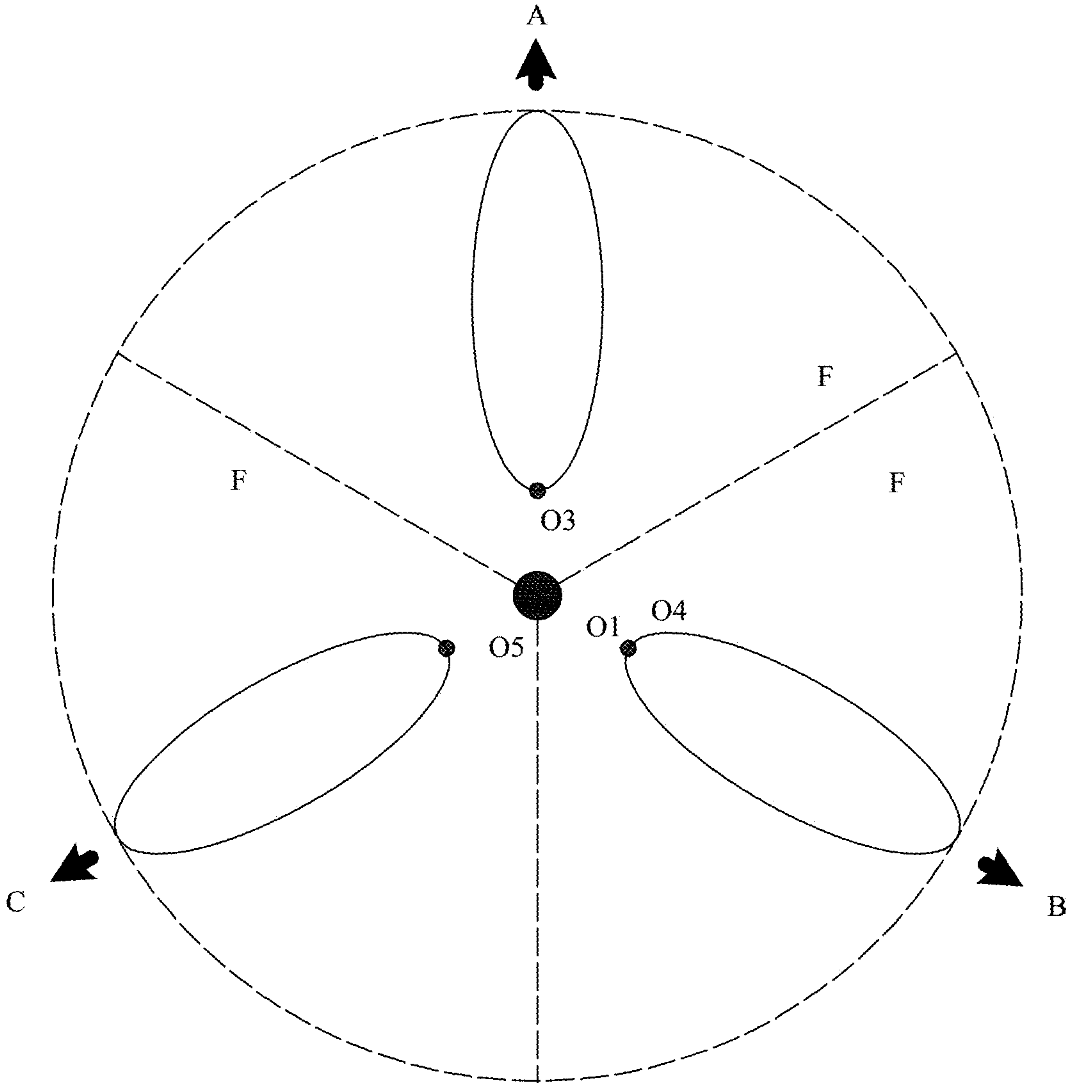
FIG. 18 is a schematic diagram of a relative position between beams of a plurality of directional antennas in the antenna assembly shown in FIG. 16 and a plurality of sectors F.

For example, refer to FIG. 18. FIG. 18 is a schematic diagram of a relative position between beams of the plurality of directional antennas 121 in the antenna assembly 12 shown in FIG. 16 and the plurality of sectors F. The driving apparatus 122 is configured to synchronously drive the three directional antennas 121 to respectively rotate around the third axis O3, the fourth axis O4, and the fifth axis O5, to respectively adjust beam directions of the three directional antennas 121 in three sectors F. Beams of the three directional antennas 121 are a beam in a direction A, a beam in a direction B, and a beam in a direction C. In an adjustment process, the three beams respectively rotate around the third axis O3, the fourth axis O4, and the fifth axis O5 in the three sectors F.

This driving manner is a synchronous driving manner. In this driving manner, because the rotation axes of the plurality of directional antennas 121 are not collinear with the first axis O1, there is a relatively low requirement on position accuracy of the plurality of directional antennas 121 relative to the first support 123 and relative position accuracy between the plurality of directional antennas 121, to simplify mounting difficulty. In addition, a structure of the driving apparatus 122 may be designed to drive the plurality of directional antennas 121 to rotate at different angular velocities and/or in different rotation directions, so as to meet requirements in different application scenarios.

It should be noted that in this embodiment, a physical size of the wireless access device 10 is very small relative to a wireless coverage area. Therefore, when a control method of the driving apparatus 122 is designed, although actually the rotation axes of the beam directions of the plurality of directional antennas 121 are not collinear with central lines (that is, the first axis O1) of the plurality of sectors F, the rotation axes of the beam directions of the directional antennas 121 may be designed to be collinear with the central lines of the corresponding sectors, to simplify control difficulty of the driving apparatus 122.

On the basis of the foregoing embodiment, there are a plurality of structural forms of the driving apparatus 122. In some embodiments, still with reference to FIG. 17A, the driving apparatus 122 includes a driving member 1221, a driving gear 1222, and a plurality of driven members 1223.

The driving member 1221 is a rotation driving member. Specifically, the driving member 1221 may be a rotary motor or a combination of a rotary motor and a reducer. The driving member 1221 is connected to the driving gear 1222. In some embodiments, with reference to FIG. 17B, a stator (which may be a housing) of the driving member 1221 may be fastened to the support plate 124*a* of the second support 124, and a rotor (which may be an output shaft) of the driving member 1221 may penetrate through the support plate 124*a* and a through hole on the first support 123 and be fixedly connected to the driving gear 1222. The driving member 1221 is configured to drive the driving gear 1222 to rotate.

The driven member 1223 is a gear or a rack extending along an arc. In FIG. 16 and FIG. 17A, an example in which the driven member 1223 is a gear is used for description. The plurality of driven members 1223 are respectively disposed on the plurality of directional antennas 121, and axes of the plurality of driven members 1223 are respectively collinear with the rotation axes of the directional antennas 121 on which the plurality of driven members 1223 are located. The plurality of driven members 1223 are arranged in a circumferential direction of the driving gear 1222, and are engaged with the driving gear 1222, to drive the plurality of driven members 1223 to respectively rotate around the axes of the plurality of driven members 1223, so as to drive the plurality of directional antennas 121 to respectively rotate around the rotation axes of the plurality of directional antennas 121.

The driving apparatus 122 can simultaneously drive the plurality of directional antennas 121 by using one driving member 1221. Therefore, costs are relatively low. In addition, transmission ratios between the driving gear and the plurality of driven members may be separately designed, so that rotational angular velocities of the plurality of directional antennas 121 are different, to adapt to different application scenarios.

In the foregoing embodiment, the driving gear 1222 and the driven member 1223 may be directly engaged for transmission, or at least one transmission gear may be disposed between the driving gear 1222 and the driven member 1223, to implement indirect engagement for transmission through the transmission gear. The transmission gear is disposed to extend a distance between the driving gear 1222 and the driven member 1223, so that the driven member 1223 and the directional antenna 121 are arranged in an area with abundant space. In FIG. 17A, an example in which the driving gear 1222 and the driven member 1223 are directly engaged is used for description. This cannot be considered as a special limitation imposed on this application.

In this embodiment, the driving gear 1222 and the driven member 1223 may be directly engaged, or a same quantity of transmission gears may be disposed between the driving gear 1222 and the plurality of driven members 1223, to ensure that rotation directions of the plurality of directional antennas 121 are the same, and the transmission ratios between the driving gear 1222 and the plurality of driven members 1223 are designed to be the same, to ensure that the rotational angular velocities of the plurality of directional antennas 121 are the same, so as to implement synchronous driving in a same direction and at a same speed. On the contrary, a different quantity of transmission gears may be disposed and/or different transmission ratios may be set, to implement synchronous driving in different rotation directions and/or at different rotational speeds, so as to adapt to different application scenarios.

In some embodiments, the transmission ratio between the driving gear 1222 and the driven member 1223 may be 1. In this way, in a working process of the antenna assembly 12, a rotational angular velocity of the driving member 1221, a rotational angular velocity of the driving gear 1222, and a rotational angular velocity of the driven member 1223 are the same, to simplify control difficulty.

The synchronization driving apparatus 122 described in the foregoing embodiment can resolve most scenario problems. However, there are still some relatively high scenario requirements that cannot be met. For example, when a directional antenna covers a target user, and the target user moves from a sector in which the directional antenna is located to another sector, after the directional antenna rotates to follow the target user equipment, a plurality of other users in the original sector experience a problem of disconnection. Therefore, user experience may be relatively poor.

Figure 19:
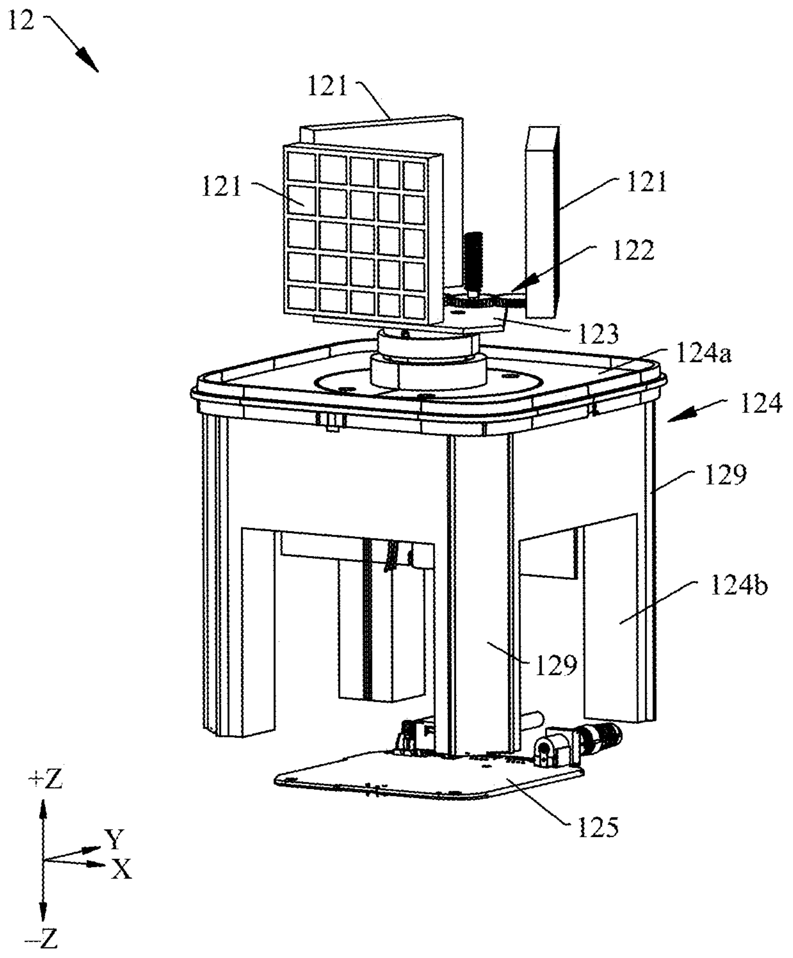
FIG. 19 is a schematic diagram of a structure of an antenna assembly according to some other embodiments of this application.
Figure 20:
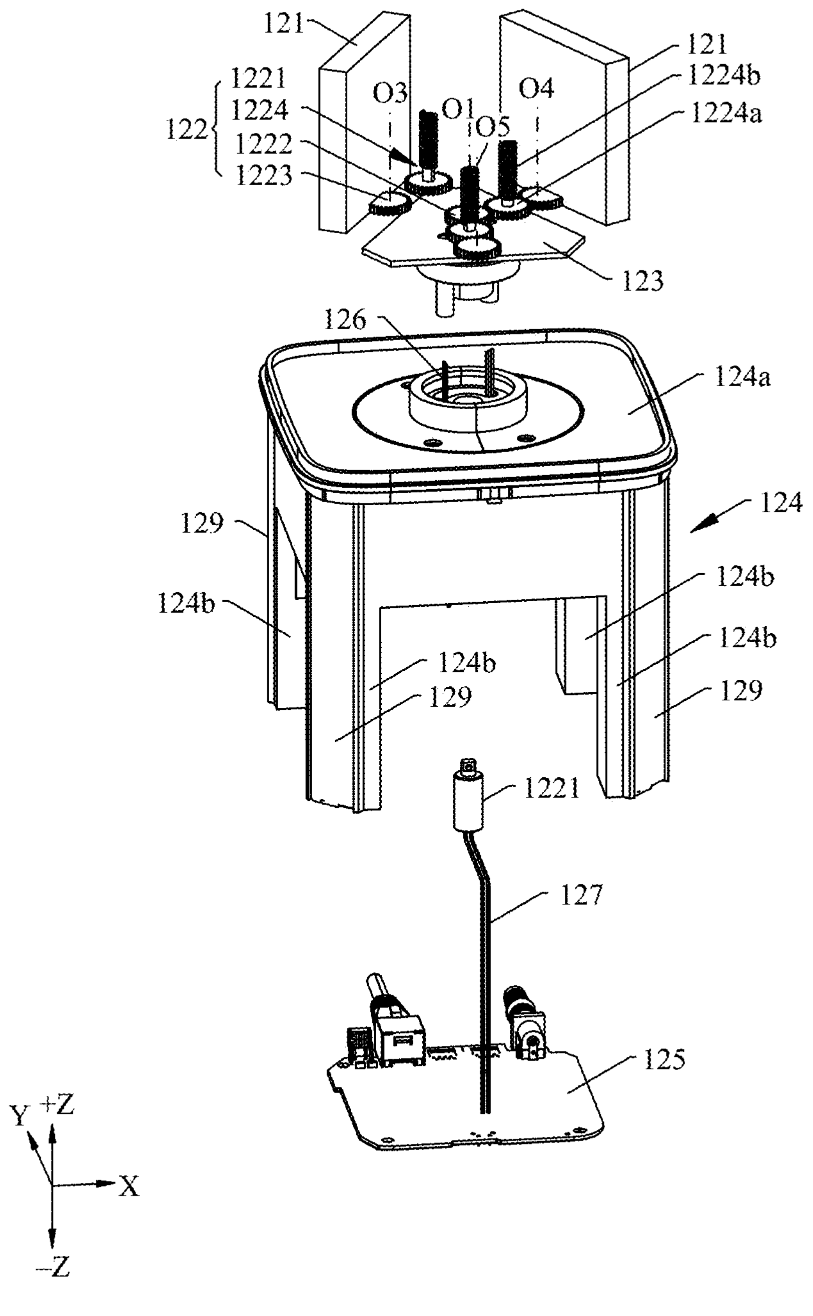
FIG. 20 is an exploded view of the antenna assembly shown in FIG. 19.

To resolve the foregoing problem, refer to FIG. 19 and FIG. 20. FIG. 19 is a schematic diagram of a structure of an antenna assembly 12 according to some other embodiments of this application, and FIG. 20 is an exploded view of the antenna assembly 12 shown in FIG. 19. A directional antenna 121 is hidden in the antenna assembly 12 shown in FIG. 20. A difference between the antenna assembly 12 shown in this embodiment and the antenna assembly 12 shown in FIG. 16, FIG. 17A, and FIG. 17B lies in that in this embodiment, a driving apparatus 122 further includes a gear shift assembly 1224 in addition to a driving member 1221, a driving gear 1222, and a plurality of driven members 1223. The gear shift assembly 1224 is configured to selectively separate the driving gear 1222 from at least one driven member 1223 in the plurality of driven members 1223, so that the at least one driven member 1223 and a directional antenna 121 disposed on the at least one driven member 1223 stop rotating, and the remaining driven members 1223 can rotate with the driving gear 1222.

It should be noted that a quantity of the at least one driven member 1223 is less than a quantity of the plurality of driven members 1223. On this basis, the driving gear 1222 may be selectively separated from at least one driven member 1223 in the plurality of driven members 1223. That is, the driving gear 1222 may be selectively engaged with at least one driven member 1223 in the plurality of driven members 1223, to adjust a beam direction of at least one directional antenna 121.

Specifically, there may be a difference of one or at least two between the quantity of the plurality of driven members 1223 and the quantity of the at least one driven member 1223.

When there is a difference of one between the quantity of the plurality of driven members 1223 and the quantity of the at least one driven member 1223, the driving gear 1222 may be selectively engaged with one driven member 1223 in the plurality of driven members 1223, to separately and independently drive each directional antenna 121.

When there is a difference of at least two between the quantity of the plurality of driven members 1223 and the quantity of the at least one driven member 1223, the driving gear 1222 may be selectively engaged with at least two driven members 1223 in the plurality of driven members 1223, to synchronously drive the at least two driven members 1223.

It should be noted that the difference between the quantity of the plurality of driven members 1223 and the quantity of the at least one driven member 1223 may not change with time, or may change with time. For example, at a moment, when there is a difference of one between the quantity of the plurality of driven members 1223 and the quantity of the at least one driven member 1223, the driving gear 1222 may be selectively engaged with one driven member 1223 in the plurality of driven members 1223, to separately and independently drive each directional antenna 121. At another moment, when there is a difference of two between the quantity of the plurality of driven members 1223 and the quantity of the at least one driven member 1223, the driving gear 1222 may be selectively engaged with two driven members 1223 in the plurality of driven members 1223, to synchronously drive the two driven members 1223.

In this way, by performing gear shift by using the gear shift assembly 1224, the at least one driven member 1223 can stop rotating, to fasten a position of the directional antenna 121, so that the at least one directional antenna 121 maintains a current coverage state. In addition, at least one other directional antenna 121 is driven to rotate, to change a beam direction of the at least one other directional antenna 121. This driving manner is an asynchronous driving manner. In this driving manner, high-speed Internet access requirements of a plurality of user equipments can be simultaneously met, to improve multi-sector multi-user edge coverage performance. This has relatively high flexibility and a relatively wide application scope. Different coverage policies may be implemented in different optimization policies, for example, global throughput optimization, VIP first, or service scenario first.

The following further describes the foregoing technical effects by using an example.

Figure 21:
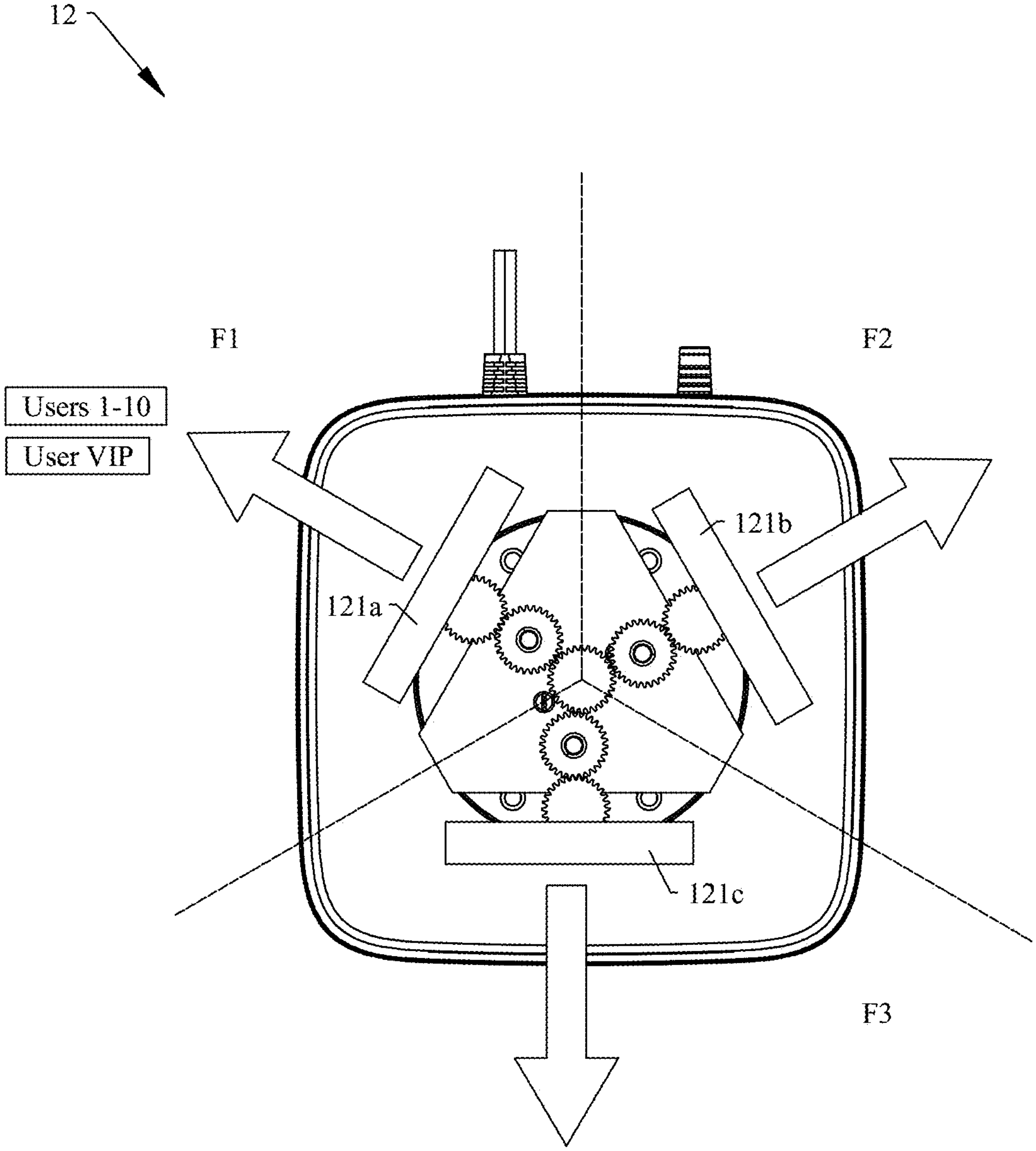
FIG. 21 is a top view of the antenna assembly shown in FIG. 19 and FIG. 20 at a moment.

Refer to FIG. 21. FIG. 21 is a top view of the antenna assembly 12 shown in FIG. 19 and FIG. 20 at a moment, and three directional antennas 121 are a first directional antenna 121*a*, a second directional antenna 121*b*, and a third directional antenna 121*c*. Beams of the first directional antenna 121*a*, the second directional antenna 121*b*, and the third directional antenna 121*c* are respectively located in a sector F1, a sector F2, and a sector F3. At a moment shown in FIG. 21, first target user equipment (for example, may be users 1~10) and second target user equipment (for example, may be a user VIP) are located in the sector F1. In an electrical switching manner, the first directional antenna 121*a* is selected to work, to simultaneously serve the users 1~10 and the user VIP.

When positions of the users 1~10 remain unchanged, and the user VIP moves from the sector F1 to the sector F2 or the sector F3, the driving gear 1222 may be separated, by using the gear shift assembly 1224, from a driven member 1223 connected to the first directional antenna 121*a*, to fasten positions of the first directional antenna 121*a* and the third directional antenna 121*c*, so that the first directional antenna 121*a* can serve the users 1~10, and the second directional antenna 121*b* and/or the third directional antenna 121*c* can be driven to rotate to serve the user VIP.

Figure 22:
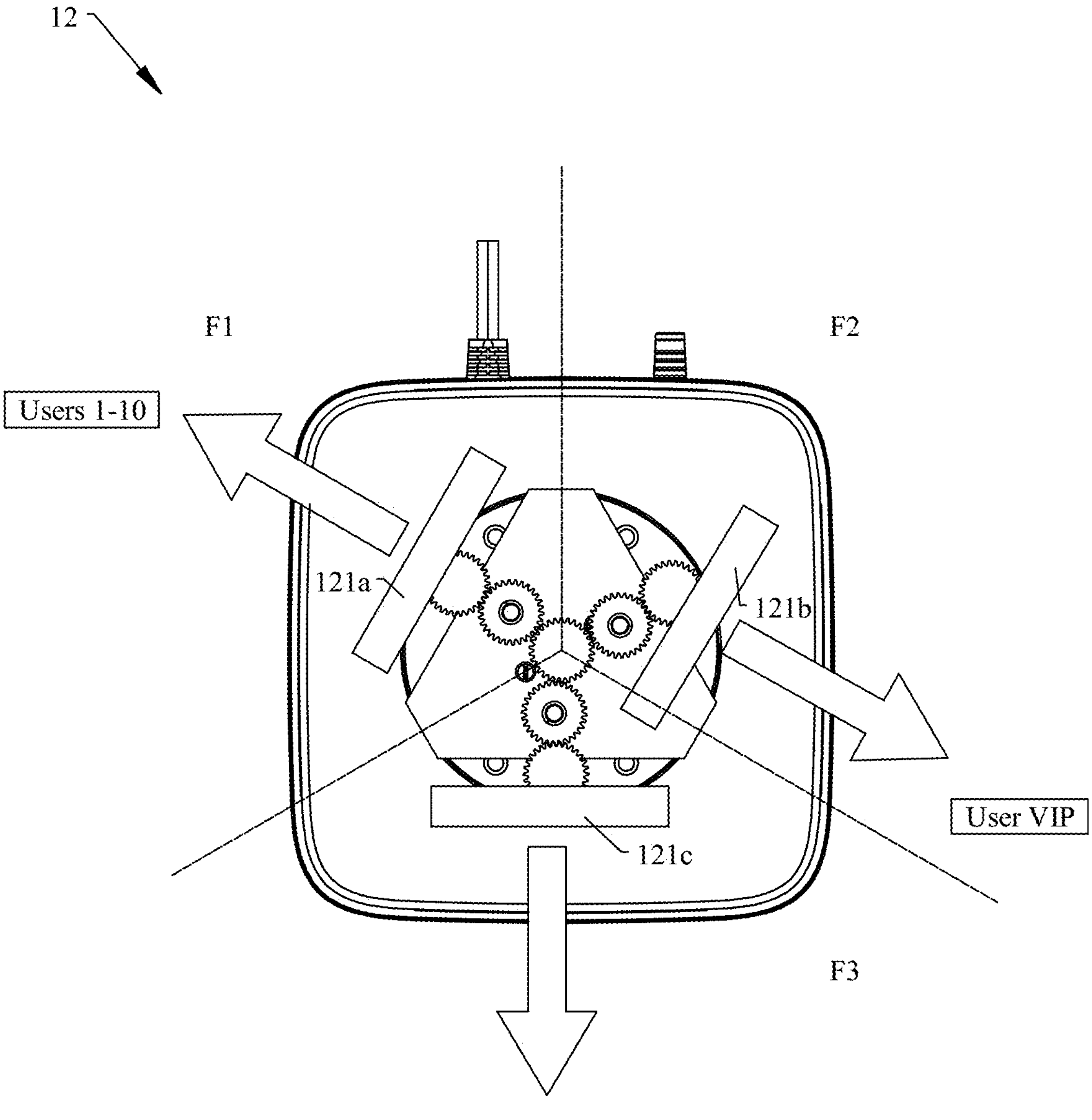
FIG. 22 is a top view of the antenna assembly shown in FIG. 19 and FIG. 20 when a user VIP moves from a sector F1 to a sector F2.

For example, when the user VIP moves from the sector F1 to the sector F2, refer to FIG. 22. FIG. 22 is a top view of the antenna assembly 12 shown in FIG. 19 and FIG. 20 when the user VIP moves from the sector F1 to the sector F2. When the driving gear 1222 is separated, by using the gear shift assembly 1224, from the driven member 1223 connected to the first directional antenna 121*a*, the driving gear 1222 is further separated from a driven member 1223 connected to the third directional antenna 121*c*, so that the positions of the first directional antenna 121*a* and the third directional antenna 121*c* remain unchanged relative to positions at the moment shown in FIG. 21, and the first directional antenna 121*a* covers the users 1~10, and an angle α of the first directional antenna 121*a* in the sector F1 is recorded. In addition, it is determined whether the second directional antenna 121*b* can cover the user VIP. If the second directional antenna 121*b* can cover the user VIP, an angle of the second directional antenna 121*b* does not need to be adjusted. If the second directional antenna 121*b* cannot cover the user VIP, only the second directional antenna 121*b* is driven to rotate to cover the user VIP. In this way, the users 1~10 and the user VIP can be simultaneously covered, to simultaneously meet high-speed Internet access requirements of a plurality of user equipments, and an angle β of the second directional antenna 121*b* in the sector F2 is recorded.

It should be noted that the process of simultaneously covering the users 1~10 and the user VIP when the user VIP moves from the sector F1 to the sector F2 may alternatively be as follows: The driving gear 1222 is separated, by using the gear shift assembly 1224, only from the driven member 1223 connected to the first directional antenna 121*a*, so that the position of the first directional antenna 121*a* remains unchanged relative to a position at the moment shown in FIG. 21, to cover the users 1~10, and an angle α of the first directional antenna 121*a* in the sector F1 is recorded. In addition, it is determined whether the second directional antenna 121*b* can cover the user VIP. If the second directional antenna 121*b* can cover the user VIP, an angle of the second directional antenna 121*b* does not need to be adjusted. If the second directional antenna 121*b* cannot cover the user VIP, the second directional antenna 121*b* and the third directional antenna 121*c* are synchronously driven to rotate, so that the second directional antenna 121*b* covers the user VIP. In this way, the users 1~10 and the user VIP can be simultaneously covered, to simultaneously meet high-speed Internet access requirements of a plurality of user equipments, and an angle β of the second directional antenna 121*b* in the sector F2 and an angle γ1 of the third directional antenna 121*c* in the sector F3 are recorded.

Figure 23:
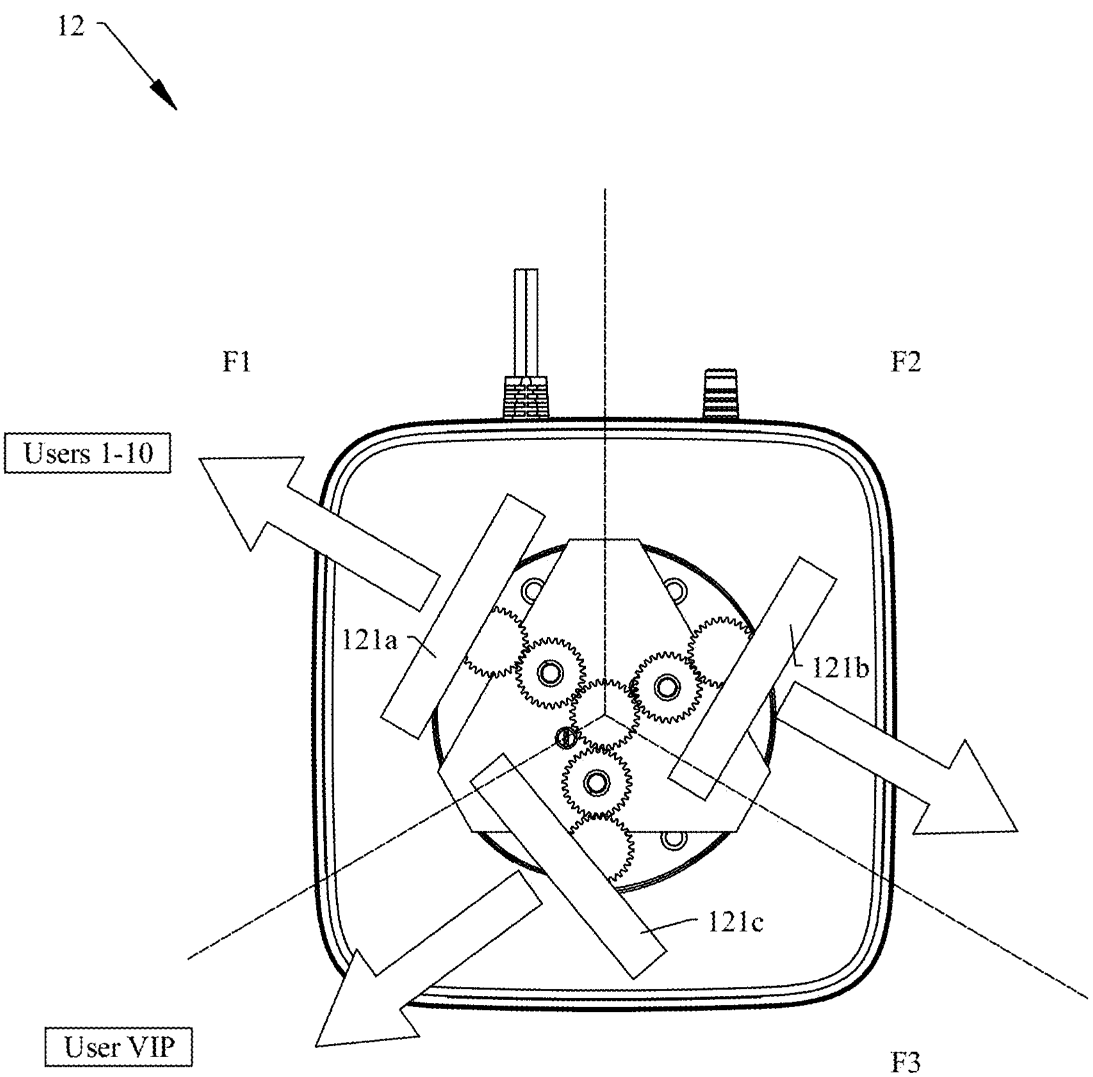
FIG. 23 is a top view of the antenna assembly shown in FIG. 19 and FIG. 20 when a user VIP further moves from a sector F2 to a sector F3.

Based on either of the foregoing two implementations, when the user VIP further moves from the sector F2 to the sector F3, refer to FIG. 23. FIG. 23 is a top view of the antenna assembly 12 shown in FIG. 19 and FIG. 20 when the user VIP further moves from the sector F2 to the sector F3. When the driving gear 1222 is separated, by using the gear shift assembly 1224, from the driven member 1223 connected to the first directional antenna 121*a*, the driving gear 1222 is further separated from a driven member 1223 connected to the second directional antenna 121*b*, so that positions of the first directional antenna 121*a* and the second directional antenna 121*b* remain unchanged relative to positions at a moment shown in FIG. 22. In addition, it is determined whether the third directional antenna 121*c* can cover the user VIP. If the third directional antenna 121*c* can cover the user VIP, an angle of the third directional antenna 121*c* does not need to be adjusted. If the third directional antenna 121*c* cannot cover the user VIP, only the third directional antenna 121*c* is driven to rotate to cover the user VIP. In this way, the users 1~10 and the user VIP can also be simultaneously covered, to simultaneously meet high-speed Internet access requirements of a plurality of user equipments, and an angle γ2 of the third directional antenna 121*c* in the sector F3 is recorded.

On the foregoing basis, if the user VIP is not in the sector F3, it is determined whether the first directional antenna 121*a* at the angle α can cover the user VIP. If the first directional antenna 121*a* can cover the user VIP, an angle of the first directional antenna 121*a* does not need to be adjusted. If the first directional antenna 121*a* cannot cover the user VIP, switching is performed by using the gear shift assembly 1224, so that positions of the second directional antenna 121*b* and the third directional antenna 121*c* remain unchanged relative to positions at a moment shown in FIG. 23. Only the first directional antenna 121*a* is driven to rotate to cover the user VIP, and a new angle of the first directional antenna 121*a* in the sector F1 is recorded.

After at least one round robin is completed, when a specific directional antenna needs to rotate each time the gear shift assembly 1224 engages only one driven member 1223 with the driving gear 1222, only proper adjustment needs to be performed with reference to the foregoing angles α, β, and γ2, to implement independent control. Different optimization policies are implemented in different optimization policies, for example, global throughput optimization, VIP first, or service scenario first. In the foregoing embodiment, VIP first is used to implement an optimization policy.

Figure 24:
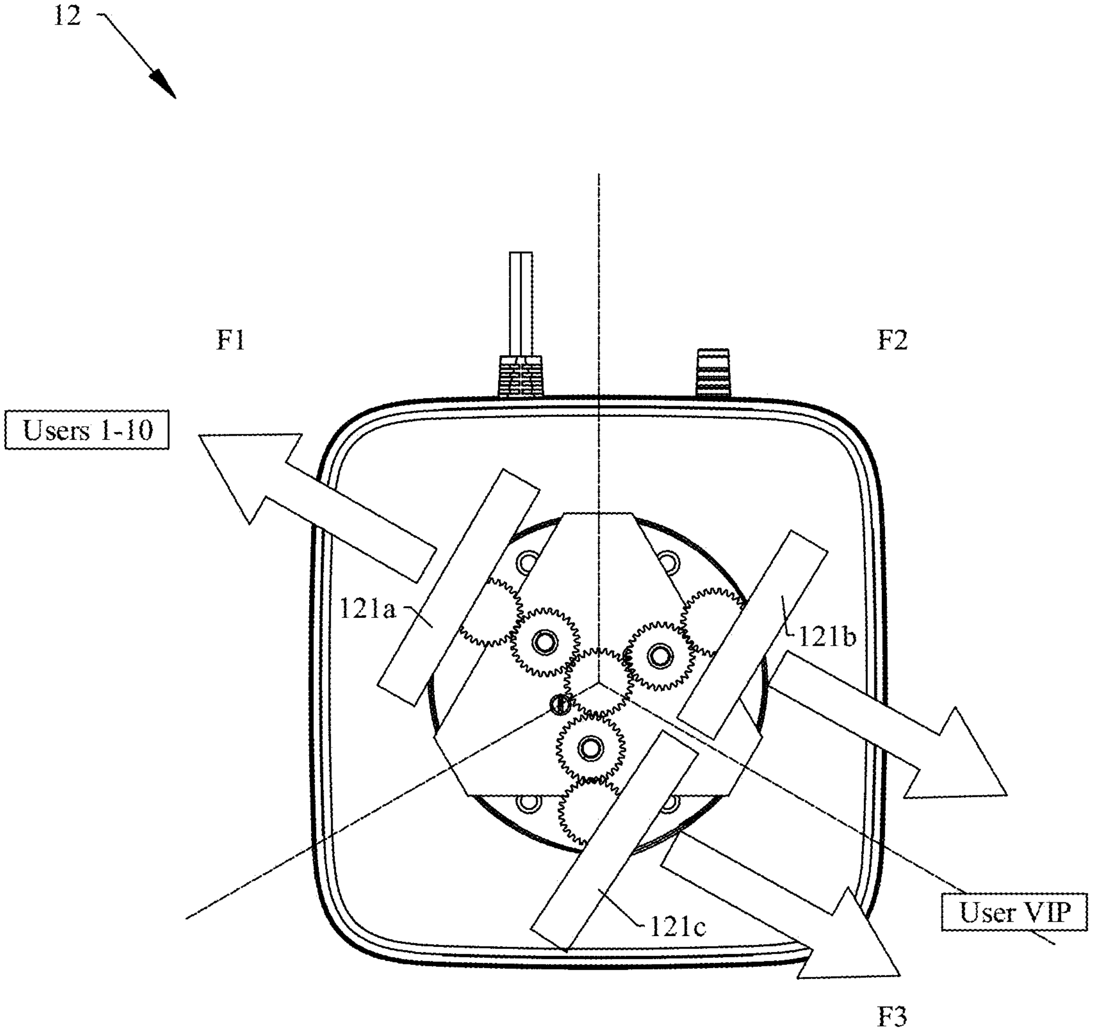
FIG. 24 is a top view of the antenna assembly shown in FIG. 19 and FIG. 20 when a user VIP moves to a position of an overlapping line between a sector F2 and a sector F3.

In some special scenarios, refer to FIG. 24. FIG. 24 is a top view of the antenna assembly 12 shown in FIG. 19 and FIG. 20 when the user VIP moves to a position of an overlapping line between the sector F2 and the sector F3. At this moment, the user VIP is located in both the sector F2 and the sector F3. Switching may be performed by using the gear shift assembly 1224, to sequentially drive the second directional antenna 121*b* and the third directional antenna 121*c* to rotate, so that both the second directional antenna 121*b* and the third directional antenna 121*c* cover the user VIP.

In the foregoing embodiment, there are a plurality of structural forms of the gear shift assembly 1224. For example, the plurality of driven members 1223 are fastened at different positions, and a whole including the driving member 1221 and the driving gear 1222 is driven to move, so that the driving gear 1222 can be selectively engaged with one of the plurality of driven members 1223, to implement gear shift. For another example, the plurality of driven members 1223 are fastened at different positions, and a position of the driving member 1221 is fastened. When the driving member 1221 can drive the driving gear 1222 to rotate, the driving gear 1222 is driven to move, so that the driving gear 1222 can be selectively engaged with one of the plurality of driven members 1223, to implement gear shift. This is not specifically limited herein.

Figure 25:
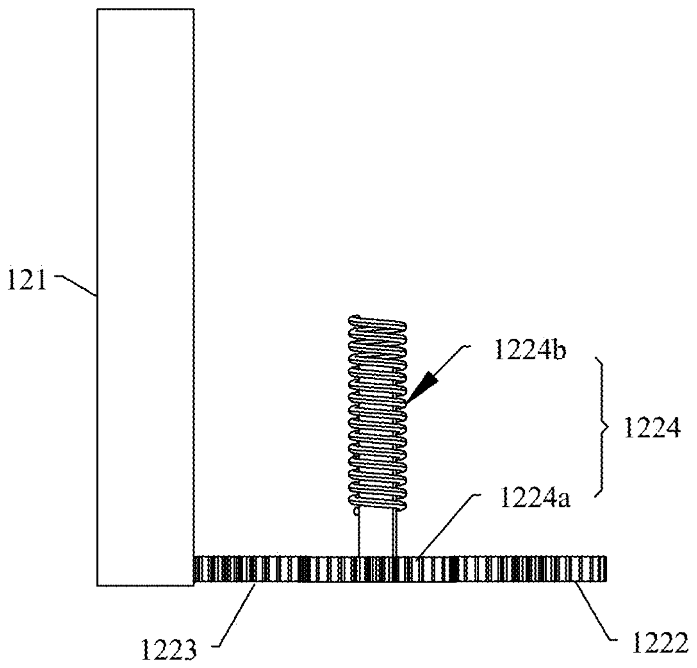
FIG. 25 is a schematic diagram of a structure of a driving gear, a driven member, a directional antenna, and a gear shift assembly in the antenna assembly shown in FIG. 20 when a transmission gear is located at a first position.
Figure 26:
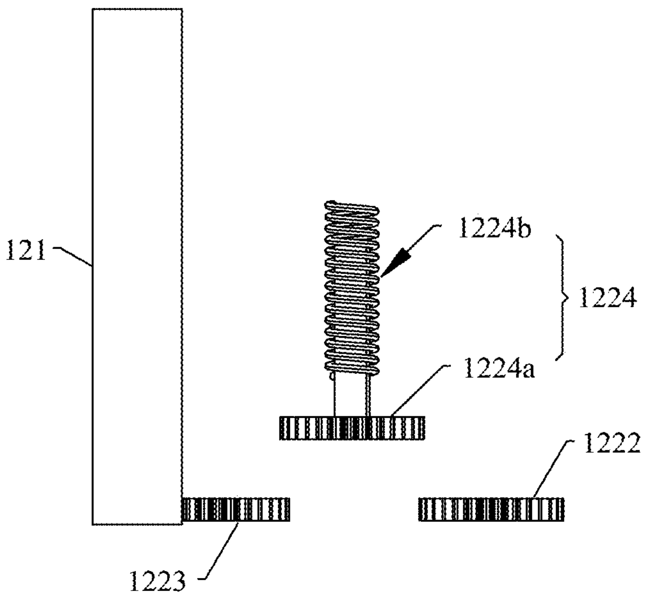
FIG. 26 is a schematic diagram of a structure of a driving gear, a driven member, a directional antenna, and a gear shift assembly in the antenna assembly shown in FIG. 20 when a transmission gear is located at a second position.

In a possible implementation, still with reference to FIG. 20, the plurality of driven members 1223 are arranged in a circumferential direction of the driving gear 1222, and there is a gap between the driving gear 1222 and each of the plurality of driven members 1223. On this basis, still with reference to FIG. 20, the gear shift assembly 1224 includes a plurality of transmission gears 1224*a* and a plurality of linear driving mechanisms 1224*b*. All of the plurality of transmission gears 1224*a* are located at a first position, the plurality of transmission gears 1224*a* are respectively disposed in the gaps between the driving gear 1222 and the plurality of driven members 1223, and the transmission gear 1224*a* is engaged with the driving gear 1222 and the driven member 1223. The plurality of linear driving mechanisms 1224*b* are respectively connected to the plurality of transmission gears 1224*a*, and the linear driving mechanism 1224*b* is configured to drive the transmission gear 1224*a* to reciprocally move in a direction parallel to a first axis O1, so that the transmission gear 1224*a* is switched between the first position and a second position. When the transmission gear 1224*a* is located at the first position, refer to FIG. 25. FIG. 25 is a schematic diagram of a structure of the driving gear 1222, a driven member 1223, a directional antenna 121, and the gear shift assembly 1224 in the antenna assembly 12 shown in FIG. 20 when the transmission gear 1224*a* is located at the first position. The transmission gear 1224*a* is located in a gap between the driving gear 1222 and the driven member 1223, and is engaged with the driving gear 1222 and the driven member 1223. Rotational movement of the driving gear 1222 may be transferred to the driven member 1223 through the transmission gear 1224*a*. Therefore, the directional antenna 121 on which the driven member 1223 is located may be driven to rotate. When the transmission gear 1224*a* is located at the second position, refer to FIG. 26. FIG. 26 is a schematic diagram of a structure of the driving gear 1222, a driven member 1223, a directional antenna 121, and the gear shift assembly 1224 in the antenna assembly 12 shown in FIG. 20 when the transmission gear 1224*a* is located at the second position. The transmission gear 1224*a* is located outside a gap between the driving gear 1222 and the driven member 1223, and is separated from the driving gear 1222 and the driven member 1223. Rotational movement of the driving gear 1222 cannot be transferred to the driven member 1223. Therefore, rotation driving may not be performed on the driven member 1223, and the directional antenna 121 on which the driven member 1223 is located cannot be driven to rotate.

In this way, by controlling the plurality of linear driving mechanisms 1224*b*, the driving gear 1222 can be selectively engaged with one of the plurality of driven members 1223, to implement gear shift. This structure is simple and has relatively high structural compactness.

In some embodiments, when the transmission gear 1224*a* is located at the first position, a transmission ratio of a gear transmission mechanism including the driving gear 1222, the transmission gear 1224*a*, and the driven member 1223 may be 1. In this way, in a working process of the antenna assembly 12, a rotational angular velocity of the driving member 1221, a rotational angular velocity of the driving gear 1222, and a rotational angular velocity of the driven member 1223 are the same, to simplify control difficulty.

Figure 27:
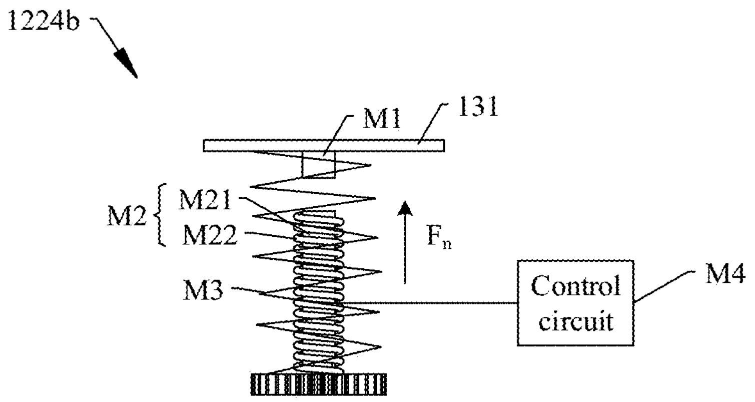
FIG. 27 is a schematic diagram of a structure of a linear driving mechanism in the antenna assembly shown in FIG. 20.

In the foregoing embodiment, the linear driving mechanism 1224*b* may be a linear motor, an electric push rod, a hydraulic rod, or the like. This is not specifically limited herein. In some embodiments, refer to FIG. 27. FIG. 27 is a schematic diagram of a structure of the linear driving mechanism 1224*b* in the antenna assembly 12 shown in FIG. 20. In this embodiment, the linear driving mechanism 1224*b* includes a magnetic member M1, an electromagnet M2, an elastic reset member M3, and a control circuit M4.

The magnetic member M1 is a structural member that can be attracted by a magnet, and a material of the magnetic member M1 includes but is not limited to iron (Fe), cobalt (Co), nickel (Ni), and alloys thereof. The electromagnet M2 includes a magnetic core M21 and a coil M22 wound around the magnetic core M21. When the coil M22 is energized, the electromagnet M2 has magnetism and can attract the magnetic member M1. When the coil M22 is de-energized, magnetism of the electromagnet M2 disappears, and magnetic attraction force disappears.

An arrangement direction of the magnetic member M1 and the electromagnet M2 is parallel to the first axis O1, one of the magnetic member M1 and the electromagnet M2 is fastened to the transmission gear 1224*a*, and the other of the magnetic member M1 and the electromagnet M2 and a first support 123 are fastened relative to each other. In the embodiment shown in FIG. 21, the electromagnet M2 is fastened to the transmission gear 1224*a*, and the magnetic member M1 and the first support 123 are fastened relative to each other. In some embodiments, still with reference to FIG. 27, the antenna assembly 12 further includes a third support 131. The third support 131 is fastened to the first support 123, and the magnetic member M1 is fastened to the third support 131, to relatively fasten the magnetic member M1 to the first support 123. When the coil of the electromagnet M2 is energized, the electromagnet M2 has magnetism and can attract the magnetic member M1.

The elastic reset member M3 is connected to the transmission gear 1224*a*, and is configured to perform an elastic reset function. A structural form of the elastic reset member M3 includes but is not limited to a coil spring, a spring plate, and a rubber strip. In the embodiment shown in FIG. 27, the elastic reset member M3 is a coil spring, an axis of the coil spring is parallel to the first axis O1, one end of the coil spring along the axis is fastened to the transmission gear 1224*a*, and the other end and the first support 123 are fastened relative to each other.

The control circuit M4 is connected to the electromagnet M2. Specifically, the control circuit M4 is connected to the coil M22 of the electromagnet M22, and the control circuit M4 is configured to control the electromagnet M2 to be energized or de-energized. When the electromagnet M2 is energized, there is magnetic attraction force Fn between the electromagnet M2 and the magnetic member M1, the magnetic attraction force Fn drives the transmission gear 1224*a* to move from the first position to the second position, and the elastic reset member M3 is deformed to accumulate elastic reset force. When the electromagnet M2 is de-energized, the magnetic attraction force between the electromagnet M2 and the magnetic member M1 disappears, and the elastic reset force generated by the elastic reset member M3 drives the transmission gear 1224*a* to be reset from the second position to the first position. In this way, the transmission gear 1224*a* is reciprocally driven between the first position and the second position. This structure is simple and easy to control.

In the foregoing embodiment, optionally, the elastic reset member M3 may not be disposed, but the magnetic member M1 is replaced with a magnet or an electromagnet, to control, through the control circuit M4, a direction of a current input to the electromagnet M2, so that alternate switching between mutual attraction and mutual repulsion is performed between the electromagnet M2 and the magnet or the electromagnet, to reciprocally drive the transmission gear 1224*a* between the first position and the second position. This structure has relatively low composition complexity and relatively low assembly difficulty.

Figure 28:
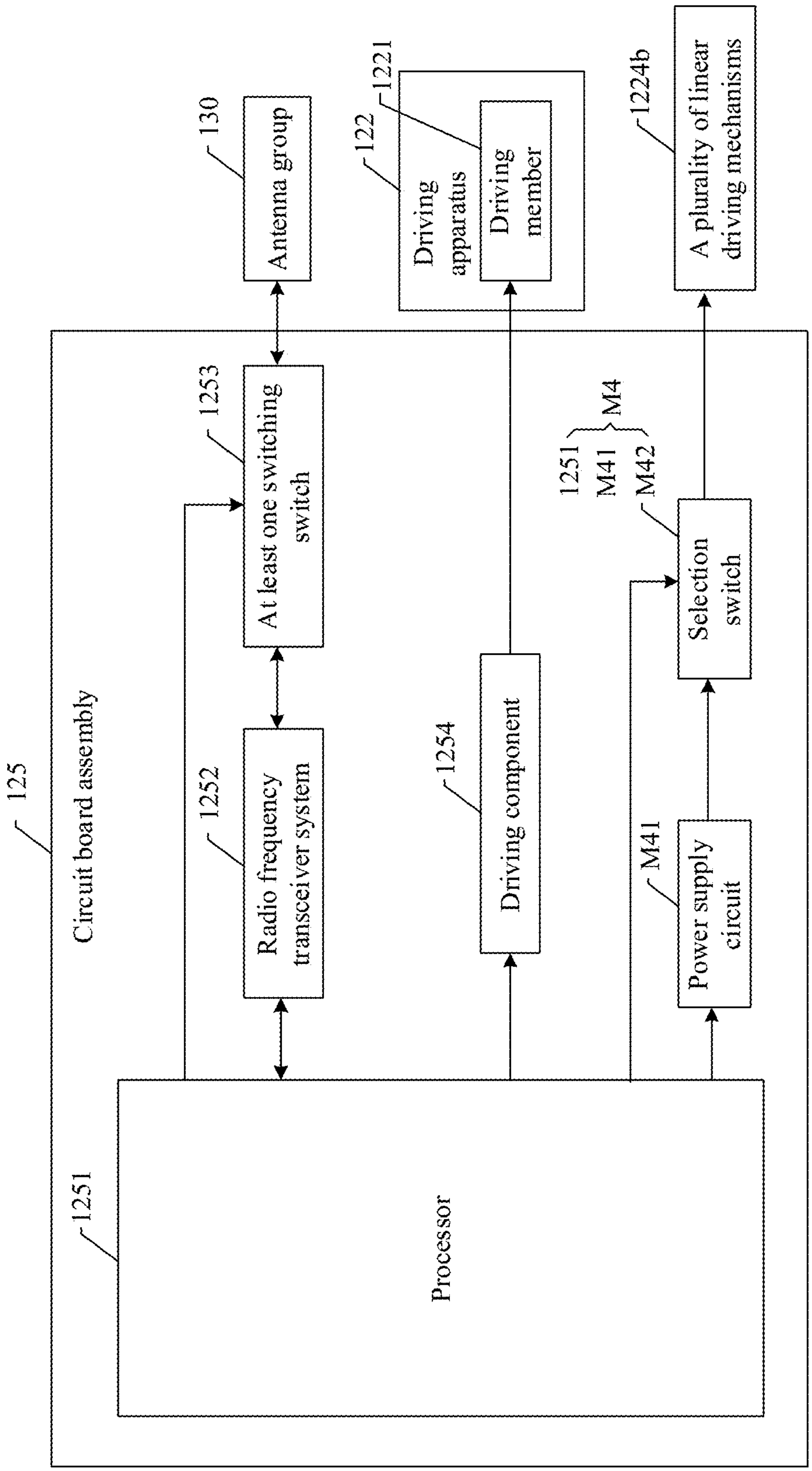
FIG. 28 is a circuit block diagram of the antenna assembly shown in FIG. 20.

In some embodiments, the control circuit M4 may be integrated into a circuit board assembly 125. In some embodiments, refer to FIG. 28. FIG. 28 is a circuit block diagram of the antenna assembly 12 shown in FIG. 20. In this embodiment, some circuits that are on the circuit board assembly 125 and that are configured to implement a signal transmission/receiving function of an antenna group 130 and some circuits configured to drive the driving member 1221 are the same as the circuits shown in FIG. 14. Details are not described herein again. On this basis, the circuit board assembly 125 further includes the control circuit M4, and the control circuit M4 may include a power supply circuit M41, a selection switch M42, and a processor 1251. The selection switch M42 is disposed between the power supply circuit M41 and electromagnets M2 of the plurality of linear driving mechanisms 1224*b*. The processor 1251 is connected to the selection switch M42, and is configured to control the selection switch M42, so that the power supply circuit M41 is capable of selectively supplying power to an electromagnet M2 of at least one linear driving mechanism 1224*b* in the plurality of linear driving mechanisms 1224*b*. In this way, by using the selection switch M42, the electromagnet M2 of the at least one linear driving mechanism 1224*b* in the plurality of linear driving mechanisms 1224*b* may be selected to be connected to the power supply circuit M41 for power supply, to select at least one transmission gear 1224*a* in the plurality of transmission gears 1224*a* to move from the first position to the second position, so that the driving gear 1222 can be selectively separated from at least one driven member 1223 in the plurality of driven members 1223, to implement gear shift. The control circuit M4 has a simple structure and is easy to implement.

In the foregoing embodiment, still with reference to FIG. 28, the processor 1251 may be further connected to the power supply circuit M41 to control the power supply circuit M41 to output an electrical signal.

To separately and independently drive a plurality of directional antennas 121, in some other embodiments, a plurality of independent rotation driving members (for example, servo motors) may be used to respectively drive the plurality of directional antennas 121. This structure has a simple control principle and is easy to control. This driving manner is also an asynchronous driving manner. In this driving manner, high-speed Internet access requirements of a plurality of user equipments can be simultaneously met, to improve multi-sector multi-user edge coverage performance. This has relatively high flexibility and a relatively wide application scope. Different coverage policies may be implemented in different optimization policies, for example, global throughput optimization, VIP first, or service scenario first.

In the antenna assembly provided in the foregoing embodiments, to adjust the beam direction of the directional antenna 121, the driving apparatus 122 drives a whole of the directional antenna 121 to rotate. However, because the directional antenna 121 usually includes a radiator and a reflection plate, the beam direction can be changed through separate rotation of the whole or the reflection plate of the directional antenna 121. Based on this, in addition to driving the whole of the directional antenna 121 to rotate relative to the housing 11 to adjust the beam direction of the directional antenna 121, the driving apparatus 122 may further drive the reflection plate of the directional antenna 121 to rotate relative to the housing 11 to adjust the beam direction of the directional antenna 121.

Figure 29:
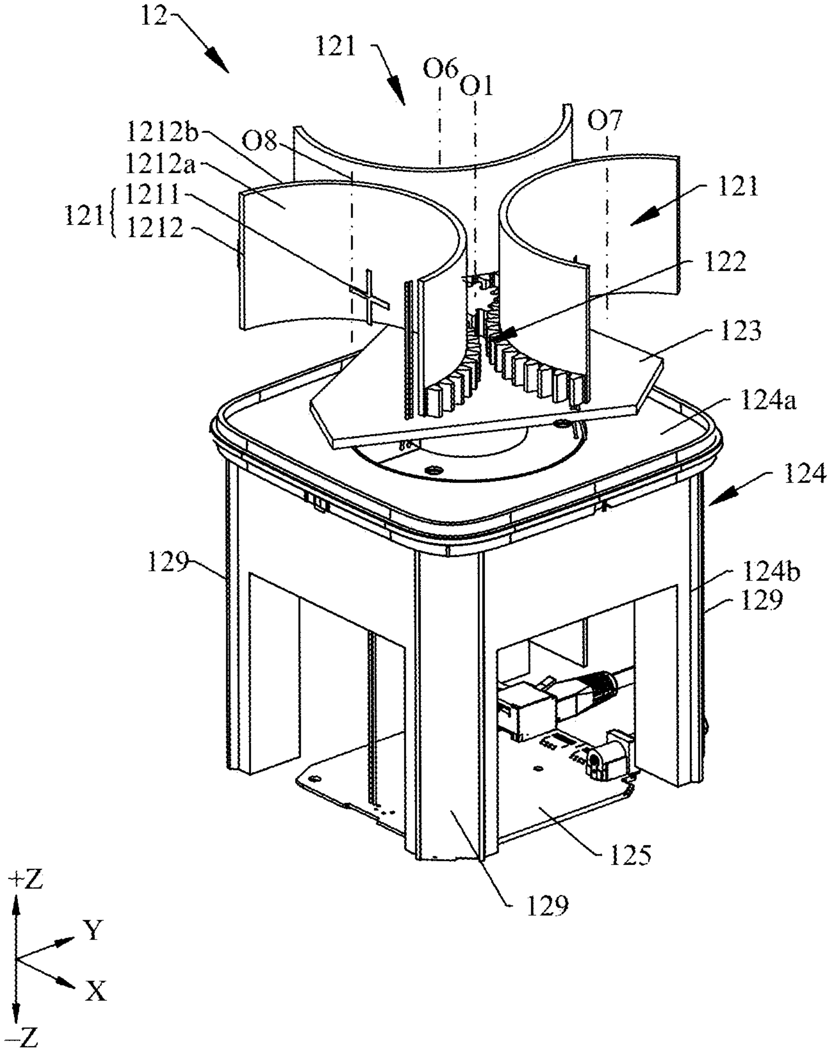
FIG. 29 is a schematic diagram of a structure of an antenna assembly according to some other embodiments of this application.
Figure 30:
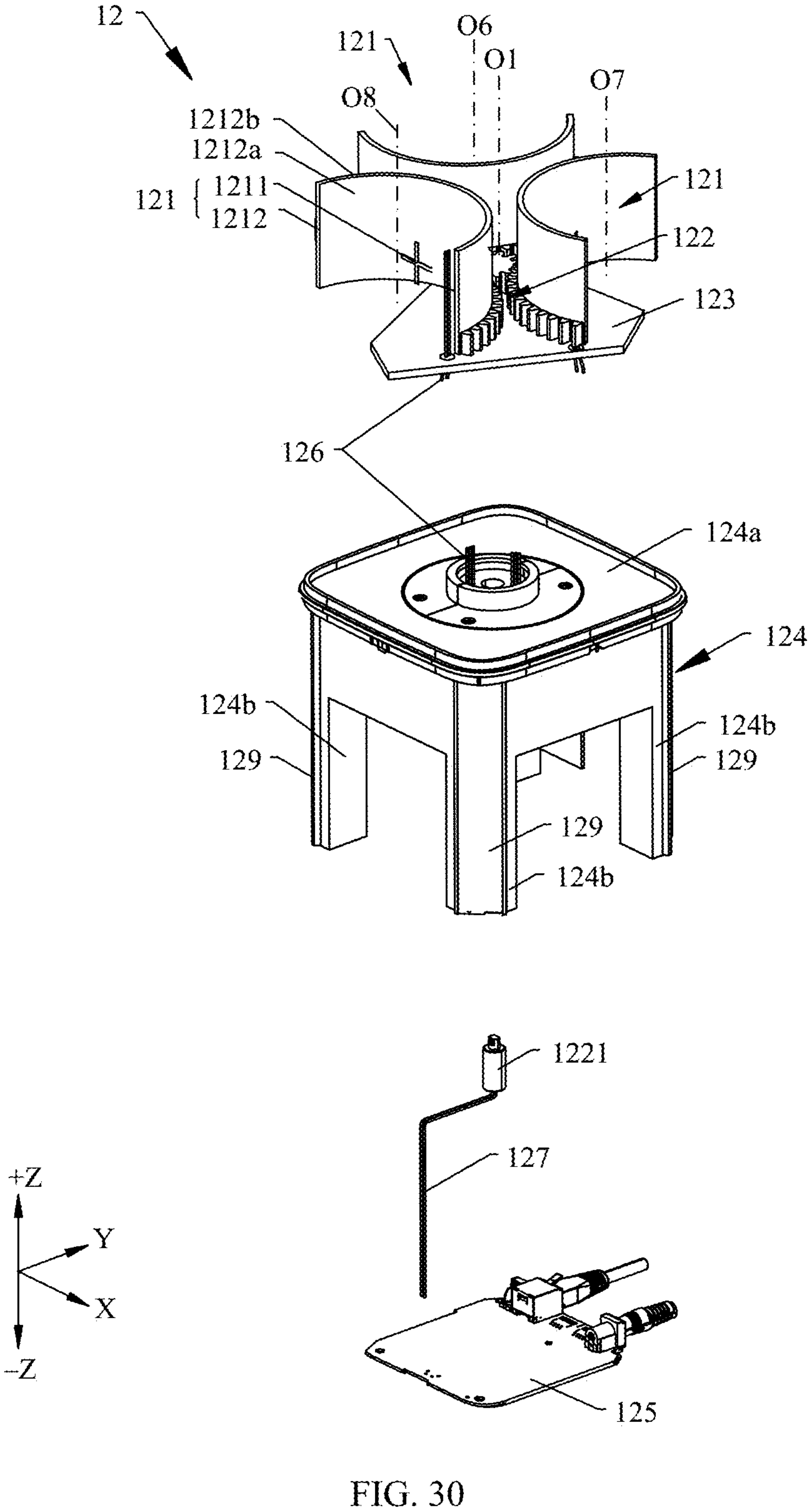
FIG. 30 is an exploded view of the antenna assembly shown in FIG. 29.

In some embodiments, refer to FIG. 29 and FIG. 30. FIG. 29 is a schematic diagram of a structure of an antenna assembly 12 according to some other embodiments of this application, and FIG. 30 is an exploded view of the antenna assembly 12 shown in FIG. 29. A difference between the antenna assembly 12 shown in this embodiment and the antenna assembly 12 shown in FIG. 16, FIG. 17A, and FIG. 17B lies in that in this embodiment, a directional antenna 121 includes a radiator 1211 and a reflection plate 1212. A first support 123 and a housing 11 are fastened relative to each other. Specifically, the first support 123 may be fastened to a second support 124. On this basis, radiators 1211 of a plurality of directional antennas 121 are fastened to the first support 123. Therefore, the first support 123 and the housing 11 are fastened relative to each other. It should be noted that the first support 123 is not completely shown in FIG. 29 and FIG. 30. Specifically, a part that is of the first support 123 and that is configured to fasten the radiators 1211 of the plurality of directional antennas 121 is not shown. Reflection plates 1212 of the plurality of directional antennas 121 are capable of respectively rotating around axes relative to the radiators 1211. In some embodiments, the reflection plates 1212 of the plurality of directional antennas 121 may be rotatably connected to the first support 123 around the axes, and a driving apparatus 122 is configured to drive the reflection plates 1212 of the plurality of directional antennas 121 to respectively rotate around the rotation axes of the reflection plates 1212, to respectively adjust beam directions of the plurality of directional antennas 121 in a plurality of sectors.

For example, with reference to FIG. 29 and FIG. 30, reflection plates 1212 of three directional antennas 121 are capable of being respectively rotatably connected to the first support 123 around a sixth axis O6, a seventh axis O7, and an eighth axis O8, and the driving apparatus 122 is configured to drive the reflection plates 1212 of the three directional antennas 121 to respectively rotate around the sixth axis O6, the seventh axis O7, and the eighth axis O8, to respectively adjust beam directions of the three directional antennas 121 in three sectors.

In this way, the radiators 1211 of the plurality of directional antennas 121 are fastened, and the reflection plates 1212 of the plurality of directional antennas 121 are driven to rotate, to adjust the beam directions of the directional antennas 121. In an adjustment process, positions of the radiators 1211 of the plurality of directional antennas 121 and a circuit board assembly 125 are fastened, and a feed cable 126 connected between the radiator 1211 and the circuit board assembly 125 does not swing. Therefore, a possibility that the feed cable 126 is wound, knotted, and worn can be minimized.

Figure 31:
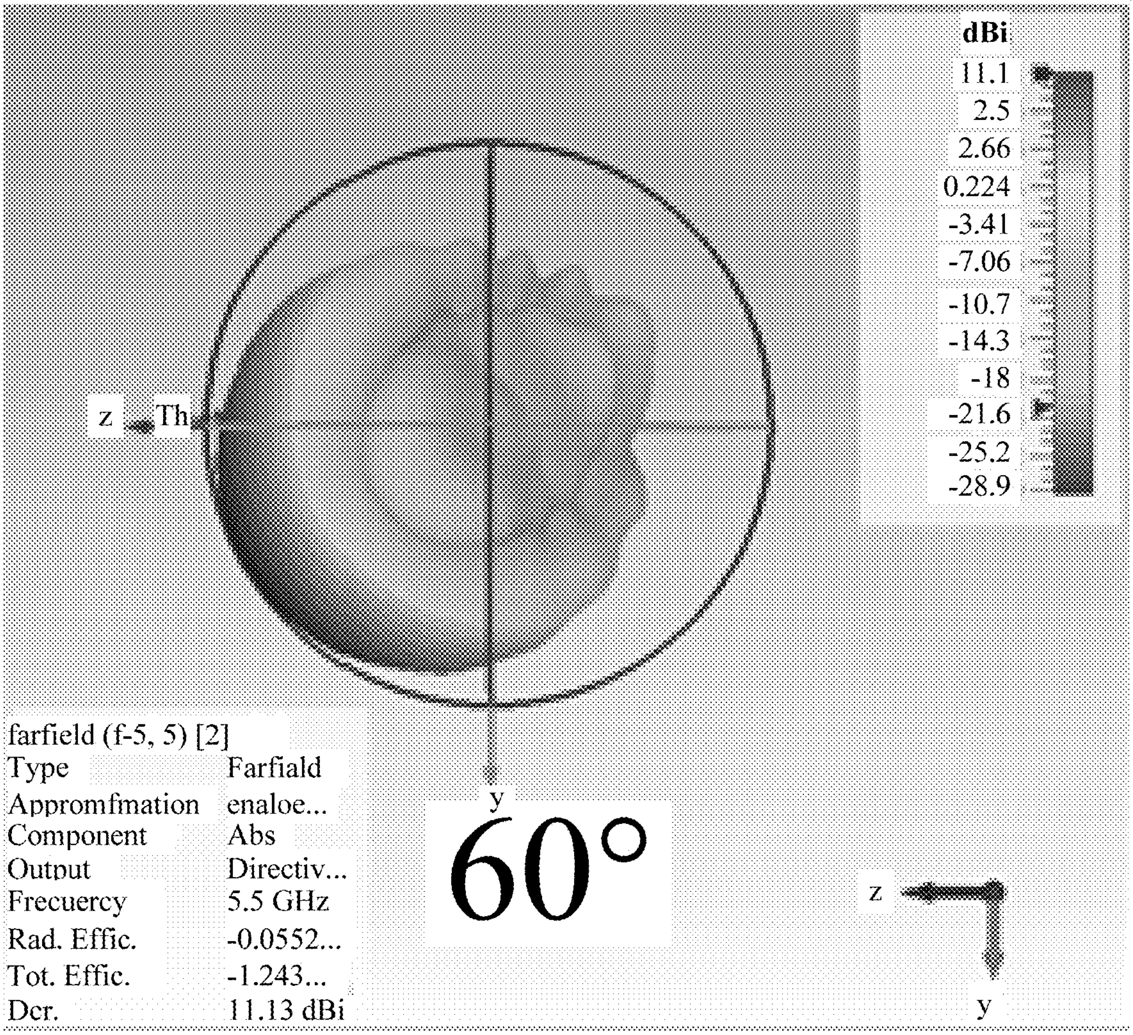
FIG. 31 is a directivity pattern of a directional antenna in the antenna assembly shown in FIG. 29 when a reflection plate rotates to 60°.
Figure 32:
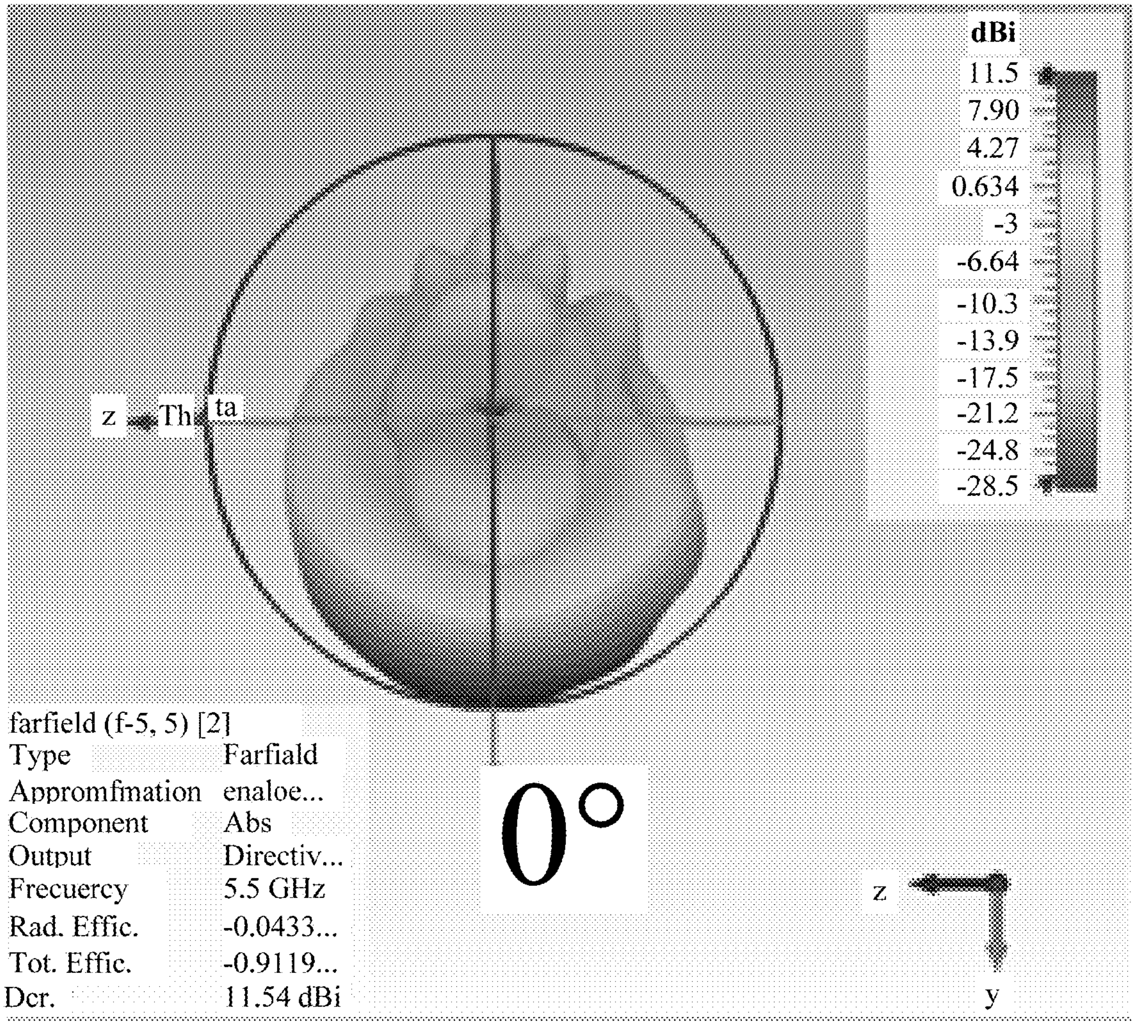
FIG. 32 is a directivity pattern of a directional antenna in the antenna assembly shown in FIG. 29 when a reflection plate rotates to 0°.
Figure 33:
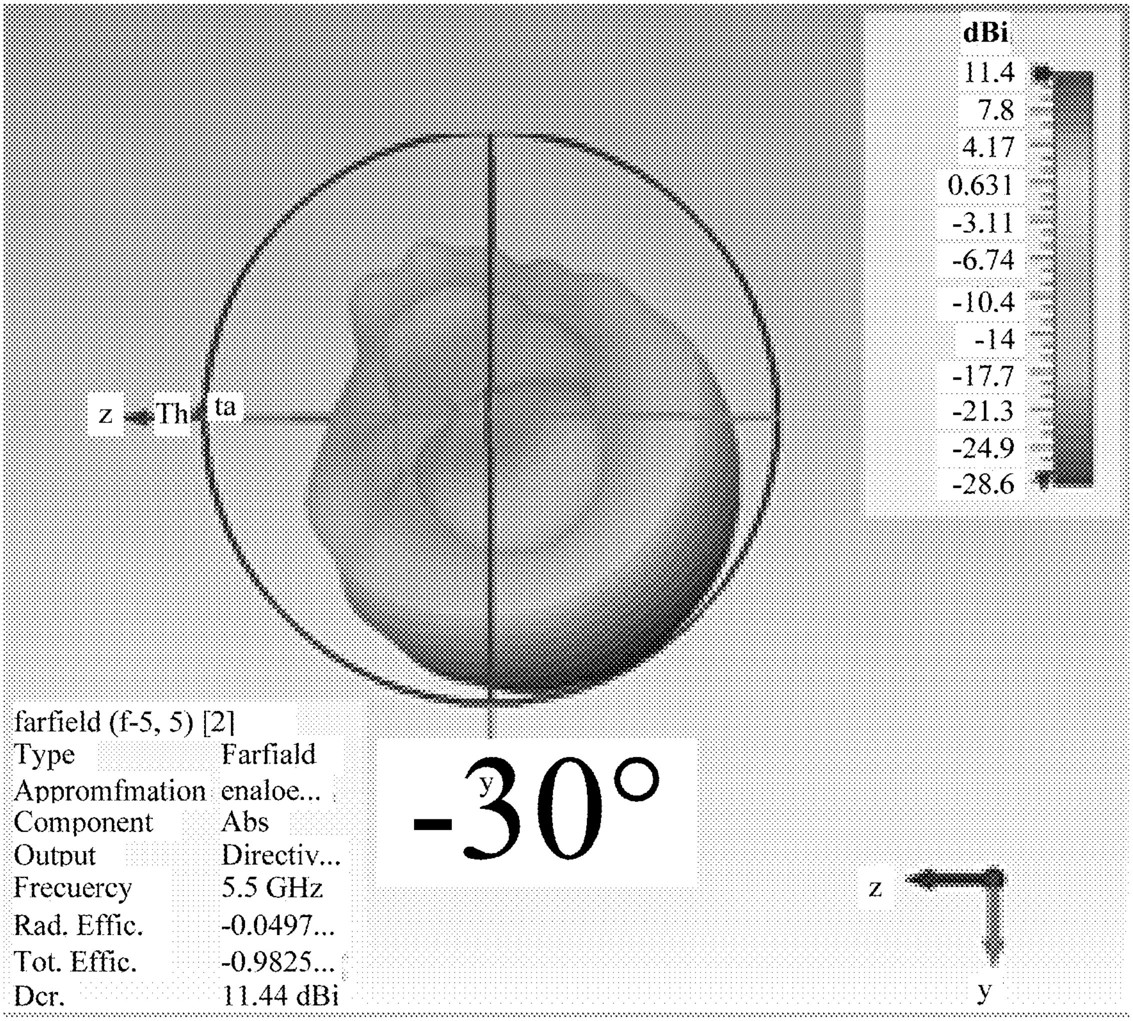
FIG. 33 is a directivity pattern of a directional antenna in the antenna assembly shown in FIG. 29 when a reflection plate rotates to −30°.

In some embodiments, still with reference to FIG. 29 and FIG. 30, the reflection plate 1212 is located between the radiator 1211 and a first axis O1, the reflection plate 1212 is an arc-shaped plate, a central line of the arc-shaped plate is collinear with a rotation axis of the arc-shaped plate, the arc-shaped plate has a concave surface 1212*a* and a convex surface 1212*b* that are opposite to each other, the concave surface 1212*a* faces the radiator 1211, and the convex surface 1212*b* faces the first axis O1. The driving apparatus 122 is configured to drive the arc-shaped plate to rotate around the central line of the arc-shaped plate, to respectively adjust the beam directions of the plurality of directional antennas 121 in the plurality of sectors. In this way, when the reflection plate 1212 rotates, relatively small impact is exerted on performance of the directional antenna 121. Specifically, refer to FIG. 31-FIG. 33. FIG. 31 is a directivity pattern of a directional antenna 121 in the antenna assembly 12 shown in FIG. 29 when the reflection plate 1212 rotates to 60°, FIG. 32 is a directivity pattern of a directional antenna 121 in the antenna assembly 12 shown in FIG. 29 when the reflection plate 1212 rotates to 0°, and FIG. 33 is a directivity pattern of a directional antenna 121 in the antenna assembly 12 shown in FIG. 29 when the reflection plate 1212 rotates to −30°. It may be learned from FIG. 31-FIG. 33 that at different rotation angles of the reflection plate 1212, the directivity pattern of the directional antenna 121 has small distortion, a maximum-gain direction of the directivity pattern is consistent with a rotation amount, and a fluctuation of a maximum gain is relatively small, and is specifically less than 0.5 dB.

Figure 34:
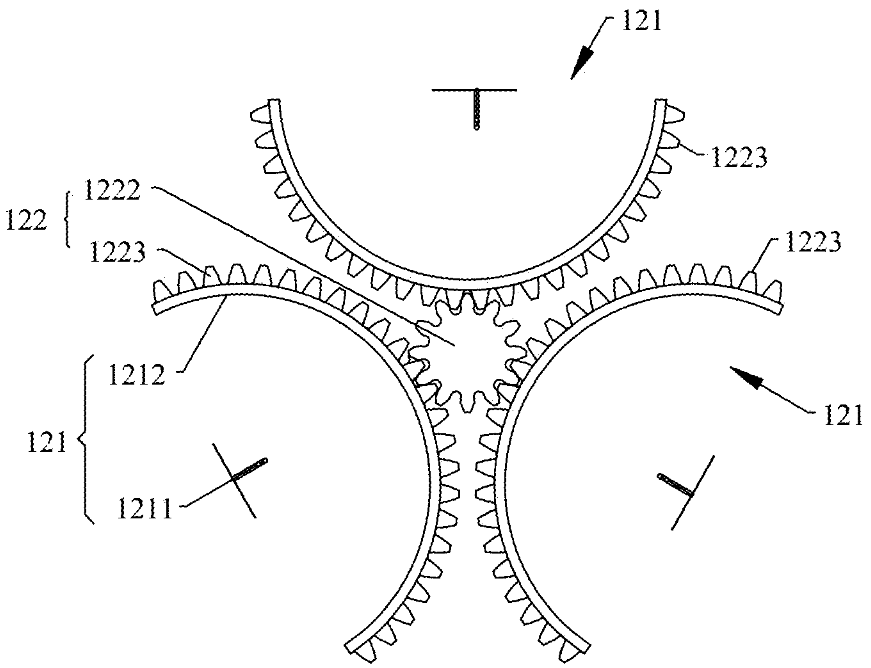
FIG. 34 is a top view of an assembly structure of a directional antenna and a driving apparatus in the antenna assembly shown in FIG. 29.
Figure 35:
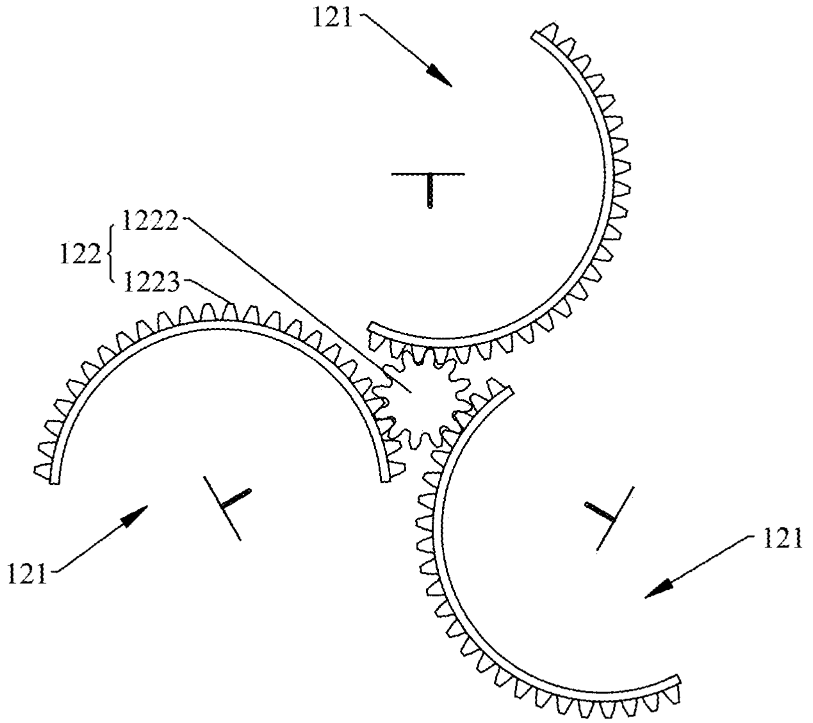
FIG. 35 is a schematic diagram of a structure of the assembly structure shown in FIG. 34 after a reflection plate rotates at a specific angle.

In the foregoing embodiment, a driving manner of the driving apparatus 122 includes but is not limited to a synchronous driving manner and an asynchronous driving manner. Refer to FIG. 34. FIG. 34 is a top view of an assembly structure of the directional antenna 121 and the driving apparatus 122 in the antenna assembly 12 shown in FIG. 29. In this embodiment, the driving apparatus 122 includes a driving member, a driving gear 1222, and a plurality of driven members 1223. The driving member is a rotation driving member, the driving member is connected to the driving gear 1222, and the driving member is configured to drive the driving gear 1222 to rotate. The driven member 1223 is a gear or a rack extending along an arc. In this embodiment, the driven member 1223 is a rack extending along an arc, the plurality of driven members 1223 are respectively disposed on the reflection plates 1212 of the plurality of directional antennas 121, and axes of the plurality of driven members 1223 are respectively collinear with central lines of the reflection plates 1212 on which the plurality of driven members 1223 are located. The plurality of driven members 1223 are arranged in a circumferential direction of the driving gear 1222, and are engaged with the driving gear 1222, to drive the plurality of driven members 1223 to respectively rotate around the axes of the plurality of driven members 1223. Refer to FIG. 35. FIG. 35 is a schematic diagram of a structure of the assembly structure shown in FIG. 34 after the reflection plate 1212 rotates at a specific angle.

This driving manner is a synchronous driving manner. In this driving manner, because the rotation axes of the plurality of directional antennas 121 are not collinear with the first axis O1, there is a relatively low requirement on position accuracy of the reflection plates 1212 of the plurality of directional antennas 121 relative to the first support 123 and relative position accuracy between the reflection plates 1212 of the plurality of directional antennas 121, to simplify mounting difficulty. In addition, a structure of the driving apparatus 122 may be designed to drive the reflection plates 1212 of the plurality of directional antennas 121 to rotate at different angular velocities and/or in different rotation directions, so as to meet requirements in different application scenarios.

Figure 36:
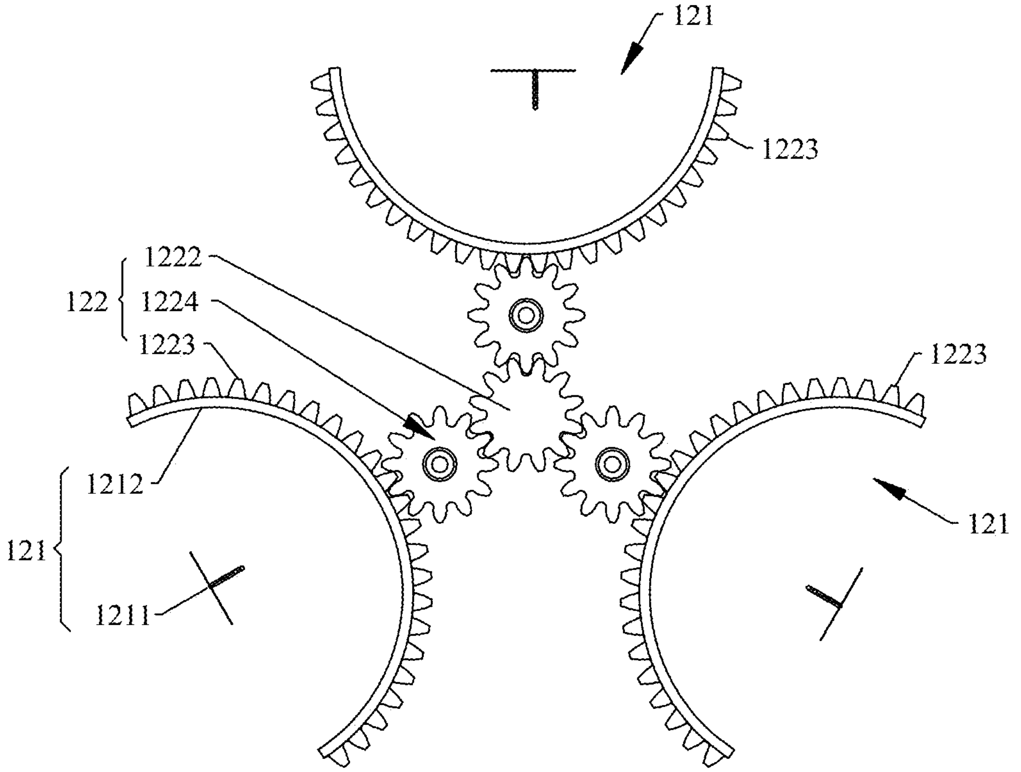
FIG. 36 is a top view of another assembly structure of a directional antenna and a driving apparatus in the antenna assembly shown in FIG. 29.

In some other embodiments, refer to FIG. 36. FIG. 36 is a top view of another assembly structure of the directional antenna and the driving apparatus 122 in the antenna assembly 12 shown in FIG. 29. In this embodiment, the driving apparatus 122 further includes a gear shift assembly 1224 in addition to the driving member 1221, the driving gear 1222, and the plurality of driven members 1223 in the embodiment shown in FIG. 34. The gear shift assembly 1224 is configured to selectively separate the driving gear 1222 from at least one driven member 1223 in the plurality of driven members 1223, so that the at least one driven member 1223 and a reflection plate 1212 disposed on the at least one driven member 1223 stop rotating, and the remaining driven members 1223 can rotate with the driving gear 1222. A structural form of the gear shift assembly 1224 may be the same as the structural form of the foregoing gear shift assembly 1224. Details are not described herein again.

In this way, by performing gear shift by using the gear shift assembly 1224, the plurality of directional antennas 121 can be separately and independently driven in the plurality of sectors. This driving manner is an asynchronous driving manner. In this driving manner, high-speed Internet access requirements of a plurality of user equipments can be simultaneously met. This has relatively high flexibility and a relatively wide application scope. Different optimization policies may be implemented in different optimization policies, for example, global throughput optimization, VIP first, or service scenario first.

To separately and independently drive the reflection plates 1212 of the plurality of directional antennas 121, in some other embodiments, the driving apparatus 122 may include a plurality of driving members. The driving member is a rotation driving member. A quantity of the plurality of driving members is equal to a quantity of the plurality of directional antennas 121, the plurality of driving members are in a one-to-one correspondence with the plurality of directional antennas 121, each driving member is connected to a reflection plate 1212 of a corresponding directional antenna 121, and the driving member is configured to drive the reflection plate 1212 to rotate around a central line of the reflection plate 1212. That is, a plurality of independent rotation driving members (for example, servo motors) are used to respectively drive the reflection plates 1212 of the plurality of directional antennas 121. This structure has a simple control principle and is easy to control. This driving manner is an asynchronous driving manner. In this driving manner, high-speed Internet access requirements of a plurality of user equipments can be simultaneously met, to improve multi-sector multi-user edge coverage performance. This has relatively high flexibility and a relatively wide application scope. Different coverage policies may be implemented in different optimization policies, for example, global throughput optimization, VIP first, or service scenario first.

Figure 37:
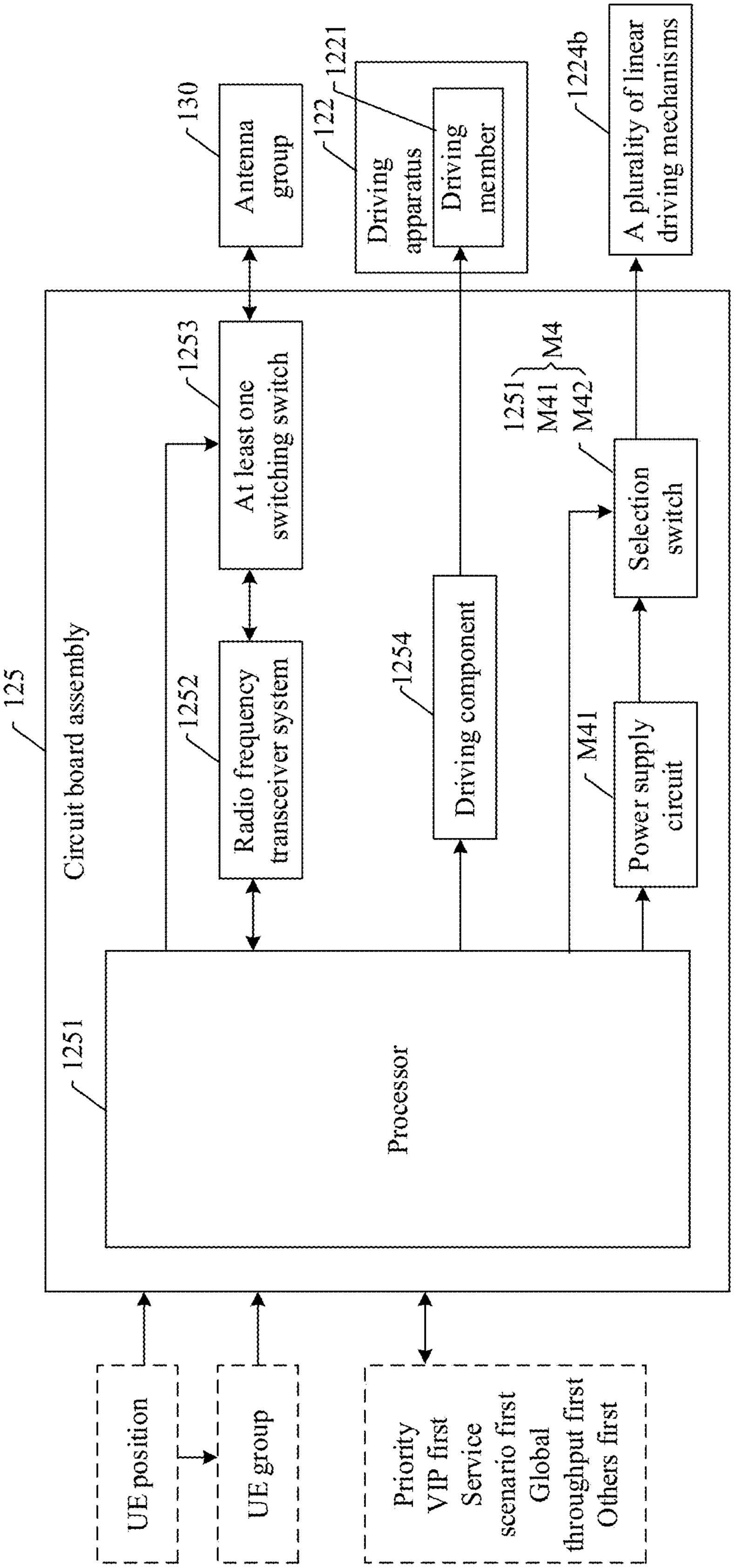
FIG. 37 is a block diagram of an internal circuit and an algorithm of a wireless access device according to some embodiments of this application.

In some embodiments, refer to FIG. 37. FIG. 37 is a block diagram of an internal circuit and an algorithm of a wireless access device 10 according to some embodiments of this application. The wireless access device 10 may be configured to determine a position and a movement trajectory of each user equipment. In this way, the wireless access device 10 can determine a corresponding coverage and following policy based on the position and the movement trajectory of each user equipment.

In the foregoing embodiment, the wireless access device 10 determines the position and the movement trajectory of the user equipment in a plurality of manners.

For example, the wireless access device 10 is configured to obtain the position and the movement trajectory of the user equipment through traversal detection by using the directional antenna 121. Specifically, the driving apparatus 122 may be used to drive the plurality of directional antennas 121 to synchronously or asynchronously rotate, to perform traversal detection at a small angle in a sector range in which the plurality of directional antennas 121 are located, so as to obtain the position and the movement trajectory of each user equipment, and track the user equipment.

For another example, the wireless access device 10 may obtain the position and the movement trajectory of the user equipment by using a conventional means such as artificial intelligence (artificial intelligence, AI), self-learning, time statistics, a positioning technology, or probability statistics. A positioning antenna used in the positioning technology includes but is not limited to an ultra wideband (ultra wideband, UWB) antenna and an artificial intelligence & internet of things (artificial intelligence & internet of things, AIoT) sensing antenna. Herein, AIoT (artificial intelligence & internet of things)=AI (artificial intelligence)+IoT (internet of things, the internet of things).

After the position of each user equipment is determined, a sector in which each user equipment is located may be determined, to meet a wireless coverage requirement of the user equipment by using a directional antenna in the corresponding sector.

After the position of the user equipment is determined, user equipment in different sectors may be grouped to help implement an OFDMA service and a MU-MIMO service for all users in a coverage area. The OFDMA service may be directly implemented for user equipment in a same sector. The MU-MIMO service means that in a wireless communication system, one wireless access device 10 simultaneously serves a plurality of user equipments, and the wireless access device 10 fully uses a spatial resource of an antenna to simultaneously communicate with the plurality of user equipments. That is, the wireless access device 10 sends different data streams to different user equipments at a same moment on a same channel, to improve a throughput of the entire system by using a spatial multiplexing gain and a multi-user diversity gain, and release more time. Therefore, high non-correlation between the user equipments is required. Therefore, two polarization antennas in a same sector can implement the MU-MIMO service in this sector. For UE 20 in different sectors, there is a quite low channel correlation. However, because data is sent in a time division manner, the MU-MIMO service cannot be implemented. If data can be simultaneously sent in a plurality of sectors, the MU-MIMO service can be implemented.

In some embodiments, the wireless access device 10 is further configured to determine priorities of a plurality of user equipments in addition to covering and following the user equipment and determining the position and the movement trajectory of each user equipment. Specifically, the wireless access device 10 may use different optimization policies, for example, global throughput first, VIP first, or service scenario first. In this way, the wireless access device 10 can implement different coverage and following policies based on different optimization policies, to improve properness of adjusting the beam direction of the directional antenna 121 in the wireless access device 10.

In the descriptions of this specification, specific features, structures, materials, or characteristics may be properly combined in any one or more embodiments or examples.

Finally, it should be noted that the foregoing embodiments are only used to describe the technical solutions in this application, but are not used to limit this application. Although this application is described in detail with reference to the foregoing embodiments, it should be understood by a person of ordinary skill in the art that the technical solutions described in the foregoing embodiments may still be modified, or some technical features thereof may be equivalently replaced. These modifications or replacements do not make the essence of the corresponding technical solutions depart from the spirit and scope of the technical solutions in the embodiments of this application.

The invention claimed is:

1. A wireless access device, comprising:

a housing;

a plurality of directional antennas, wherein the plurality of directional antennas are disposed in the housing and are distributed along a ring array, and a central axis of the ring array of the plurality of directional antennas is a first axis; each directional antenna radiates a signal in a direction away from the first axis; and beams of the plurality of directional antennas are respectively located in a plurality of sectors, the plurality of sectors are disposed around the first axis, and vertices of the plurality of sectors are located on the first axis;

a driving apparatus, wherein the driving apparatus is disposed in the housing, and the driving apparatus is configured to drive the plurality of directional antennas to rotate relative to the housing, to respectively adjust beam directions of the plurality of directional antennas in the plurality of sectors; and a first support, wherein the first support and the housing are fastened relative to each other, wherein:

each directional antenna comprises a radiator and a reflection plate; and radiators of the plurality of directional antennas are fastened to the first support, reflection plates of the plurality of directional antennas are capable of respectively rotating around axes relative to the radiators, and the driving apparatus is configured to drive the reflection plates of the plurality of directional antennas to respectively rotate around the rotation axes of the reflection plates, to respectively adjust the beam directions of the plurality of directional antennas in the plurality of sectors.

2. The wireless access device according to claim 1, wherein each reflection plate is located between the corresponding radiator and the first axis, each reflection plate is an arc-shaped plate, a central line of each arc-shaped plate is collinear with a rotation axis of the respective arc-shaped plate, each arc-shaped plate has a concave surface and a convex surface that are opposite to each other, the concave surface faces the corresponding radiator, and the convex surface faces the first axis; and the driving apparatus is configured to drive each arc-shaped plate to rotate around the central line of the respective arc-shaped plate, to respectively adjust the beam directions of the plurality of directional antennas in the plurality of sectors.

3. The wireless access device according to claim 2, wherein the driving apparatus comprises a plurality of driving members, a quantity of the plurality of driving members is equal to a quantity of the plurality of directional antennas, the plurality of driving members are in a one-to-one correspondence with the plurality of directional antennas, each driving member is connected to a reflection plate of a corresponding directional antenna, and each driving member is configured to drive the corresponding reflection plate to rotate around a central line of the corresponding reflection plate.

4. The wireless access device according to claim 2, wherein the driving apparatus comprises:

a driving member;

a driving gear, wherein the driving member is connected to the driving gear, and the driving member is configured to drive the driving gear to rotate; and a plurality of driven members, wherein each driven member is a gear or a rack extending along an arc, the plurality of driven members are respectively disposed on the reflection plates of the plurality of directional antennas, and axes of the plurality of driven members are respectively collinear with central lines of the reflection plates on which the plurality of driven members are located; and the plurality of driven members are arranged in a circumferential direction of the driving gear, and are engaged with the driving gear, to drive the plurality of driven members to respectively rotate around the axes of the plurality of driven members; and a gear shift assembly, wherein the gear shift assembly is configured to selectively separate the driving gear from at least one driven member in the plurality of driven members.

5. The wireless access device according to claim 4, wherein there is a gap between the driving gear and each of the plurality of driven members; and the gear shift assembly comprises:

a plurality of transmission gears, wherein all of the plurality of transmission gears are located at a first position, the plurality of transmission gears are respectively disposed in the gaps between the driving gear and the plurality of driven members, and each transmission gear is engaged with the driving gear and the corresponding driven member; and a plurality of linear driving mechanisms that are respectively connected to the plurality of transmission gears, wherein each linear driving mechanism is configured to drive the corresponding transmission gear to move in a direction parallel to the first axis, so that the corresponding transmission gear is switched between the first position and a second position; and when the corresponding transmission gear is located at the second position, the corresponding transmission gear is located outside the gap between the driving gear and the corresponding driven member, and is separated from the driving gear and the corresponding driven member.

6. The wireless access device according to claim 5, wherein each linear driving mechanism comprises:

a magnetic member;

an electromagnet, wherein an arrangement direction of the magnetic member and the electromagnet is parallel to the first axis, one of the magnetic member and the electromagnet is fastened to the corresponding transmission gear, and the other of the magnetic member and the electromagnet and the first support are fastened relative to each other;

an elastic reset member, wherein the elastic reset member is connected to the corresponding transmission gear; and a control circuit, wherein the control circuit is connected to the electromagnet, and the control circuit is configured to control the electromagnet to be energized or de-energized; when the electromagnet is energized, there is magnetic attraction force between the electromagnet and the magnetic member, the magnetic attraction force drives the corresponding transmission gear to move from the first position to the second position, and the elastic reset member is deformed to accumulate elastic reset force; and when the electromagnet is de-energized, the magnetic attraction force between the electromagnet and the magnetic member disappears, and the elastic reset force drives the corresponding transmission gear to be reset from the second position to the first position.

7. The wireless access device according to claim 6, wherein the control circuit comprises:

a power supply circuit;

a selection switch, wherein the selection switch is disposed between the power supply circuit and electromagnets of the plurality of linear driving mechanisms; and a processor, wherein the processor is connected to the selection switch, and is configured to control the selection switch, so that the power supply circuit is capable of selectively supplying power to an electromagnet of at least one linear driving mechanism in the plurality of linear driving mechanisms.

8. The wireless access device according to claim 1, wherein there are N sectors, N is a positive integer greater than 1, and a central angle of each sector is (360/N)°; and the plurality of sectors are head-to-tail connected in a circumferential direction of the first axis.

9. The wireless access device according to claim 1, further comprising:

a circuit board assembly;

a plurality of feed cables, wherein the plurality of feed cables are respectively connected between the circuit board assembly and the radiators of the plurality of directional antennas; and a second support, wherein the second support and the housing are fastened relative to each other, the second support comprises a support plate, the support plate is located between the circuit board assembly and the plurality of directional antennas, at least one cable-through slot is disposed on the support plate, and the plurality of feed cables penetrate through the at least one cable-through slot.

10. The wireless access device according to claim 9, wherein there are a plurality of cable-through slots, the plurality of cable-through slots are distributed along a second ring array, a central axis of the second ring array of the plurality of cable-through slots is a second axis, and the second axis is collinear with the first axis; and at least one feed cable penetrates through each cable-through slot.

11. The wireless access device according to claim 10, wherein the plurality of cable-through slots are centrally symmetrically distributed relative to the second axis;

each cable-through slot is a long slot, each long slot has a first end and a second end that are opposite to each other, each long slot extends around the second axis from the first end to the second end, and a distance between the first end and the second axis is not equal to a distance between the second end and the second axis; and at least one feed cable penetrates through each cable-through slot, and the at least one feed cable is capable of sliding along the corresponding cable-through slot.

12. The wireless access device according to claim 9, wherein the second support further comprises a plurality of support pillars, the plurality of support pillars are disposed on a side that is of the support plate and that faces away from the plurality of directional antennas, and the plurality of support pillars are evenly arranged around an edge of the support plate; and the wireless access device further comprises:

a plurality of omnidirectional antennas, wherein the plurality of omnidirectional antennas are respectively disposed on the plurality of support pillars.

13. The wireless access device according to claim 12, wherein the circuit board assembly comprises:

a radio frequency transceiver system, wherein the radio frequency transceiver system comprises at least one radio frequency transceiver, a quantity of the at least one radio frequency transceiver is less than a sum of the quantity of directional antennas and a quantity of omnidirectional antennas, and the plurality of directional antennas and the plurality of omnidirectional antennas form an antenna group;

at least one switching switch, wherein the at least one switching switch is connected between the at least one radio frequency transceiver and the antenna group; and a processor, wherein the processor is connected to the at least one switching switch, and the processor is configured to control the at least one switching switch to select at least one antenna in the antenna group to be connected to the at least one radio frequency transceiver.

14. The wireless access device according to claim 13, wherein the at least one radio frequency transceiver comprises a first radio frequency transceiver, a second radio frequency transceiver, a third radio frequency transceiver, and a fourth radio frequency transceiver;

the plurality of directional antennas comprise a first directional antenna, a second directional antenna, and a third directional antenna, and each of the first directional antenna, the second directional antenna, and the third directional antenna comprises two antenna units whose polarization directions are orthogonal;

the plurality of omnidirectional antennas comprise a first omnidirectional antenna, a second omnidirectional antenna, a third omnidirectional antenna, and a fourth omnidirectional antenna; and the first radio frequency transceiver is connected to the first omnidirectional antenna, and the second radio frequency transceiver is connected to the second omnidirectional antenna;

the at least one switching switch comprises a first switching switch and a second switching switch;

the first switching switch is connected between the third radio frequency transceiver and the third omnidirectional antenna, one antenna unit of the first directional antenna, one antenna unit of the second directional antenna, and one antenna unit of the third directional antenna, and the processor is configured to control the first switching switch to select one of the third omnidirectional antenna, the one antenna unit of the first directional antenna, the one antenna unit of the second directional antenna, and the one antenna unit of the third directional antenna to be connected to the third radio frequency transceiver; and the second switching switch is connected between the fourth radio frequency transceiver and the fourth omnidirectional antenna, the other antenna unit of the first directional antenna, the other antenna unit of the second directional antenna, and the other antenna unit of the third directional antenna, the processor is connected to the second switching switch, and the processor is configured to control the second switching switch to select one of the fourth omnidirectional antenna, the other antenna unit of the first directional antenna, the other antenna unit of the second directional antenna, and the other antenna unit of the third directional antenna to be connected to the fourth radio frequency transceiver.

15. A communication system, comprising a wireless access device and user equipment, wherein the wireless access device is configured to provide a wireless access service for the user equipment;

wherein the wireless access device comprises:

a housing;

a plurality of directional antennas, wherein the plurality of directional antennas are disposed in the housing and are distributed along a ring array, and a central axis of the ring array of the plurality of directional antennas is a first axis; each directional antenna radiates a signal in a direction away from the first axis; and beams of the plurality of directional antennas are respectively located in a plurality of sectors, the plurality of sectors are disposed around the first axis, and vertices of the plurality of sectors are located on the first axis;

a driving apparatus, wherein the driving apparatus is disposed in the housing, and the driving apparatus is configured to drive the plurality of directional antennas to rotate relative to the housing, to respectively adjust beam directions of the plurality of directional antennas in the plurality of sectors; and a first support, wherein the first support and the housing are fastened relative to each other, wherein:

each directional antenna comprises a radiator and a reflection plate; and radiators of the plurality of directional antennas are fastened to the first support, reflection plates of the plurality of directional antennas are capable of respectively rotating around axes relative to the radiators, and the driving apparatus is configured to drive the reflection plates of the plurality of directional antennas to respectively rotate around the rotation axes of the reflection plates, to respectively adjust the beam directions of the plurality of directional antennas in the plurality of sectors.

16. A wireless access device, comprising:

a housing;

a plurality of directional antennas, wherein the plurality of directional antennas are disposed in the housing and are distributed along a ring array, and a central axis of the ring array of the plurality of directional antennas is a first axis, each directional antenna radiates a signal in a direction away from the first axis, and beams of the plurality of directional antennas are respectively located in a plurality of sectors, the plurality of sectors are disposed around the first axis, and vertices of the plurality of sectors are located on the first axis;

a driving apparatus, wherein the driving apparatus is disposed in the housing, and the driving apparatus is configured to drive the plurality of directional antennas to rotate relative to the housing, to respectively adjust beam directions of the plurality of directional antennas in the plurality of sectors;

a first support, wherein the first support and the housing are fastened relative to each other, the plurality of directional antennas are capable of being respectively rotatably connected to the first support around axes, and the driving apparatus is configured to drive the plurality of directional antennas to respectively rotate around the rotation axes of the plurality of directional antennas, to respectively adjust the beam directions of the plurality of directional antennas in the plurality of sectors;

wherein the driving apparatus comprises:

a driving member;

a driving gear, wherein the driving member is connected to the driving gear, and the driving member is configured to drive the driving gear to rotate; and a plurality of driven members, wherein each driven member is a gear or a rack extending along an arc, the plurality of driven members are respectively disposed on the plurality of directional antennas, and axes of the plurality of driven members are respectively collinear with the rotation axes of the directional antennas on which the plurality of driven members are located, and the plurality of driven members are arranged in a circumferential direction of the driving gear, and are engaged with the driving gear, to drive the plurality of driven members to respectively rotate around the axes of the plurality of driven members; and a gear shift assembly, wherein the gear shift assembly is configured to selectively separate the driving gear from at least one driven member in the plurality of driven members.

17. The wireless access device according to claim 16, wherein there is a gap between the driving gear and each of the plurality of driven members; and the gear shift assembly comprises:

a plurality of transmission gears, wherein all of the plurality of transmission gears are located at a first position, the plurality of transmission gears are respectively disposed in the gaps between the driving gear and the plurality of driven members, and each transmission gear is engaged with the driving gear and the corresponding driven member; and a plurality of linear driving mechanisms that are respectively connected to the plurality of transmission gears, wherein each linear driving mechanism is configured to drive the corresponding transmission gear to move in a direction parallel to the first axis, so that the corresponding transmission gear is switched between the first position and a second position; and when the corresponding transmission gear is located at the second position, the corresponding transmission gear is located outside the gap between the driving gear and the corresponding driven member, and is separated from the driving gear and the corresponding driven member.

18. The wireless access device according to claim 17, wherein each linear driving mechanism comprises:

a magnetic member;

an electromagnet, wherein an arrangement direction of the magnetic member and the electromagnet is parallel to the first axis, one of the magnetic member and the electromagnet is fastened to the corresponding transmission gear, and the other of the magnetic member and the electromagnet and the first support are fastened relative to each other;

an elastic reset member, wherein the elastic reset member is connected to the corresponding transmission gear; and a control circuit, wherein the control circuit is connected to the electromagnet, and the control circuit is configured to control the electromagnet to be energized or de-energized; when the electromagnet is energized, there is magnetic attraction force between the electromagnet and the magnetic member, the magnetic attraction force drives the corresponding transmission gear to move from the first position to the second position, and the elastic reset member is deformed to accumulate elastic reset force; and when the electromagnet is de-energized, the magnetic attraction force between the electromagnet and the magnetic member disappears, and the elastic reset force drives the corresponding transmission gear to be reset from the second position to the first position.

19. The wireless access device according to claim 18, wherein the control circuit comprises:

a power supply circuit;

a selection switch, wherein the selection switch is disposed between the power supply circuit and electromagnets of the plurality of linear driving mechanisms; and a processor, wherein the processor is connected to the selection switch, and is configured to control the selection switch, so that the power supply circuit is capable of selectively supplying power to an electromagnet of at least one linear driving mechanism in the plurality of linear driving mechanisms.

20. The wireless access device according to claim 16, further comprising:

a circuit board assembly;

a plurality of feed cables, wherein the plurality of feed cables are respectively connected between the circuit board assembly and radiators of the plurality of directional antennas; and a second support, wherein the second support and the housing are fastened relative to each other, the second support comprises a support plate, the support plate is located between the circuit board assembly and the plurality of directional antennas, at least one cable-through slot is disposed on the support plate, and the plurality of feed cables penetrate through the at least one cable-through slot.

* * * * *